(12) United States Patent
Levitsky et al.

(10) Patent No.: US 11,758,572 B2
(45) Date of Patent: *Sep. 12, 2023

(54) DEMODULATION REFERENCE SIGNAL CONFIGURATION SELECTION AND REPORTING PER SUB-BAND

(71) Applicant: QUALCOMM Incorporated, San Diego, CA (US)

(72) Inventors: Michael Levitsky, Rehovot (IL); Wanshi Chen, San Diego, CA (US); Jacob Pick, Beit Zayit (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/338,332

(22) Filed: Jun. 3, 2021

(65) Prior Publication Data

US 2021/0385818 A1 Dec. 9, 2021

Related U.S. Application Data

(60) Provisional application No. 63/034,842, filed on Jun. 4, 2020.

(51) Int. Cl.
| | | |
|---|---|---|
| *H04W 72/541* | (2023.01) | |
| *H04L 5/00* | (2006.01) | |
| *H04W 72/21* | (2023.01) | |
| *H04W 72/566* | (2023.01) | |

(52) U.S. Cl.
CPC ......... *H04W 72/541* (2023.01); *H04L 5/0051* (2013.01); *H04W 72/21* (2023.01); *H04W 72/569* (2023.01)

(58) Field of Classification Search
CPC . H04W 72/541; H04W 72/21; H04W 72/569; H04L 5/0051
See application file for complete search history.

(56) References Cited

U.S. PATENT DOCUMENTS

2021/0359800 A1* 11/2021 Levitsky ............... H04L 5/0007
2021/0376898 A1 12/2021 Levitsky et al.

* cited by examiner

*Primary Examiner* — Jackie Zuniga Abad
(74) *Attorney, Agent, or Firm* — Holland & Hart LLP

(57) ABSTRACT

Methods, systems, and devices for wireless communications are described. A base station may transmit, to a user equipment (UE), a first demodulation reference signal for each of one or more sub-bands and configured in accordance with a first one or more demodulation reference signal configurations. The UE may select a second demodulation reference signal configuration from a respective set of second demodulation reference signal configurations for each of the one or more sub-bands and may transmit an indication of the second demodulation reference signal configuration for each of the one or more sub-bands. The base station may receive the indication and may transmit, to the UE, a second demodulation reference signal for each of the one or more sub-bands and configured in accordance with the second demodulation reference signal configuration for each of the one or more sub-bands.

30 Claims, 16 Drawing Sheets

DEMODULATION REFERENCE SIGNAL CONFIGURATION SELECTION AND REPORTING PER SUB-BAND

CROSS REFERENCE

The present application for patent claims the benefit of U.S. Provisional Patent Application No. 63/034,842 by LEVITSKY et al., entitled "DEMODULATION REFERENCE SIGNAL CONFIGURATION SELECTION AND REPORTING PER SUB-BAND," filed Jun. 4, 2020, assigned to the assignee hereof, and expressly incorporated by reference herein.

FIELD OF TECHNOLOGY

The following relates generally to wireless communications and more specifically to demodulation reference signal configuration selection and reporting per sub-band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support the transmission of reference signals to estimate channel characteristics and increase a reliability of data transmissions.

SUMMARY

The described techniques relate to improved methods, systems, devices, and apparatuses that support demodulation reference signal configuration selection and reporting per sub-band. Generally, the described techniques provide for selecting a demodulation reference signal (DMRS) configuration for each of one or more sub-bands associated with a data channel. For example, a user equipment (UE) may determine a set of channel characteristics and a first link quality characteristic for each sub-band of one or more sub-bands associated with a channel based on one or more downlink reference signals or a channel state information interference management (CSI-IM) resource, or both. The UE may identify, based on or for the set of channel characteristics and the first link quality characteristic, a set of link quality characteristics for each sub-band of the one or more sub-bands, the set of link quality characteristics for each sub-band of the one or more sub-bands corresponding to a set of demodulation reference signal configurations. The UE may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands. The UE may transmit, to the base station, an indication of the demodulation reference signal configuration for each of the one or more sub-bands.

Additionally or alternatively, a base station may transmit, to a UE, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations. The base station may receive, from the UE, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands. The base station may select a different demodulation reference signal configuration of the set of demodulation reference signal configurations for each of the one or more sub-bands that are different than the first one or more demodulation reference signal configurations based on the indication of the second one or more demodulation reference signal configurations. The base station may transmit, to the UE, a second transmission that includes a second demodulation reference signal for each of the one or more sub-bands that are configured in accordance with or at least partially based on the different demodulation reference signal configuration for each of the one or more sub-bands.

A method of wireless communication is described. The method may include determining a set of channel characteristics and a first link quality characteristic for each sub-band of one or more sub-bands associated with a channel based on one or more downlink reference signals or a channel state information interference management (CSI-IM) resource, or both, identifying, based on the set of channel characteristics and the first link quality characteristic, a set of link quality characteristics for each sub-band of the one or more sub-bands, the set of link quality characteristics for each sub-band of the one or more sub-bands corresponding to a set of demodulation reference signal configurations, selecting a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands, and transmitting, to a base station, an indication of the demodulation reference signal configuration for each of the one or more sub-bands.

An apparatus for wireless communication is described. The apparatus may include a processor, memory coupled with the processor, and instructions stored in the memory. The instructions may be executable by the processor to cause the apparatus to determine a set of channel characteristics and a first link quality characteristic for each sub-band of one or more sub-bands associated with a channel based on one or more downlink reference signals or a channel state information interference management (CSI-IM) resource, or both, identify, based on the set of channel characteristics and the first link quality characteristic, a set of link quality characteristics for each sub-band of the one or more sub-bands, the set of link quality characteristics for each sub-band of the one or more sub-bands corresponding to a set of demodulation reference signal configurations, select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands, and transmit, to a base station, an indication of the demodulation reference signal configuration for each of the one or more sub-bands.

Another apparatus for wireless communication is described. The apparatus may include means for determining a set of channel characteristics and a first link quality characteristic for each sub-band of one or more sub-bands associated with a channel based on one or more downlink reference signals or a channel state information interference management (CSI-IM) resource, or both, identifying, based on the set of channel characteristics and the first link quality characteristic, a set of link quality characteristics for each sub-band of the one or more sub-bands, the set of link quality characteristics for each sub-band of the one or more sub-bands corresponding to a set of demodulation reference signal configurations, selecting a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands, and transmitting, to a base station, an indication of the demodulation reference signal configuration for each of the one or more sub-bands.

A non-transitory computer-readable medium storing code for wireless communication is described. The code may include instructions executable by a processor to determine a set of channel characteristics and a first link quality characteristic for each sub-band of one or more sub-bands associated with a channel based on one or more downlink reference signals or a channel state information interference management (CSI-IM) resource, or both, identify, based on the set of channel characteristics and the first link quality characteristic, a set of link quality characteristics for each sub-band of the one or more sub-bands, the set of link quality characteristics for each sub-band of the one or more sub-bands corresponding to a set of demodulation reference signal configurations, select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands, and transmit, to a base station, an indication of the demodulation reference signal configuration for each of the one or more sub-bands.

Some examples of the method, apparatuses, and non-transitory computer-readable medium described herein may further include operations, features, means, or instructions for receiving, from the base station, a data transmission associated with the one or more sub-bands over a data channel based on the indication of the demodulation reference signal configuration for each of the one or more sub-bands, where the data transmission includes a demodulation reference signal for each of the one or more sub-bands associated with the data transmission.

Some examples of the method, apparatuses, and non-transitory computer-readable medium described herein may further include operations, features, means, or instructions for generating a report that includes the indication of the demodulation reference signal configuration for each of the one or more sub-bands, and transmitting the report to the base station, where transmitting the indication includes transmitting the report to the base station.

In some examples of the method, apparatuses, and non-transitory computer-readable medium described herein, the report includes an indication of a wideband demodulation reference signal configuration.

Some examples of the method, apparatuses, and non-transitory computer-readable medium described herein may further include operations, features, means, or instructions for generating a wideband channel quality indicator associated with the wideband demodulation reference signal configuration and one or more of sub-band channel quality indicators associated with the demodulation reference signal configuration for each of the one or more sub-bands, where the report includes the wideband channel quality indicator and the one or more of sub-band channel quality indicators.

In some examples of the method, apparatuses, and non-transitory computer-readable medium described herein, the indication of the wideband demodulation reference signal configuration includes an absolute index, and where each indication of the demodulation reference signal configuration for each of the one or more sub-bands includes a differential index whose value may be with reference to a value of the absolute index.

In some examples of the method, apparatuses, and non-transitory computer-readable medium described herein, the report may be coupled with a channel state feedback report or includes the channel state feedback report.

In some examples of the method, apparatuses, and non-transitory computer-readable medium described herein, the channel state feedback report includes a sub-band channel quality indicator, a wide-band channel quality indicator, a rank indicator, a wide-band precoding matrix indicator, a sub-band precoding matrix indicator, or a combination thereof.

Some examples of the method, apparatuses, and non-transitory computer-readable medium described herein may further include operations, features, means, or instructions for receiving an indication of one or more parameters associated with a channel state information report configuration, and transmitting the report based on the received indication of the one or more parameters.

In some examples of the method, apparatuses, and non-transitory computer-readable medium described herein, the one or more parameters include a sub-band size, a reporting band configuration, a demodulation reference signal field configuration indicating whether the report may be to include a field for reporting one or more demodulation reference signal configurations, a demodulation reference signal report configuration indicating whether the one or more demodulation reference signal configurations include one or both of the demodulation reference signal configuration for each of the one or more sub-bands or a wideband demodulation reference signal configuration, or any combination thereof.

Some examples of the method, apparatuses, and non-transitory computer-readable medium described herein may further include operations, features, means, or instructions for scaling the sub-band size by an integer factor, where a total quantity of the one or more sub-bands, an effective sub-band size of the one or more sub-bands, or both may be based on scaling the sub-band size by the integer factor.

Some examples of the method, apparatuses, and non-transitory computer-readable medium described herein may further include operations, features, means, or instructions for receiving, from the base station, an indication of the integer factor.

In some examples of the method, apparatuses, and non-transitory computer-readable medium described herein, the report may include operations, features, means, or instructions for receiving first scheduling information for transmitting a first report including an indication of a wideband demodulation reference signal configuration and one or more channel quality indicators associated with the one or more sub-bands, transmitting the first report based on the first scheduling information, and receiving second scheduling information for transmitting the second report, where transmitting the second report may be based on receiving the second scheduling information and transmitting the first report.

Some examples of the method, apparatuses, and non-transitory computer-readable medium described herein may further include operations, features, means, or instructions for receiving a configuration of the second report based on the one or more channel quality indicators.

In some examples of the method, apparatuses, and non-transitory computer-readable medium described herein, the one or more channel quality indicators include a set of channel quality indicators, and where the set of channel quality indicators may be associated with a set of sub-bands including the one or more sub-bands, and where the configuration of the second report indicates one or more sub-bands from the set of sub-bands based on the set of channel quality indicators of the first report, where transmitting the second report may be based on receiving the configuration of the second report, the second scheduling information, or both.

Some examples of the method, apparatuses, and non-transitory computer-readable medium described herein may further include operations, features, means, or instructions for determining that a set of channel state information reports may be to be multiplexed with each other on an uplink resource, where a channel state information report of the set includes a first part and a second part, where the first part or the second part includes the indication of the demodulation reference signal configuration for at least one of the one or more sub-bands and where the first part includes an indication of a wideband demodulation reference signal configuration for an entire reporting band, and identifying a set of priority rules for prioritizing the first part over the second part, where transmitting the indication of the demodulation reference signal configuration for each of the one or more sub-bands may be based on the set of priority rules.

In some examples of the method, apparatuses, and non-transitory computer-readable medium described herein, the channel state information report of the set includes at least one channel quality indicator associated with the at least one of the one or more sub-bands, and where the at least one channel quality indicator may have a priority higher than or equal to the indication of the demodulation reference signal configuration for the at least one of the one or more sub-band according to the set of priority rules.

Some examples of the method, apparatuses, and non-transitory computer-readable medium described herein may further include operations, features, means, or instructions for determining a channel quality indicator for each of the one or more sub-bands based on the selected demodulation reference signal configuration for each of the one or more sub-bands, and transmitting, to the base station, an indication of the channel quality indicator defined based on the selected demodulation reference signal configuration for each of the one or more sub-bands.

Some examples of the method, apparatuses, and non-transitory computer-readable medium described herein may further include operations, features, means, or instructions for receiving, from the base station, downlink control information including a bit indicating whether the demodulation reference signal configuration for each of the one or more sub-bands of a scheduled allocation of one or more physical resource groups may be the same as the demodulation reference signal configuration for each of the one or more sub-bands selected in a last delivered indication regarding the selected demodulation reference signal configurations.

In some examples of the method, apparatuses, and non-transitory computer-readable medium described herein, selecting the demodulation reference signal configuration for each of the one or more sub-bands may include operations, features, means, or instructions for determining a first value for the communication efficiency metric for a first sub-band based on a temporal density, a frequency density, a first power level for a first demodulation reference signal configuration relative to a second power level for a data transmission, and a second link quality characteristic for the first sub-band for the first demodulation reference signal configuration, determining, for each remaining demodulation reference signal configuration of the set of demodulation reference signal configurations for the first sub-band, a first set of values for the communication efficiency metric based on respective temporal densities, respective frequency densities, respective power levels relative to the second power level for the data transmission, and respective second link quality characteristics of each of the remaining demodulation reference signal configurations, determining the first value for the communication efficiency metric associated with the first demodulation reference signal configuration may be greater than the first set of values for the communication efficiency metric associated with each of the remaining demodulation reference signal configurations, and selecting the first demodulation reference signal configuration for the first sub-band.

Some examples of the method, apparatuses, and non-transitory computer-readable medium described herein may further include operations, features, means, or instructions for determining that a second value for the communication efficiency metric associated with a second demodulation reference signal configuration for a second sub-band may be greater than a second set of values for the communication efficiency metric associated with each of the remaining demodulation reference signal configurations for the second sub-band, and selecting the second demodulation reference signal configuration for the second sub-band.

Some examples of the method, apparatuses, and non-transitory computer-readable medium described herein may further include operations, features, means, or instructions for receiving a channel state information report configuration including an indication of one or more resources for transmitting the indication of the demodulation reference signal configuration for each of the one or more sub-bands coupled to or included in a channel state information report, where the one or more resources include one or more aperiodic resources, one or more periodic resources, or one or more semi-persistently scheduled resources, or any combination thereof.

In some examples of the method, apparatuses, and non-transitory computer-readable medium described herein, the indication of the demodulation reference signal configuration for each of the one or more sub-bands may be transmitted via an uplink shared channel or an uplink control channel with a long uplink control channel format.

In some examples of the method, apparatuses, and non-transitory computer-readable medium described herein, the one or more downlink reference signals include a channel state information (CSI) reference signal (CSI-RS), a tracking reference signal (TRS), or both.

A method of wireless communication is described. The method may include transmitting, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations, receiving, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands, selecting a different demodulation reference signal configuration of the set of demodulation reference signal configurations for each of the one or more sub-bands that are different than the first one or more demodulation reference signal configurations based on the indication of the second one or more demodulation reference signal configurations, and transmitting, to the user equipment, a second transmission that includes a second demodulation reference signal for each of the one or more sub-bands that are configured in accordance with the different demodulation reference signal configuration for each of the one or more sub-bands.

An apparatus for wireless communication is described. The apparatus may include a processor, memory coupled with the processor, and instructions stored in the memory. The instructions may be executable by the processor to cause the apparatus to transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations, receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands, select a different demodulation reference signal configuration of the set of demodulation reference signal configurations for each of the one or more sub-bands that are different than the first one or more demodulation reference signal configurations based on the indication of the second one or more demodulation reference signal configurations, and transmit, to the user equipment, a second transmission that includes a second demodulation reference signal for each of the one or more sub-bands that are configured in accordance with the different demodulation reference signal configuration for each of the one or more sub-bands.

Another apparatus for wireless communication is described. The apparatus may include means for transmitting, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations, receiving, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands, selecting a different demodulation reference signal configuration of the set of demodulation reference signal configurations for each of the one or more sub-bands that are different than the first one or more demodulation reference signal configurations based on the indication of the second one or more demodulation reference signal configurations, and transmitting, to the user equipment, a second transmission that includes a second demodulation reference signal for each of the one or more sub-bands that are configured in accordance with the different demodulation reference signal configuration for each of the one or more sub-bands.

A non-transitory computer-readable medium storing code for wireless communication is described. The code may include instructions executable by a processor to transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations, receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands, select a different demodulation reference signal configuration of the set of demodulation reference signal configurations for each of the one or more sub-bands that are different than the first one or more demodulation reference signal configurations based on the indication of the second one or more demodulation reference signal configurations, and transmit, to the user equipment, a second transmission that includes a second demodulation reference signal for each of the one or more sub-bands that are configured in accordance with the different demodulation reference signal configuration for each of the one or more sub-bands.

Some examples of the method, apparatuses, and non-transitory computer-readable medium described herein may further include operations, features, means, or instructions for transmitting the data transmission over the one or more sub-bands, where each sub-band of the one or more sub-bands may be associated with a different demodulation reference signal based on the different demodulation reference signal configurations for each of the one or more sub-bands.

In some examples of the method, apparatuses, and non-transitory computer-readable medium described herein, receiving the indication of the second one or more demodulation reference signal configurations may include operations, features, means, or instructions for receiving a report that.

In some examples of the method, apparatuses, and non-transitory computer-readable medium described herein, the report includes an indication of a wideband demodulation reference signal configuration.

In some examples of the method, apparatuses, and non-transitory computer-readable medium described herein, the report includes a wideband channel quality indicator associated with the wideband demodulation reference signal configuration and one or more sub-band channel quality indicators associated with the demodulation reference signal configuration for each of the one or more sub-bands.

In some examples of the method, apparatuses, and non-transitory computer-readable medium described herein, the indication of the wideband demodulation reference signal configuration includes an absolute index, and where each indication of the demodulation reference signal configuration for each of the one or more sub-bands includes a differential index whose value may be with reference to a value of the absolute index.

In some examples of the method, apparatuses, and non-transitory computer-readable medium described herein, the report may be coupled with a channel state feedback report or includes the channel state feedback report.

In some examples of the method, apparatuses, and non-transitory computer-readable medium described herein, the channel state feedback report includes a sub-band channel quality indicator, a wide-band channel quality indicator, a rank indicator, a wide-band precoding matrix indicator, a sub-band precoding matrix indicator, or a combination thereof.

Some examples of the method, apparatuses, and non-transitory computer-readable medium described herein may further include operations, features, means, or instructions for transmitting one or more parameters associated with a channel state information report configuration, and receiving the report based on the transmitted indication of the one or more parameters.

In some examples of the method, apparatuses, and non-transitory computer-readable medium described herein, the one or more parameters include a sub-band size, a reporting band configuration, a demodulation reference signal field configuration indicating whether the report may be to include a field for reporting one or more demodulation reference signal configurations, a demodulation reference signal report configuration indicating whether the one or more demodulation reference signal configurations include one or both of the demodulation reference signal configuration for each of the one or more sub-bands or a wideband demodulation reference signal configuration, or any combination thereof.

Some examples of the method, apparatuses, and non-transitory computer-readable medium described herein may further include operations, features, means, or instructions for transmitting, to the user equipment, an indication of an integer factor, where a total quantity of the one or more sub-bands, an effective sub-band size of the one or more sub-bands, or both may be based on the sub-band size and the integer factor.

In some examples of the method, apparatuses, and non-transitory computer-readable medium described herein, the report may include operations, features, means, or instructions for transmitting first scheduling information for transmitting a first report including an indication of a wideband demodulation reference signal configuration and one or more channel quality indicators associated with the one or more sub-bands, receiving the first report based on the first scheduling information, and transmitting second scheduling information for transmitting the second report, where receiving the second report may be based on transmitting the second scheduling information and receiving the first report.

Some examples of the method, apparatuses, and non-transitory computer-readable medium described herein may further include operations, features, means, or instructions for transmitting a configuration of the second report based on the one or more channel quality indicators.

In some examples of the method, apparatuses, and non-transitory computer-readable medium described herein, the one or more channel quality indicators include a set of channel quality indicators, and where the set of channel quality indicators may be associated with a set of sub-bands including the one or more sub-bands, and where the configuration of the second report indicates the one or more sub-bands from the set of sub-bands based on the set of channel quality indicators, where receiving the second report may be based on transmitting the configuration of the second report, the second scheduling information, or both.

Some examples of the method, apparatuses, and non-transitory computer-readable medium described herein may further include operations, features, means, or instructions for identifying a set of priority rules for prioritizing a first part of a channel state information report over a second part of the channel state information report, and receiving a set of channel state information reports multiplexed with each other on an uplink resource, where the set of channel state information reports includes the channel state information report, and where the first part or the second part of the channel state information report of the set includes the indication of the demodulation reference signal configuration for at least one of the one or more sub-bands based on the set of priority rules, and where the first part includes an indication of a wideband demodulation reference signal configuration for an entire reporting band.

In some examples of the method, apparatuses, and non-transitory computer-readable medium described herein, the channel state information report of the set includes at least one channel quality indicator associated with the at least one of the one or more sub-bands, and where the at least one channel quality indicator may have a priority higher than or equal to the indication of the demodulation reference signal configuration for the at least one of the one or more sub-band according to the set of priority rules.

Some examples of the method, apparatuses, and non-transitory computer-readable medium described herein may further include operations, features, means, or instructions for receiving, from the user equipment, a channel quality indicator for each of the one or more sub-bands.

Some examples of the method, apparatuses, and non-transitory computer-readable medium described herein may further include operations, features, means, or instructions for transmitting, to the user equipment, downlink control information including a bit indicating whether the demodulation reference signal configuration for each of the one or more sub-bands of a scheduled allocation of one or more physical resource groups may be the same as the demodulation reference signal configuration for each of the one or more sub-bands delivered by the user equipment in a last indication regarding the selected demodulation reference signal configurations.

Some examples of the method, apparatuses, and non-transitory computer-readable medium described herein may further include operations, features, means, or instructions for transmitting a channel state information report configuration including an indication of one or more resources for transmitting the indication of the demodulation reference signal configuration for each of the one or more sub-bands, where the one or more resources include one or more aperiodic resources, one or more periodic resources, or one or more semi-persistently scheduled resources, or any combination thereof.

In some examples of the method, apparatuses, and non-transitory computer-readable medium described herein, the indication of the demodulation reference signal configuration for each of the one or more sub-bands may be received via an uplink shared channel or an uplink control channel with a long uplink control channel format.

Some examples of the method, apparatuses, and non-transitory computer-readable medium described herein may further include operations, features, means, or instructions for receiving an indication of one or more channel quality indicators associated with the one or more sub-bands, determining that an allocation size may be below a threshold, and determining a set of resource blocks based on the allocation size being below the threshold and the one or more channel quality indicators associated with the one or more sub-bands, where transmitting, to the user equipment, the second transmission including the second demodulation reference signal for each of the one or more sub-bands may be according to the set of resource blocks and based on receiving the demodulation reference signal configuration for each of the one or more sub-bands.

Some examples of the method, apparatuses, and non-transitory computer-readable medium described herein may further include operations, features, means, or instructions for pairing the user equipment with a second user equipment in a same multiple-user multiple-input-multiple-output co-scheduling group based on receiving the indication of the demodulation reference signal configuration for each of the one or more sub-bands.

Some examples of the method, apparatuses, and non-transitory computer-readable medium described herein may further include operations, features, means, or instructions for determining a demodulation reference signal density associated with the user equipment based on receiving the indication of the second one or more demodulation reference signal configurations, where pairing the user equipment with the second user equipment may be based on the determined demodulation reference signal density.

DETAILED DESCRIPTION

Figure 1:
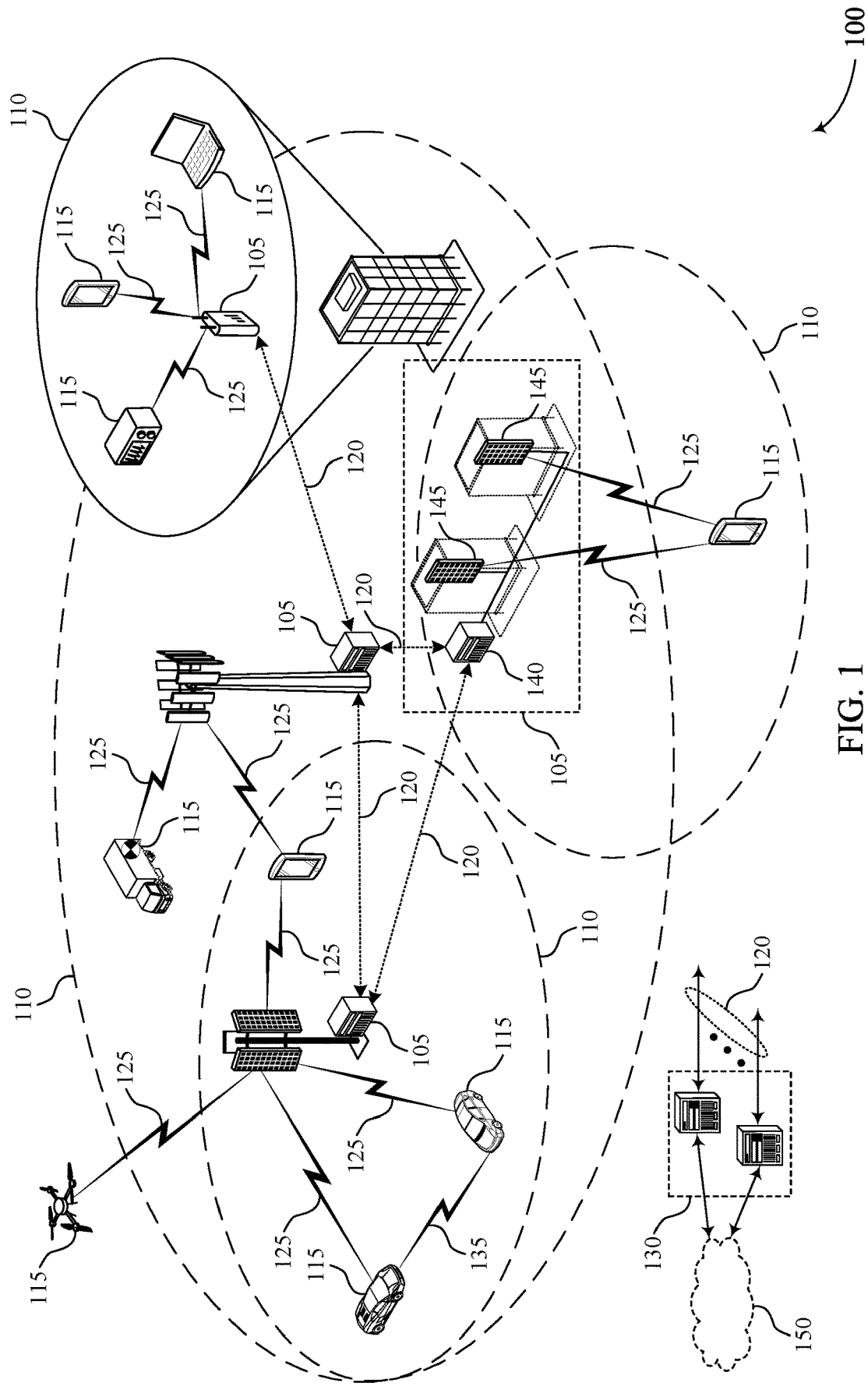
FIG. 1 illustrates an example of a wireless communications system that supports demodulation reference signal configuration selection and reporting per sub-band in accordance with aspects of the present disclosure.

Reference signals may be used to determine measurements for and an estimate of a channel to maintain a reliable and efficient link between wireless devices. For example, a channel state information reference signal (CSI-RS) may be used to adapt transmission parameters. Additionally, a demodulation reference signal (DMRS) may be used to determine an estimate of a data channel (e.g., a physical downlink/uplink shared channel (PDSCH/PUSCH)) and to assist in the demodulation and decoding of signals received over the data channel.

A DMRS configuration used by a wireless device may be determined based on radio resource control (RRC) signaling. In some cases, however, communication parameters that are established using RRC procedures may become suboptimal or inconvenient (e.g., may decrease the efficiency of communications) after some changes in channel and reception conditions. For instance, RRC re-configuration procedures may be unable to adopt DMRS configuration "on the fly." For example, RRC reconfiguration procedures may be non-synchronous and associated with high latency. Thus, signaling a DMRS configuration to a wireless device in accordance with RRC procedures may result in an unstable or unreliable communications link and, in some cases, a loss of connectivity.

Further, unstable or unreliable communications links may be associated with or may otherwise result in lower spectral efficiency of the communication links. Spectral efficiency of a link may be associated with a measure of achievable throughput of the communication link using an allocation of resources. For example, a wireless device may determine the spectral efficiency of the communication link based on determining a ratio between communication resources that are allocated to data signaling and communication resources that are allocated to control/management signaling and based on determining the efficiency of the transmission on data resources. In cases in which a loss of connectivity is likely (e.g., a UE or base station has detected channel conditions or signal characteristics indicating that satisfy a threshold amount associated with an increased chance of loss of connectivity), more communication resources may be allocated to control or management signaling and less communication resources may be allocated for data signaling, which may reduce the spectral efficiency of the communication link.

Spectral efficiency may depend on selected transmission parameters, a channel, a signal-to-noise ratio (SNR), and a pilot configuration used for channel estimation. In some cases, changes in channel conditions that occur after the DMRS configuration is signaled may cause a configured DMRS configuration to use excessive resources without providing any increase in spectral efficiency or link efficiency associated with communications to a wireless device. In some other cases, a change in channel conditions may cause a selected DMRS configuration to use insufficient resources for optimizing spectral efficiency or link efficiency associated with communications to a wireless device. Moreover, selecting a single DMRS configuration for each sub-band may be sub-optimal. For example, the spectral efficiency or link efficiency associated with a DMRS configuration may be based on one or more link quality characteristics, such as a signal-to-interference-plus-noise ratio (SINR), which may vary across different sub-bands.

To increase a spectral efficiency associated with a communications link, preferred DMRS configurations may be identified by a wireless device and signaled to a scheduling node (e.g., a transmitting device, such as a base station) to adapt to short-term changes in channel and reception conditions. In some examples, a wireless device, such as a user equipment (UE), may use a CSI-RS to determine a set of characteristics and a link quality characteristic (e.g., SINR, such as post-processing SINR) for a channel. The wireless device may use the determined set of channel characteristics and the estimated link quality characteristic to estimate multiple equivalent link quality characteristics that correspond to multiple tested DMRS configurations for each sub-band of one or more sub-bands associated with a data channel. The wireless device may then use the estimated equivalent link quality characteristics to identify a DMRS configuration of the multiple DMRS configurations for subsequent communications for each of one or more sub-bands. For example, the wireless device may select a DMRS configuration for a sub-band based on determining that a spectral efficiency for the sub-band achievable with the specific DMRS configuration is higher than a spectral efficiency achievable with the other DMRS configurations for the sub-band. The wireless device may indicate the identified DMRS configurations (one DMRS configuration for each of the one or more sub-bands) to a scheduling node. The scheduling node may select a DMRS configuration for each sub-band for subsequent transmissions to the wireless device based on the indicated DMRS configurations. For example, the scheduling node may select the indicated DMRS configurations or select DMRS configurations related to the indicated DMRS configurations based on network scheduling criteria. By adaptively selecting different DMRS configurations for each sub-band based on DMRS configurations indicated by a wireless device, the communication link between the scheduling node and the wireless device may achieve a greater spectral efficiency.

Aspects of the disclosure are initially described in the context of a wireless communications systems. Additional aspects of the disclosure are described in the context of a collection of operations and a process flow. Aspects of the disclosure are further illustrated by and described with reference to apparatus diagrams, system diagrams, and flowcharts that relate to demodulation reference signal configuration selection and reporting per sub-band.

FIG. 1 illustrates an example of a wireless communications system 100 that supports demodulation reference signal configuration selection and reporting per sub-band in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or at least one resource block (RB)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

A wireless communications system 100 may support the allocation of portions of wireless spectrum (e.g., communication resources) to wireless devices. The wireless spectrum may be partitioned into resource elements (k), where a resource element may be the smallest defined unit of a communication resource—a resource element may span one subcarrier (e.g., may span 12 kHz) and one symbol (e.g., may span 66.7 µs). A communication resource may include a set of resource elements.

A wireless communications system 100 may support the transmission of multiple sets of data using a common communication resource—e.g., by using multiple spatial streams (l). By communicating multiple sets of data using a common communication resource, a throughput of a wireless communications system 100 may be increased.

A wireless communications system 100 may support the transmission of reference signals to increase an efficiency and a reliability of communications between wireless devices (e.g., a base station 105 and a UE 115). Reference signals may be transmitted from a base station 105 to a UE 115, and vice versa. Reference signals transmitted to a UE 115 may be referred to as downlink reference signals and reference signals transmitted to a base station 105 may be referred to as uplink reference signals. Reference signals may be used by the wireless devices to determine characteristics of a channel. The characteristics of a channel may also be referred to as a channel estimate, channel conditions, or channel metrics. Reference signals may include CSI-RS, downlink (DL) DMRS, uplink (UL) DMRS, sounding reference signal (SRS), tracking reference signal (TRS), and phase tracking reference signal (PTRS).

A CSI-RS transmission may be used by a UE 115 to determine a channel estimate that is used to assist in link adaptation. For example, a UE 115 may use a CSI-RS transmission to assist in the adaptation of transmission parameters to maintain a reliable communication link between the UE 115 layer and a base station 105. The channel estimate may be used to determine a signal quality ratio, such as a post-processing SNR or a post-processing SINR, for the channel, a delay spread ($\tau_{rms}$) for the channel/a classification of the channel (or channel type), a precoding matrix to use for communications over the channel, a rank to use for communications over the channel, or any combination thereof. A DL DMRS transmission may also be used by a UE 115 to determine a data channel estimate that may be used to demodulate and decode transmissions received in a data channel. The channel estimate determined using the CSI-RS transmission may be different than the channel estimate determined using the DL DMRS transmission. Thus, a DL DMRS may be transmitted using resources that are associated with data resources allocated to a UE 115. A TRS transmission may be used by a UE 115 for synchronization loops and for determination of mid and long-term characteristics of a channel, such as a Doppler frequency, delay spread, and power delay profile.

An UL DMRS may be used by a base station 105 to determine a channel estimate for an uplink channel between the base station and a UE 115 that transmitted the UL DMRS (e.g., so the base station 105 may perform coherent demodulation of the physical uplink control channel (PUCCH) and the physical uplink shared channel (PUSCH)). For example, each scheduled PUCCH and PUSCH may have its own DMRS, which may assist the base station 105 with demodulation and decoding. The UL SRS may be used by a base station 105 for uplink link adaption, uplink transmission parameter selection, and uplink measurements, among other uses. In some examples, an UL SRS may be used by a base station 105 to determine the uplink channel quality over a wide bandwidth so that the base station 105 can perform frequency-selective scheduling for the UE 115 that transmitted the UL SRS.

A reference signal may be transmitted over communication resources in accordance with a reference signal configuration. A reference signal configuration may indicate which resource elements are allocated to a reference signal transmission. In some cases, a resource element allocated to a transmission of a reference signal may be referred to as a pilot resource element. A group of resource elements (e.g., contiguous resource elements) within a symbol period allocated to a transmission of a reference signal may be referred to as a pilot symbol. In some cases, a reference signal configuration indicates a temporal spacing ($D_t$) between resource elements allocated to a reference signal; a frequency spacing ($D_f$) between resource elements allocated to a reference signal; and a power boosting parameter ($\rho_p$) that indicates a power for transmitting the reference signal resource element relative to a power for transmitting a data resource element. Different reference signal configurations may be associated with different combinations of temporal spacing, frequency spacing, and power boosting. For example, a first reference signal configuration may be associated with a first temporal spacing, a first frequency spacing, and a first power boosting and a second reference signal configuration may be associated with the first temporal spacing, the first frequency spacing, and a second power boosting, and so on.

A base station 105 may determine configurations for the different reference signals. In some cases, a base station 105 determines a DL or UL DMRS configuration for a UE 115 by selecting the DMRS configuration from a limited set of DMRS configurations. The base station 105 may then signal the selected DMRS configuration to a UE 115 using RRC signaling.

A wireless communications system 100 may increase a reliability and/or an efficiency of communications between wireless devices (e.g., a base station 105 and a UE 115) by avoiding transmissions over particular resources. For example some resources may be left unused for one or more purposes relating to increasing the reliability and/or the efficiency of communications between the wireless devices. In some cases, resources that are left unused may be referred to as interference management resources. Interference management resources may be used by wireless devices to determine interference and noise characteristics of a channel and to assist in deriving post-processing channel quality estimations using reference signals.

CSI-IM resources may be configured to enable a UE 115 to measure interference caused by neighboring cells to data resources of a serving cell. CSI-IM resources may be used by a UE 115 to determine a noise covariance matrix estimate for a channel ($R_{nn}$). A UE 115 may use the noise estimate to obtain a refined channel estimate that takes in account noise observed on the channel. CSI-IM resources may also be used to determine a noise variance factor ($\tilde{\sigma}_{IM}^2$). In some cases, CSI-IM resources may be coupled with CSI-RS transmissions. For example, CSI-IM resource elements may be allocated with reference to (e.g., to supplement) allocated CSI-RS resource elements. Thus, CSI-RS and CSI-IM resource may be used together to determine a channel estimate and the corresponding post-processing signal quality ratio.

A UE 115 may use demodulation reference signals to determine a signal quality ratio for a data channel. In some cases, a UE 115 may use a minimum mean squared error (MMSE) equalization or linear MMSE (LMMSE) filtering approach to obtain post-processing SINR for a channel. An MMSE approach may include estimating post-processing SINR for each resource element k of each involved spatial stream l, which may also be referred to as a layer or spatial layer as described herein. For example, for each spatial stream l and resource element k included in a communication resource, post-processing SINR ($\gamma_l(k)_{DMRS}$) obtained using DMRS based channel estimation may be formulated based on Equation 1:

$$\gamma_l(k)_{DMRS} = \frac{1}{(\sigma_n^2 + \sigma_{ICI}^2 + \sigma_e^2) \cdot \left[ \left( \hat{H}_{eff}^H(k) \hat{H}_{eff}(k) + (\sigma_n^2 + \sigma_{ICI}^2 + \sigma_e^2) \cdot I \right)^{-1} \right]_{l,l}} - 1$$

$$\hat{H}_{eff}(k) = \hat{H}(k) \cdot P$$

$$\sigma_e^2 = f(\tau_{rms}, f_{D\_max}, D_t, D_f, SNR(\rho_p))$$

where $\sigma_n^2$ may be thermal noise variance; $\sigma_{ICI}^2$ may be inter-carrier interference variance; $\sigma_e^2$ may be channel estimation error variance, and $\hat{H}_{eff}(k)$ may be an effective estimated channel matrix. The channel estimation error variance may be determined to accommodate for noise that is received with and inseparable from a reference signal, modelling errors, and algorithmic limitations. Also, P may be a precoding matrix and $\hat{H}(k)$ may be an estimated channel matrix. Moreover, $\tau_{rms}$ may be a delay spread for the channel and $f_{D\_max}$ may be a Doppler frequency for the channel. Additionally, $D_t$ may be a temporal spacing between resource elements used for the demodulation reference signal; $D_f$ may be a frequency spacing between resource element used for the demodulation reference signal; and $\rho_p$ may be a power level used to transmit the reference signal resource elements relative to a power level used to transmit data resource elements. The term SNR($\rho_p$) may be an input SNR on the pilot resource elements used for a demodulation reference signal and may be a function of $\rho_p$.

In some cases, the UE 115 may determine an average post-processing SINR for each spatial stream l by averaging, for a spatial stream l, the post-processing SINRs determined across the resource elements k. In some other cases, the UE 115 may determine an average post-processing SINR for each subband for each spatial stream l by averaging, for a subband and a spatial stream l, the post-processing SINRs determined across the resource elements k of the subband. In either case, the average post-processing SINR for a DMRS may be referred to as $\bar{\gamma}_{l_{DMRS}}$. In some examples, the UE 115 may use Equation 1 to determine a post-processing SINR for a channel using a DMRS, in which case $\gamma_l(k)_{RS}$ may be represented as $\gamma_l(k)_{DMRS}$. In some cases, a post-processing SINR for a channel may be dependent on a configuration of a DMRS. For example, a post-processing SINR for a channel may be increased/decreased depending on the portion of the channel estimation error which depends on the combination of the channel characteristics and pilot configuration used for channel estimation. A base station 105 may similarly use Equation 1 to determine a per resource element post-processing SINR and average post-processing SINR using an uplink reference signal.

Additionally, or alternatively, a UE 115 may determine a post-processing signal quality ratio for a channel based on the channel characteristics determined using the CSI-RS and CSI-IM resources with noise estimation that is free of channel estimation error component $\sigma_e^2$ (e.g., because the noise measured using the interference management resources may be isolated from the reference signal). That is, the noise component $(\sigma_n^2 + \sigma_{ICI}^2 + \sigma_e^2)$ can be replaced with the noise variance $\tilde{\sigma}_{IM}^2$ measured using an interference management resource, where $\tilde{\sigma}_{IM}^2 \triangleq \sigma_n^2 + \sigma_{ICI}^2$. For example, for a spatial stream l and a resource element k, a post-processing SINR $(\gamma'_l(k)_{CSI-RS})$ may be determined using a reference signal based on Equation 2:

$$\gamma'_l = \frac{1}{\tilde{\sigma}_{IM}^2 \cdot \left[\left(\hat{H}_{eff}^H(k)\hat{H}_{eff}(k) + (\tilde{\sigma}_{IM}^2)I\right)^{-1}\right]_{l,l}} - 1$$

The UE 115 may determine an average post-processing SINR for each spatial stream l by averaging the post-processing SINRs determined for each resource element k. In some cases, an average post-processing SINR may be calculated across all resource elements k of a wideband. In some other cases, an average post-processing SINR may be calculated across the resource elements k per subband. The average post-processing SINR may be referred to as $\overline{\gamma}'_l(k)_{CSI-RS}$.

The post-processing SINR calculated based on Equation 2 and the actual post-processing SINR that is expected in case of PDSCH (defined analytically for the sake of the explanation based on Equation 1) may be different from one another. In some cases, the post-processing SINR representative for PDSCH (which may be represented by the variable $\gamma_{DMRS}$) and that is expected to be obtained using DMRS based channel estimation and the post-processing SINR calculated based on Equation 2 (which may be represented by the variable $\gamma_{CSI-RS}$) may be determined based on a CSI-RS and CSI-IM resources. The $\gamma_{DMRS}$ may be an actual representative of channel conditions for data resources allocated to a UE 115 while the $\gamma_{CSI-RS}$ may be an estimate (or projection) of channel conditions for the data resources based on CSI-RS and CSI-IM resources. The expected difference between $\gamma_{CSI-RS}$ and $\gamma_{DMRS}$ can be defined/learned per channel characteristics set and per given reception conditions and may later be used to estimate an $\gamma_{DMRS}$ based on applying an adjustment to a calculated $\gamma_{CSI-RS}$. Additionally, in some cases, the expected difference can be defined/learned for each subband. In some cases, the difference between the $\gamma_{DMRS}$ and the $\gamma_{CSI-RS}$ may be non-linear, and $\gamma_{DMRS}$ may be determined using a non-linear function (e.g., $\gamma_{DMRS} = f(\gamma_{CSI-RS})$). A UE 115 may determine a set of mapping functions/average differences between calculated post-processing SINR values for CSI-RS ($\gamma_{CSI-RS}$) and measured or calculated post-processing SINR values for DMRSs ($\gamma_{DMRS}$) for different combinations of CSI-RS and DMRS configurations. Thus, a difference provided by a corresponding mapping function between a $\gamma_{DMRS}$ and a $\gamma_{CSI-RS}$ may be based on a configuration of a DMRS and a configuration of a CSI-RS and defined per channel characteristics set and per given input/thermal SNR.

A wireless communications system 100 may also support the reporting of information about a channel determined using reference signals. A UE 115 may use CSI-RS to determine optimal/preferred transmission parameters for a channel, such as a preferred precoding matrix, rank, and modulation coding scheme (MCS). The UE 115 may determine a preferred transmission parameter based on determining that a transmission parameter will maximize a channel metric (e.g., a spectral efficiency metric) and/or based on a post-processing signal quality ratio (e.g., a post-processing SINR) for a channel. The UE 115 may indicate the preferred reception parameters to a base station 105 in a channel state feedback (CSF) report (which may also be referred to as a channel state information (CSI) report) that may have different formats and may include a precoding matrix indicator (PMI) field that conveys a PMI, a rank indicator (RI) field that conveys a rank, and a channel quality indicator (CQI) field that conveys a CQI. The base station 105 may use the PMI and RI to determine a precoding matrix and rank to use for subsequent transmissions and the CQI to determine an MCS for subsequent transmission.

In some examples, a UE 115 may perform per-subband CSF reporting (e.g., configured via a ReportFreqConfiguration). Table 1 demonstrates an example of sub-band size options:

TABLE 1

| Carrier BWP (Physical resource blocks (PRB)) | Sub-band Size (PRBs) |
| --- | --- |
| <24 | N/A |
| 24-72 | 4, 8 |
| 73-144 | 8, 16 |
| 145-275 | 16, 32 |

In some examples, the UE 115 may be configured with one out of two possible sub-band sizes, as demonstrated in Table 3. In some examples, the CSI reporting band may be configured as a subset of sub-bands (contiguous or non-contiguous) of the respective BWP. In such cases, a single CQI (e.g., a wideband CQI) or multiple CQIs (e.g., per codeword per each sub-band) may be transmitted in the sub-band report. Additionally or alternatively, a single PMI (e.g., a wideband PMI) or multiple PMIs (e.g., per sub-band) may be transmitted in the reporting band.

In some examples, a UE 115 may perform per-subband CQI reporting. Table 2 demonstrates an example:

TABLE 2

| Spatial differential CQI value | Offset Level |
| --- | --- |
| 0 | 0 |
| 1 | 1 |
| 2 | ≥2 |
| 3 | ≤−1 |

Table 2 may represent spatial differential CQI values relative to a corresponding wideband CQI in a case where there is 2-bit differential CQI reporting for per-sub-band reporting. The wideband CQI, meanwhile, may have 4-bits for reporting. The offset levels in Table 2 may represent an offset relative to the wideband CQI. For instance, if the wideband CQI and a sub-band CQI are equal, a UE 115 may report differential CQI value 0; if the sub-band CQI is one greater than the absolute CQI, the UE 115 may report differential CQI value 1; if the sub-band CQI is two or more greater than the absolute CQI, the UE 115 may report differential CQI value 2; and if the sub-band CQI is minus one or less than the absolute CQI, the UE 115 may report differential CQI value 3.

To determine a value for a CQI, the UE 115 may use a post-processing SINR value or an estimated spectral efficiency evaluated using a CSI-RS ($\gamma_{CSI-RS}$). In some cases, to determine a CQI that is more representative of channel conditions and more convenient for a data channel, the UE 115 may estimate a post-processing SINR value for a DMRS configuration that is currently configured ($\gamma_{DMRS}$). The post-processing SINR value for $\gamma_{DMRS}$ may be derived from the $\gamma_{CSI-RS}$ and the corresponding mapping trained numerically for CSI-RS and DMRS configuration combination and per channel characteristics set. The UE 115 may use the estimated post-processing SINR value ($\gamma_{DMRS}$) to determine a value for the CQI. In some cases, to determine the estimated $\gamma_{DMRS}$, the UE 115 may determine a configuration used for a received CSI-RS and a configuration that is currently configured for a DMRS. The UE 115 may then identify an average difference between post-processing SINRs calculated using CSI-RSs of the CSI-RS configuration and DMRSs of the DMRS configuration. The UE 115 may use the identified average difference/mapping to obtain an estimated $\gamma_{DMRS}$ for the current DMRS configuration (e.g., by adding the average difference/or applying a mapping function to the calculated $\gamma_{CSI-RS}$). A base station 105 may use the reported CSI to adapt transmission parameters to better suit a channel. For example, a base station 105 may adapt transmission parameters by using an indicated precoding matrix and rank and using an MCS that corresponds to the CQI value.

As described herein, reference signals may be used to determine measurements for and an estimate of a channel to maintain a reliable and efficient link between wireless devices (e.g., a base station 105 and UE 115). For example, a channel state information reference signal (CSI-RS) may be used to adapt transmission parameters. Additionally, a demodulation reference signal (DMRS) may be used to determine an estimate of a data channel (e.g., a physical downlink shared channel (PDSCH)) and to assist in the demodulation and decoding of signals received over the data channel.

A DMRS configuration used by a UE 115 may be determined based on RRC signaling. However, in some examples, communication parameters that are established using RRC procedures may not be adaptable to changes in channel and reception conditions (e.g., because RRC reconfiguration procedures are non-synchronous and associated with high latency). Thus, signaling a DMRS configuration to a UE 115 in accordance with RRC procedures may result in an unstable or unreliable communications link and, in some cases, a loss of connectivity. Spectral efficiency may be a measure of throughput that can be conveyed by the link using the allocated resources (e.g., based among the rest on determining a ratio between communication resources that are allocated to data signaling and communication resources that are allocated to control/management signaling). Spectral efficiency on data resource elements may depend on selected transmission parameters, a channel, a signal to noise ratio, and a pilot configuration used for channel estimation. In some cases, changes in channel conditions that occur after the DMRS configuration is signaled cause a selected DMRS configuration to use excessive resources without providing any increase in a spectral efficiency or link efficiency of communications to a UE 115. In some other cases, a change in channel conditions may cause a selected DMRS configuration to use insufficient resources for optimizing link efficiency in communications to a UE 115. Further, a single DMRS configuration for each sub-band may result in sub-optimal spectral efficiency and achievable throughput. For example, each sub-band may be associated with a different post-processing SINR and the performance corresponding to a DMRS configuration may vary over different post-processing SINR scenarios. For instance, a DMRS configuration may result in high spectral efficiency and higher achievable throughput for a first sub-band associated with a first post-processing SINR and may result in lower (or sub-optimal) spectral efficiency and lower achievable throughput for a second sub-band associated with a second post-processing SINR.

To increase a spectral efficiency of a communications link, preferred DMRS configurations may be identified by a UE 115 and signaled to a base station 105 to adapt to short-term changes in channel and reception conditions. In some examples, a wireless device may use a CSI-RS to determine a set of characteristics and to estimate a link quality characteristic, such as a post-processing SINR, for a channel. The UE 115 may use the determined set of channel characteristics and the estimated link quality characteristic to estimate multiple equivalent link quality characteristics that correspond to multiple tested DMRS configurations for each sub-band associated with a transmission over the channel. In some implementations of the present disclosure, the UE 115 may use the estimated equivalent link quality characteristics to select a different and a most convenient DMRS configuration of the multiple DMRS configurations for subsequent communications for each sub-band associated with a transmission of the channel.

In some examples, the UE 115 may identify or otherwise select the DMRS configuration of the multiple DMRS configurations for each sub-band based on determining that a spectral efficiency achievable with the DMRS configuration is greater than a spectral efficiency obtained with the other DMRS configurations for that sub-band. The UE 115 may indicate the identified DMRS configurations (e.g., one DMRS configuration for each sub-band associated with a transmission over the channel) to a scheduling node, such as a base station 105. The base station 105 may select a DMRS configuration for subsequent transmissions to the wireless device for each sub-band based on the indicated DMRS configurations. For example, the base station 105 may select the indicated DMRS configurations or related DMRS configurations based on network scheduling criteria. By adaptively selecting DMRS configurations based on DMRS configurations indicated by a UE 115, a spectral efficiency of a link will be increased. Moreover, based on identifying a DMRS configuration for each sub-band, the UE 115 may increase the spectral efficiency of the link more than the UE 115 would have otherwise increased the spectral efficiency of the link using a single DMRS configuration. For example, the UE 115 may select a different DMRS configuration for each sub-band based on the post-processing SINR associated with the sub-band, which may result in a more optimal spectral efficiency and achievable throughput in case that there is a variation in post-processing SINR across the sub-bands associated with a transmission over the channel.

In some examples, a base station 105 may dynamically select an uplink DMRS configuration that increases spectral efficiency of the link. For example, the base station 105 may use the parameters of one or more uplink reference signals (e.g., DMRS, SRS) and a set of channel characteristics (e.g., Doppler frequency $f_{D\_max}$, delay spread $\tau_{rms}$, SNR) to estimate multiple link quality characteristics (e.g., multiple SINRs) that correspond to multiple uplink DMRS configurations. The base station 105 may use the estimated signal quality characteristics to identify an UL DMRS configuration of the multiple UL DMRS configurations for subsequent communications for each of the one or more sub-bands. For example, the base station 105 may select an UL DMRS configuration for each of the one or more sub-bands based on determining that a spectral efficiency of the link achievable with an UL DMRS configuration for a sub-band is higher than a spectral efficiency achievable with the other UL DMRS configurations for that sub-band.

However, a base station 105 may not be able to reliably determine the Doppler frequency for the uplink channel, which may prevent the base station 105 from properly selecting a convenient DMRS configuration (e.g., because the SINR values ($\gamma_{DMRS}$) used to select the DMRS configuration are a function of the channel estimation error variance $\sigma_e^2$, which in turn is a function of the Doppler frequency $f_{D\_max}$, as shown in Equation 1). In one example, the base station 105 may estimate the uplink Doppler frequency by measuring repetitions of existing uplink reference signals (e.g., DMRS, SRS) from a UE 115. But the repetitions of these reference signals may be improperly spaced for Doppler frequency estimation, which may result in an inaccurate Doppler frequency estimation that negatively impacts the selection of an UL DMRS configuration.

To more accurately estimate the uplink Doppler frequency, a base station 105 may configure an SRS with a repetition spacing that is appropriate for reliable Doppler frequency estimation given the deployment scenario. Because appropriate repetition spacing is important for reliable Doppler estimation, a base station 105 may select the repetition spacing for a UE 115 based on the subcarrier spacing and carrier frequency configured for the UE 115. Thus, the base station 105 may enable proper selection of an appropriate DMRS configuration that allows an increase in (or maximization of) the spectral efficiency of the link.

Alternatively, the base station 105 may estimate the uplink Doppler frequency by equating it with the downlink Doppler frequency reported by a UE 115. For example, the base station 105 may determine that there are sufficient conditions to assume channel Doppler reciprocity (e.g., which may therefore justify an assumption that the uplink Doppler frequency is equal to the downlink Doppler frequency). The downlink Doppler frequency may be determined by the UE 115 based on measurements of a downlink reference signal (e.g., a TRS) transmitted by the base station 105. Thus, the base station 105 may enable selection of an appropriate DMRS configuration that allows an increase in the spectral efficiency of a link by using the reported downlink Doppler frequency as an estimate for the uplink Doppler frequency for calculations related to UL DMRS configuration selection.

Generally, the techniques described herein may provide for selecting a DMRS configuration for each of one or more sub-bands associated with a data channel. For example, a UE 115 may determine a set of channel characteristics and a first link quality characteristic for each sub-band of one or more sub-bands associated with a channel based on one or more downlink reference signals or a channel state information interference management (CSI-IM) resource, or both. The UE 115 may identify, on the set of channel characteristics and the first link quality characteristic, a set of link quality characteristics for each sub-band of the one or more sub-bands, the set of link quality characteristics for each sub-band of the one or more sub-bands corresponding to a set of demodulation reference signal configurations. The UE 115 may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands. The UE 115 may transmit, to the base station, an indication of the demodulation reference signal configuration for each of the one or more sub-bands.

Additionally or alternatively, a base station 105 may transmit, to a UE 115, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations. The base station 105 may receive, from the UE 115, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands. The base station 105 may select a different demodulation reference signal configuration of the set of demodulation reference signal configurations for each of the one or more sub-bands that are different than the first one or more demodulation reference signal configurations based on the indication of the second one or more demodulation reference signal configurations. The base station 105 may transmit, to the UE 115, a second transmission that includes a second demodulation reference signal for each of the one or more sub-bands that are configured in accordance with the different demodulation reference signal configuration for each of the one or more sub-bands.

Figure 2:
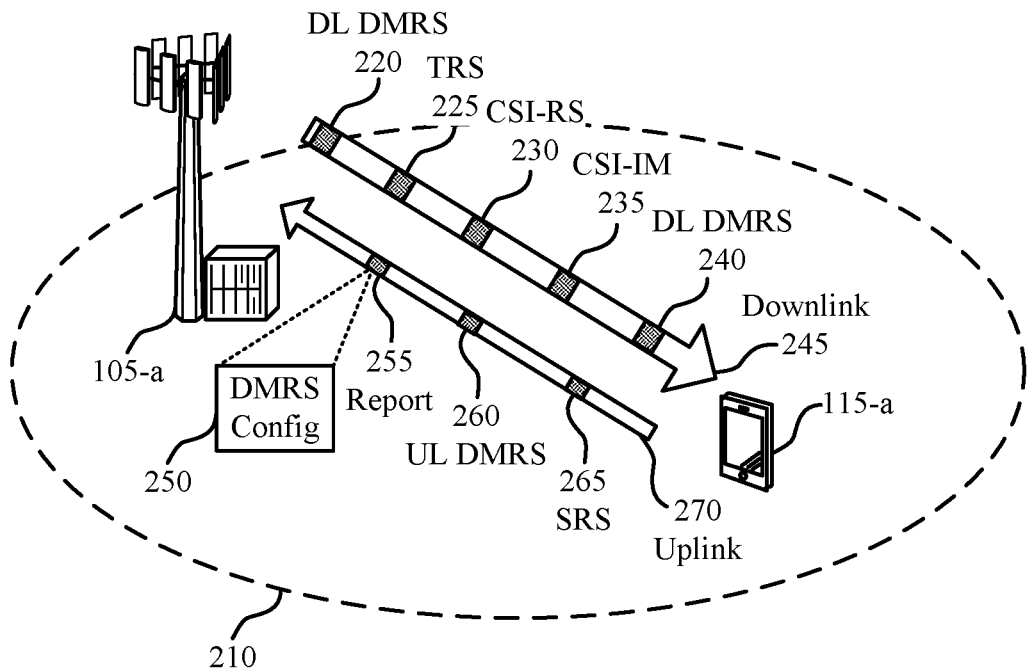
FIG. 2 illustrates an example of a wireless communications system that supports demodulation reference signal configuration selection and reporting per sub-band in accordance with aspects of the present disclosure.

FIG. 2 illustrates an example of a wireless communications system 200 that supports demodulation reference signal configuration selection and reporting per sub-band in accordance with aspects of the present disclosure. In some examples, wireless communications system 200 may implement aspects of wireless communications system 100. Wireless communications system 200 may include base station 105-a and UE 115-a which may be examples of a base station or UE described with reference to FIG. 1. Base station 105-a and UE 115-a may communicate with one another over downlink 245 and uplink 270 within coverage area 210, as described with reference to FIG. 1.

A DMRS configuration used by a UE 115-a may be determined based on RRC signaling. In some examples, the UE 115-a may be RRC configured with a fixed pilot pattern for a DMRS that is based on a DMRS type and a number of DMRS positions. A DMRS spacing in time may be based on predetermined DMRS locations for a combination of a PDSCH mapping type and a PDSCH symbol duration (which may be signaled in downlink control information (DCI)). An accuracy of a channel estimate may depend on a level of correlation of a channel in time and frequency, input SNR on DMRS resource elements and DMRS configuration/pattern. Channel parameters and SNR conditions may be different for different UEs and may also vary in time. Thus, different DMRS configurations may be used to increase (e.g., maximize) a spectral efficiency of a link for different channel and SNR conditions. However, communication parameters that are established using RRC procedures may become sub-optimal or inconvenient (e.g., may decrease the efficiency of communications) after some changes in channel and reception conditions. For instance, RRC re-configuration procedures may be unable to adopt DMRS configuration "on the fly." That is, establishing a DMRS configuration using RRC procedures, may cause an excessive number of pilots to be used or an insufficient number of pilots to be used for different reception scenarios and different time periods.

To increase a spectral efficiency of a communications link, preferred DMRS configurations may be identified by a UE 115-*a* and reported to the network. Further, the UE 115-*a* may identify a DMRS configuration for each of one or more sub-bands associated with a transmission from a base station 105-*a*. For example, each sub-band may be associated with different post-processing SINRs. In some cases, different post-processing SINRs may result in variable and, in some SINR regions, sub-optimal performance (e.g., sub-optimal spectral efficiency) when a single DMRS configuration is used. For example, a first DMRS configuration may be associated with a relatively higher spectral efficiency for a first SINR region and a relatively lower spectral efficiency for a second SINR region, where an SINR region may refer to some range of SINR values. On the contrary, a second DMRS configuration may be associated with a relatively lower spectral efficiency for the first SINR region and a relatively higher spectral efficiency for the second region. As such, the UE 115-*a* may select a DMRS configuration for each of sub-band to achieve an optimal spectral efficiency for each of the one or more sub-bands based on the post-processing SINR associated with each sub-band. For instance, the UE 115-*a* may determine an effective spectral efficiency as a joint parameter for a sub-band based on the post-processing SINR associated with each sub-band and may determine a DMRS configuration for the sub-band based on the effective spectral efficiency. For example, the UE 115-*a* may select the first DMRS configuration for a first sub-band having an SINR in the first SINR region and may select the second DMRS configuration for a second sub-band having an SINR in the second SINR region. The base station 105-*a* may use the reported DMRS configurations to select DMRS configurations (e.g. one DMRS configuration for each sub-band) for the UE 115-*a*.

An offline numerical training procedure may be performed to generate, for UE 115-*a*, one or more mappings that indicate previously determined differences (e.g., average differences) in values measured for a link quality characteristic (e.g., spectral efficiency or post-processing SINR) determined using CSI-RS transmissions and in values measured for the link quality characteristic determined using DL DMRS transmissions having different configurations. The one or more mappings may include mappings corresponding to respective channel conditions, which may include delay spread ($\tilde{\tau}_{rms}$), Doppler frequency ($f_{D\_max}$), and noise variance ($\tilde{\sigma}_{IM}^2$). For example, a first mapping may be associated with a first set of quantized values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=1$), a second mapping may be associated with a second set of quantized values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=2$), and so on.

The one or more mappings may similarly include sets of mappings for different CSI-RS configurations. For example, a first set of mappings for a first CSI-RS configuration (CSI-RS_1) may include a first mapping that is associated with a first set of values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=1$), a second mapping that is associated with a second set of values for $\tau_{rms}$, $f_{D\_max}$, and $\tilde{\sigma}_{IM}^2$ (e.g., $\tau_{rms}=1$, $\tilde{\sigma}_{IM}^2=1$, and $f_{D\_max}=2$), and so on. And a second set of mappings for a second CSI-RS configuration (CSI-RS_2) may include a first mapping that is associated with the first set of values for $\tau_{rms}$, $f_{D\_max}$, and $\tilde{\sigma}_{IM}^2$, a second mapping that is associated with the second set of values for $\tau_{rms}$, $f_{D\_max}$, and $\tilde{\sigma}_{IM}^2$, and so on. And so on.

Although described with reference to the UE 115-*a*, a similar offline numerical training procedure may be implemented by the base station 105-*a* (e.g., using uplink reference signals such as DMRS or SRS) to generate one or more mappings that indicate previously numerically determined differences in values measured for a link quality characteristic (e.g., spectral efficiency or post-processing SINR) determined using UL DMRS or SRS transmissions and in values measured for the link quality characteristic determined using UL DMRS transmissions having other waveform and different configurations. One or more numerically trained mappings that indicate previously determined differences in values measured for the link quality characteristic determined using UL DMRS or SRS of a first configuration and in values measured for the link quality characteristic determined using UL DMRS transmissions having other configurations may also be generated by base station 105-*a*.

The base station 105-*a* may configure an initial DL DMRS configuration for the UE 115-*a* during an RRC signaling exchange. The base station 105-*a* may then transmit, using downlink 245, first DL DMRS 240 to UE 115-*a* in accordance with the initial DL DMRS configuration. The UE 115-*a* may use first DL DMRS 240 to decode data and/or to determine an SINR for the channel ($\gamma_{DMRS}$) (e.g., based on Equation 1). The initial DL DMRS configuration may be associated with a first combination of a temporal spacing $D_t$ between resource elements allocated for first DL DMRS 240; a frequency spacing $D_f$ between resource elements allocated to first DL DMRS 240; and a power level corresponding to $\rho_p$ used to transmit first DL DMRS 240 resource elements relative to a power level used to transmit data resource elements. Different DL DMRS configurations may be represented using different combinations of triplet ($D_t$, $D_f$, $\rho_p$) (e.g., a first DL DMRS configuration may be represented by the triplet (0,0,0), a second DL DMRS configuration may be referenced by the triplet (0,0,1), and so on). The base station 105-*a* may also transmit CSI-RS 230 to UE 115-*a* in accordance with a configured CSI-RS configuration. Base station 105-*a* may be prohibited from transmitting any signaling over CSI-IM resource 235.

The UE 115-*a* may receive CSI-RS 230 and may monitor CSI-IM resource 235. The UE 115-*a* may use CSI-RS 230 to estimate the channel response and CSI-IM resource 235 to estimate a reception noise (which may be used to calculate a noise covariance matrix ($R_{nn}$). Thus, the UE 115-*a* may use CSI-IM resource 235 to determine a level of noise and interference on the channel (e.g., caused by transmissions using neighboring cells and thermal effects). The UE 115-*a* may also use the noise component to determine a noise variance $\tilde{\sigma}_{IM}^2$ for the channel. After determining an effective channel matrix (e.g., $\hat{H}_{eff}$), the UE 115-*a* may use the effective channel matrix to determine a post-processing SINR for each one of the involved streams relevant for the channel based on CSI-RS 230 and CSI-IM resource 235 ($\gamma_{CSI-RS}$) (e.g., based on Equation 2).

The base station 105-*a* may also transmit TRS 225 to the UE 115-*a*. The UE 115-*a* may use TRS 225 to determine a Doppler frequency $f_{D\_max}$ (e.g., a maximum Doppler frequency) for the channel. The UE 115-*a* may also use TRS 225 to determine a delay spread $\tau'_{rms}$ for the channel. In some examples, the UE 115-*a* may map values determined for delay spread, Doppler frequency, and noise variance to sets of quantized values (e.g., to reduce processing complexity).

The UE 115-a may use any combination of CSI-RS 230, CSI-IM resource 235, and TRS 225 to determine a DL DMRS configuration for a sub-band that increases a spectral efficiency of communications over the channel relative to the other DL DMRS configurations for the sub-band. To determine the DL DMRS configuration for each sub-band, the UE 115-a may use a post-processing SINR value determined from the CSI-RS 230 and CSI-IM resource 235 for each sub-band; a delay spread value for each sub-band together determined from CSI-RS 230 and/or TRS 225; a Doppler frequency value determined from TRS 225; a noise variance value determined from CSI-IM resource 235 or an input SINR; and a mapping generated based on the training procedure. For example, after determining a post-processing SINR value for $\gamma_{CSI-RS}$ for each sub-band and for each involved stream, the UE 115-a may identify the values determined for $\tau_{rms}$, $f_{D\_max}$, and $\tilde{\sigma}_{IM}^2$ and a mapping based on the identified values for $\tau_{rms}$, $f_{D\_max}$, and $\tilde{\sigma}_{IM}^2$ and a configuration used for CSI-RS 230 (e.g., for a first CSI-RS configuration, which may be represented as CSI-RS_1). The mapping may include, for each available DL DMRS configuration, an adjustment from the SINR value calculated using a CSI-RS of a CSI-RS configuration ($\gamma_{CSI-RS}$) to an estimated equivalent post-processing SINR value for a respective DL DMRS configuration correspondingly for each sub-band (i.e., a value for $\gamma_{DMRS\_x}$, where there are N available DL DMRS configurations and x≤N) and for each one of the involved streams.

An example mapping is provided by Table 3.

TABLE 3

| CSI-RS_1; $\tau_{rms}$ = 1, $f_{D\_max}$ = 1; $\tilde{\sigma}_{IM}^2$ = 1 | |
|---|---|
| DL DMRS Configuration ($D_t$, $D_f$, $\rho_p$) | $\gamma_{DMRS\_x}$ |
| DMRS_1 | (0, 0, 0) | $f_1$ ($\gamma_{CSI-RS\_1}$) |
| DMRS_2 | (0, 0, 1) | $f_2$ ($\gamma_{CSI-RS\_1}$) |
| DMRS_3 | (0, 1, 1) | $f_3$ ($\gamma_{CSI-RS\_1}$) |
| ... | ... | ... |
| DMRS_N | (x, y, z) | $f_n$ ($\gamma_{CSI-RS\_1}$) |

Other mappings may be generated for different combinations of $\tau_{rms}$, $f_{D\_max}$, $\tilde{\sigma}_{IM}^2$, and CSI-RS configurations. For example, while the mapping may be associated with the combination (CSI-RS_1, $\tau_{rms}$, $\tilde{\sigma}_{IM}^2$, and $f_{D\_max}$) depicted in Table 3, another mapping may be associated with a different combination of (CSI-RS_1, $\tau'_{rms}$, $\tilde{\sigma}_{IM}^2$, and $f_{D\_max}$), and so on.

A more general mapping is provided by Table 4.

TABLE 4

| CSI-RS_w; $\tau_{rms}$ = x, $f_{D\_max}$ = y; $\tilde{\sigma}_{IM}^2$ = z | |
|---|---|
| DL DMRS Configuration ($D_t$, $D_f$, $\rho_p$) | $\gamma_{DMRS\_x}$ |
| DMRS_1 | (0, 0, 0) | $f_1$ ($\gamma_{CSI-RS\_w}$) |
| DMRS_2 | (0, 0, 1) | $f_2$ ($\gamma_{CSI-RS\_w}$) |
| DMRS_3 | (0, 1, 1) | $f_3$ ($\gamma_{CSI-RS\_w}$) |
| ... | ... | ... |
| DMRS_N | (m, n, o) | $f_n$ ($\gamma_{CSI-RS\_w}$) |

The UE 115-a may use the mapping to derive, from a calculated $\gamma_{CSI-RS}$, SINR values for each of the available DL DMRS configurations ($\gamma_{DMRS\_x}$). That is, $\gamma_{DMRS\_x}$ may equal $f(\gamma_{CSI-RS})$, where 1>x≥N.

After determining SINR values for each of the available DL DMRS configurations for each sub-band, the UE 115-a may determine a DL DMRS configuration of the DL DMRS configurations that maximizes a communication efficiency metric for each sub-band. For example, the UE 115-a may determine the DL DMRS configuration that maximizes spectral efficiency for each sub-band of the channel based on Equation 3:

$$\underset{i=1:N}{\mathrm{argmax}}\left(N_{RE\_data}(\mathrm{DMRS\_i}) \cdot \sum_{l=1:RI} C_{QAM}(\overline{\gamma_{l,s}}(\mathrm{DMRS\_i}))\right)$$

where $C_{QAM}$ may be the constrained capacity function for a maximal allowed modulation scheme (e.g., for a quadrature amplitude modulation (QAM) order) that gives the estimated spectral efficiency per resource element; $N_{RE\_data}$ may be the number of data resource elements per resource allocation; DMRS_i may be the DL DMRS configuration defined by a combination of ($D_t$, $D_f$, ($\rho_p$)) while N different DMRS configurations may be addressed in the DMRS selection process; and $\overline{\gamma_{l,s}}(\gamma_{DMRS\_i})$ may be the average post-processing SINR per sub-band s and per layer l for a corresponding DL DMRS configuration DMRS_i. $N_{RE\_data}$ may be a function of $D_t$ and $D_f$ of the corresponding DL DMRS configuration DMRS_i. RI may correspond to a value of a rank.

A result of Equation 3 may output an argument k that results in a largest value for the equation inside of the outermost (largest) set of parentheses shown in Equation 3. The argument k that corresponds to the largest value may also correspond to the kth DL DMRS configuration DMRS_k. In some implementations, the UE 115-a may repeat Equation 3 a number of times (e.g., a number of times equal to the number of sub-bands in the channel) to determine a DMRS configuration for each sub-band of the channel. In some cases, two DL DMRS configurations that have the same SINR value may result in different outcomes for the equation inside of the outermost set of parentheses shown in Equation 3 (e.g., the one of the two DL DMRS configurations that uses additional resource elements may result in a smaller value). For similar reasons, a DL DMRS configuration that has a larger SINR may result in a smaller value than a DL DMRS configuration that has a smaller SINR. Similar equations may be used to determine which of the DL DMRS configurations will maximize other communication metrics for a channel. In some cases, the identified DL DMRS configuration may be different than the initial DL DMRS configuration configured by the base station 105-a.

The UE 115-a may be configured to generate a CSF report based on the received and monitored CSI-RS resources. Thus, the UE 115-a may determine a value for a PMI, RI, CQI, and a DMRS configuration indicator (DMI). For the PMI and RI, UE 115-a may select values that maximize the estimated average spectral efficiency. For the DMI, UE 115-a may select a value corresponding to the DL DMRS configuration that maximizes a communication metric (e.g., effective spectral efficiency) for each sub-band of the channel (e.g., based on Equation 3). In some examples, the UE 115-a may select a number of values corresponding to a number of DL DMRS configurations, where each DMRS configuration of the number of DMRS configurations corresponds to a sub-band of the channel. For the CQI, UE 115-a may select a value based on a delay spread, a Doppler frequency, an average spectral efficiency associated with the selected PMI and RI, and a selected DL DMRS configuration (a selected DL DMRS configuration for each sub-band). In some examples, the CSF report may include a PMI field, an RI field, a CQI field, and a DMI field (e.g., an additional field extension) that is configured to convey multiple DMIs. In other examples, the CSF report may not include a DMI field explicitly. Instead, the DMI may be indicated according to a dedicated DMRS report format coupled with a CSI report evaluation and reporting.

In a first example, a CSF report (e.g., a joint DMRS and CSI report) may include a wideband PMI, an RI, a wideband CQI, and a wideband DMI. A wideband DMI may point to a single DMRS configuration for the band including each sub-band. Such a report may be referred to as a fully wideband report and may be used by base station 105-a for wideband allocation or for relatively flat channel scenarios. In a second example, a CSF report may include a sub-band PMI, an RI, a sub-band and/or wideband CQI, and a sub-band DMI. A sub-band DMI may point to a DMRS configuration for each sub-band. Such a report may be referred to as a fully sub-band report and may be used for frequency selective channel scenarios. Receiving fully sub-band reports may enable base station 105-a to perform better sub-band selection for small allocations (e.g., allocations with a size below a threshold) or for optimizations of small allocation transmission per a given sub-band usage. In a third example, a CSF report may include one or both of a sub-band or wideband PMI, an RI, one or both of a sub-band or wideband CQI, and one or both of a sub-band or wideband DMI. Such a report may be referred to as a mixed report and may be used by base station 105-a for DMRS adaptation and one or both of wideband or sub-band precoding selection. If the mixed report has a wideband DMI but not a sub-band DMI, the base station 105-a may use the report for wideband DMRS selection.

In some examples, the report may include both a wideband DMI and one or more sub-band DMIs. The report may signal a DMRS configuration index for the wideband DMI from a list or set of one or more options. In some examples, the wideband DMI may include an absolute index and the one or more sub-band DMIs may include a differential index (e.g., a z-bit differential index, where z is a positive integer) whose value is with reference to a value of the absolute index. In such cases, the sub-band DMI may be reported differentially (e.g., may have a differential configuration index) with reference to the reported wideband DMI index. A maximum differential range of the sub-band DMI index may be considered during sub-band DMRS configuration selection and differential sub-band DMRS representation bit length may be defined accordingly. In some examples, wideband CQI may be evaluated or determined based on or given the selected wideband DMI option.

After generating the CSF report, the UE 115-a may transmit, using uplink 270, the CSF report to the base station 105-a in report 255. Report 255 may include DMRS configuration indication 250 based on the DL DMRS configurations selected by the UE 115-a (e.g., the DL DMRS configuration for each sub-band of the channel). The base station 105-a may use report 255 to adapt transmission parameters for subsequent communications to the UE 115-a. In some examples, the base station 105-a may transmit second DL DMRS 220 to the UE 115-a in accordance with the DL DMRS configuration indicated by DMRS configuration indication 250. In some other examples, the base station 105-a may identify a group of DL DMRS configurations based on DMRS configuration indication 250 and may transmit second DL DMRS 220 in accordance with one or more of the DL DMRS configurations included in the group of DL DMRS configurations—the group of DL DMRS configurations may include the DL DMRS configurations indicated by DMRS configuration indication 250. For example, the group of DL DMRS configurations may include a DL DMRS configuration for each sub-band.

In some examples, the UE 115-a may determine a sub-band CQI for each of the one or more sub-bands based on a selected DMRS configuration (e.g., a selected DMI) and may transmit, to the base station 105-a (e.g., in the report 255), an indication of the sub-band CQI defined based on the selected DMRS configuration for each of the one or more sub-bands. For example, in the case of sub-band DMRS selection and per sub-band CQI reporting, the corresponding selected per sub-band DMRS may be addressed to select the corresponding sub-band CQI in the same sub-band. In some such examples, the DMRS configuration may be one of the inputs to a CQI mapping or a CQI table selection as discussed herein, for example, with reference to FIG. 3). Additional details about determining the sub-band CQI from the selected DMRS configuration may be described herein, for example, with reference to FIG. 3.

In some examples, the UE 115-a may receive one or more parameters (e.g., one or more sub-band DMRS reporting parameters) and may transmit the report 255 based on the one or more parameters. The one or more parameters may include a sub-band size (e.g., subbandSize), a reporting band configuration (e.g., csi-ReportingBand), a DMRS field configuration indicating whether the report 255 is to include a field for reporting one or more DMRS configurations, a DMRS report configuration (e.g., dmrs-FormatIndicator) indicating whether the one or more DMRS configurations include one or both of the DMRS configuration for each of the one or more sub-bands or a wideband DMRS configuration, or any combination thereof. In a first example, the sub-band DMRS reporting may follow a same configuration (e.g., a same sub-band size or reporting band configuration) as a corresponding CSI report. In a second example, the UE 115-a may scale the sub-band size for the DMRS reporting by an integer factor, where a total quantity of the one or more sub-bands, an effective sub-band size of the one or more sub-bands, or both is based on scaling the sub-band size by the integer factor. In such cases, the sub-band size configuration for sub-band DMRS reporting may be done using an integer multiplication of a subbandSize configured for a CSI report, which may involve introducing an additional configuration parameter to indicate this multiplication factor (e.g., the integer factor) under a CSI or DMRS report configuration. For instance, the base station 105-a may transmit an indication of the integer factor to the UE 115-a.

In some examples, an indication of the DMRS configuration for each of the one or more sub-bands (e.g., one or more sub-band DMIs) may be transmitted via an uplink shared channel (e.g., a PUSCH) or a long uplink control channel format (e.g., a long PUCCH). In some examples, the sub-band DMRS reporting for the UE 115-a may be configured with periodic, aperiodic, or semi-persistent reporting options. For example, the UE 115-a may receive a CSI report configuration including an indication of one or more resources for transmitting the indication of the DMRS configuration for each of the one or more sub-bands coupled to or included in a CSI report, where the one or more resources may include one or more aperiodic resources, one or more periodic resources, or one or more semi-persistently scheduled resources, or any combination thereof. In some cases, a CSI report configuration may include a list of CSI-RS and CSI-IM resources to be used for evaluation. For periodic or semi-persistent report, the resources may be periodic or semi-persistent, respectively. For aperiodic report, the resources may be periodic, semi-persistent, or aperiodic. Aperiodic resources may be triggered together with an aperiodic report when DCI triggers a CSI-RS trigger state that provides a pointer for a configuration of the one or more aperiodic reports and associated with the resources to be used for evaluation of each one of the aperiodic reports that are triggered by the CSI-RS trigger state correspondingly.

In some examples, a report type including sub-band DMRS data (e.g., one or more sub-band DMIs) may follow a same or lower priority than a sub-band CQI report in a case in which a CSI report or a part of a CSI report (e.g., part 1, part 2, or part 3) is to be dropped following prioritization rules. Such a scenario may occur when there is an UL resource limitation that may not accommodate for each scheduled and/or configured CSI report to be transmitted simultaneously and with a full report fields representation. For example, the UE 115-a may determine that a set of CSI reports are to be multiplexed with each other on a same UL resource, where a CSI report of the set includes a first part (e.g., part 1) and a second part (e.g., part 2), and optionally a third part, and where the first part, the second part, or the third part includes the sub-band DMI, and where the first part includes a wideband DMRS configuration for an entire reporting band (e.g., a wideband DMI). In such cases, the UE 115-a may identify a set of priority rules for prioritizing the first part over the second part, and in some cases the second part over the third part, where transmitting the sub-band DMI (e.g., in a report 255) is based on the set of priority rules. In some examples, the CSI report of the set may include at least one sub-band CQI, where the at least one sub-band CQI has a priority higher than or equal to the sub-band DMI according to the set of priority rules. For example, if the sub-band CQI and the sub-band DMI are in a same part of the CSI report (e.g., part 2), they may have equal priority. However if the sub-band CQI is in a first part (e.g., part 2) and the sub-band DMI is in a different part (e.g., a part 3 of the CSI report), the sub-band CQI and the sub-band DMI may have different priorities. However, by performing these methods, the base station 105-a may achieve a correct report interpretation in a scenario where reports are overbooked (e.g., where too many reports are scheduled on a same uplink resource). In some examples, each of the CSI reports of the set may be on different component carriers or may be associated with different scheduling types (e.g., one CSI report may be transmitted aperiodic and the other CSI report may be reported periodic).

In some examples, different DMRS configurations may be allocated on different physical resource groups (PRGs). To mitigate additional signaling overhead and/or on a side of the base station 105-a (e.g., when performing scheduling), one or more methods may be performed. For example, DCI signaling may include a field (e.g., a one-bit field) indicating whether a DMRS configuration is done following the last per sub-band joint DMRS and CSI report provided by the UE 115-a. Such signaling may be referred to as implicit DMRS configuration signaling per sub-band. The last joint DMRS and CSI report may have a specific type (e.g., aperiodic, periodic, or semi-persistently scheduled). Per-sub-band DMRS configuration for PDSCH may be applicable if UE 115-a has a dedicated capability for this type of channel estimation or processing.

Alternatively, the base station 105-a may use sub-band DMRS data (e.g., sub-band DMIs) to make better scheduling decisions for small or mid-size allocations (e.g., allocations below a threshold size), but may use the same DMRS configuration across all PRGs of a scheduled allocation. For example, the base station 105-a may receive an indication of one or more sub-band CQIs, may determine that an allocation size is below threshold, may determine a set of RBs based on the allocation size being below the threshold and based on the one or more sub-band CQIs. In such cases, the base station 105-a may schedule a transmission including DMRS according to the set of determined RBs. In a case in which the one or more sub-bands include multiple sub-bands, the base station 105-a may use a single DMRS configuration for all the involved PRBs by selecting a DMRS configuration based on multiple different reported sub-band DMRS indications (e.g., one for each of multiple sub-bands).

In some examples, the base station 105-a may use the sub-band DMRS data (e.g., sub-band DMIs) to better perform one or more functions. For example, the base station 105-a may use the sub-band DMRS data to provide a more appropriate DMRS configuration for small allocation size scenarios (e.g., allocation sizes below a threshold). Additionally or alternatively, when receiving sub-band CQI coupled with sub-band DMRS reporting (e.g., sub-band DMIs), the base station 105-a may achieve a tighter link adaptation (LA) for small to mid-size allocation size cases (e.g., allocation sizes below a threshold). Additionally or alternatively, the sub-band DMRS data may enable more convenient UE pairing for MU-MIMO co-scheduling. For example, UEs 115 (e.g., UE 115-a and another UE 115) sharing a same number of DMRS symbols may be paired for MU-MIMO co-scheduling groups. When receiving sub-band DMRS data, the base station 105-a may pair UEs 115 while taking into account a DMRS density on a frequency axis. For example, UEs 115 with a preference for a lower density on the frequency axis may be paired to MU-MIMO groups with a higher number of co-scheduled UEs 115, which may involve using a higher number of multiplexed DMRS ports).

To mitigate additional overhead in uplink and/or extra processing burden on a side of the UE 115-a when transmitting sub-band DMRS, the UE 115-a and the base station 105-a may perform one or more methods. In one example, the base station 105-a may first schedule a CSF report with one or both of wideband PMI or sub-band PMI, sub-band CQI, and wideband DMRS. In such cases, the UE 115-a may receive scheduling information for transmitting a first report including a wideband DMI and one or more sub-band CQIs and may transmit the first report based on the first scheduling information. If there are differences between reported sub-band CQI values, the base station 105-a may schedule a CSF report with one or both of wideband PMI or sub-band PMI, sub-band CQI, and sub-band DMRS. In such cases, the UE 115-a may receive second scheduling information for transmitting the second report, where transmitting the second report is based on receiving the second scheduling information and transmitting the first report. In some examples, the base station 105-a may select one or more most relevant reporting sub-bands for which the UE 115-a may report sub-band DMIs. For examples, the UE 115-a may receive a configuration of the second report based on the one or more sub-band CQIs. If the configuration of the second report indicates one or more sub-bands from a set of sub-bands, the UE 115-a may report sub-band DMIs for the indicated one or more sub-bands.

In some examples, an initial UL DMRS configuration may be configured for the UE 115-a during an RRC signaling exchange. The initial UL DMRS configuration may be associated with a first combination of a temporal spacing between resource elements allocated to an UL DMRS; a frequency spacing between resource elements allocated to an UL DMRS; and a power level used to transmit an UL DMRS resource element relative to a power level used to transmit data resource element—which may be represented as ($D''_t$, $D''_f$, $\rho''_p$). Thus, the UE 115-a may transmit UL DMRSs to the base station 105-a in accordance with the initial UL DMRS configuration. The base station 105-a may be configured to determine a preferred UL DMRS configuration, as similarly described with reference to the operations that support a determination of preferred DL DMRS configurations by the UE 115-a. For example, the base station 105-a may identify an UL DMRS configuration that maximizes a communication metric for each sub-band of the channel based on a delay spread $\tau_{rms}$, a Doppler frequency $f_{D\_max}$, representative for the uplink 270 and an estimated per each sub-band a post-processing signal quality ratio $\gamma_{RS}$ of a reference signal transmitted by UE 115-a.

In such cases, the base station 105-a may generate, for different combinations of channel conditions (e.g., for different combinations of $\tau_{rms}$ and $f_{D\_max}$ and input SNR), a mapping between values determined for a link quality characteristic (e.g., post-processing SINR) estimated using a received reference signal and the corresponding equivalent values for the link quality characteristic corresponding to usage of UL DMRS 260 transmissions having different UL DMRS configurations (e.g., during an offline training procedures). In some cases, the base station 105-a may generate the mapping between the applicable UL DMRS configurations. That is, the base station 105-a may determine, for each UL DMRS configuration, a difference in values calculated for a link quality characteristic using a first UL DMRS configuration ($\gamma_{UL\_DMRS}$) and a remaining set of UL DMRS configurations ($\gamma_{UL\_DMRS\_x}$). Additionally, or alternatively, the base station 105-a may generate the mapping between an SRS and the available UL DMRS configurations. In such cases, the base station 105-a may determine, for each SRS configuration, a difference in values calculated for a link quality characteristic using an SRS configuration ($\gamma_{SRS}$) and corresponding equivalent values for the link quality characteristic while using available UL DMRS configurations ($\gamma_{UL\_DMRS\_x}$). In either case, the base station 105-a may generate separate mappings for different reference signal configuration and for different combinations of $\tau_{rms}$, $f_{D\_max}$, and input SNR. Input SNR may be equivalent to a thermal noise variance component.

An example mapping for an UL DMRS may be provided by Table 3:

TABLE 3

| UL_DMRS_1(0, 0, 0); $\tau_{rms}$ = 1, $f_{D\_max}$ = 1; SNR = 1 | | |
|---|---|---|
| UL DMRS Configuration ($D_t$, $D_f$, $\rho_p$) | | $\gamma_{UL\_DMRS\_x}$ |
| UL_DMRS_2 | (0, 0, 1) | $f_2$ ($\gamma_{UL\_DMRS\_1}$) |
| UL_DMRS_3 | (0, 1, 1) | $f_3$ ($\gamma_{UL\_DMRS\_1}$) |
| ... | ... | ... |
| UL_DMRS_N | (x, y, z) | $f_n$ ($\gamma_{UL\_DMRS\_1}$) |

An example mapping for an SRS may be provided by Table 4:

| SRS_1; $\tau_{rms}$ = 1, $f_{D\_max}$ = 1; SNR = 1 | | |
|---|---|---|
| UL DMRS Configuration ($D_t$, $D_f$, $\rho_p$) | | $\gamma_{UL\_DMRS\_x}$ |
| UL_DMRS_1 | (0, 0, 0) | $f_1$ ($\gamma_{SRS\_1}$) |
| UL_DMRS_2 | (0, 0, 1) | $f_2$ ($\gamma_{SRS\_1}$) |
| UL_DMRS_3 | (0, 1, 1) | $f_3$ ($\gamma_{SRS\_1}$) |
| ... | ... | ... |
| UL_DMRS_N | (x, y, z) | $f_n$ ($\gamma_{SRS\_1}$) |

The base station 105-a may use the mapping and an SINR value calculated for a received reference signal ($\gamma_{RS}$) to estimate SINR values for each of the available UL DMRS configurations ($\gamma_{UL\_DMRS\_x}$). The base station 105-a may then use the calculated SINR values to determine an UL DMRS configuration that provides a maximum or a greatest value for an effective spectral efficiency metric. In some implementations, the base station 105-a may determine an UL DMRS configuration for each sub-band of the channel. For example, the base station 105-a may determine the UL DMRS configuration that maximizes effective spectral efficiency for the channel based on Equation 4:

$$\underset{i=1:N}{\operatorname{argmax}}\left( N_{RE\_data}(\text{UL\_DMRS\_i}) \cdot \sum_{l=1:Rl} C_{QAM}(\overline{\gamma_{l,s}}(\text{UL\_DMRS\_i})) \right)$$

where $C_{QAM}$ may be the constrained capacity function for a maximum relevant modulation scheme (e.g., for a QAM order) that gives the estimated average spectral efficiency per resource element; $N_{RE\_data}$ may be the number of data resource elements per resource allocation (or per resource block); UL_DMRS_i may be the UL DMRS configuration defined by a combination of ($D_t$, $D_f$, $\rho_p$); and $\overline{\gamma_{l,s}}$(UL_DMRS_i) may be the average post-processing SINR per layer l and per sub-band s for a corresponding UL DMRS configuration UL_DMRS_i while N different DMRS configurations may be addressed in a DMRS selection process. $N_{RE\_data}$ may be a function of $D_t$ and $D_f$ of the corresponding UL DMRS configuration UL_DMRS_i.

The base station 105-a may configure the UE 115-a to use the determined UL DMRS configuration (e.g., the UL DMRS configuration for each sub-band of the channel), and the UE 115-a may transmit a subsequent UL DMRS (e.g., UL DMRS 260) to the base station 105-a based on the indicated UL DMRS configuration. For example, the UE 115-a may transmit UL DMRS 260 in accordance with the indicated UL DMRS configuration, where the UL DMRS configuration may be part of a group of UL DMRS configurations that includes the indicated UL DMRS configuration. In some aspects, the group that includes the indicated UL DMRS configuration may refer to a group of close equivalents (e.g., similar DMRS configurations) to the indicated UL DMRS configuration that the base station 105-a may select from prior to transmitting the indication of the UL DMRS configuration.

Thus, the base station 105-a may use Equation 4 (or a similar equation) to determine a convenient UL DMRS configuration for the UE 115-a. As discussed, the estimated equivalent post-processing SINR values input into Equation 4 may be a function of (e.g., based on) the delay spread $\tau_{rms}$, Doppler frequency $f_{D\_max}$, input SNR of the uplink channel, and the estimated post-processing SINR based on a specific SRS or UL DMRS allocation/configuration. For example, the base station 105-a may use uplink delay spread $\tau_{rms}$, uplink Doppler frequency $f_{D\_max}$, and uplink input/reception SNR measured in SRS or the used DMRS configuration as bases for estimating the SINR values for the available UL DMRS configurations ($\gamma_{UL\_DMRS\_x}$). So, the ability of the base station 105-*a* to select an appropriate UL DMRS configuration for the UE 115-*a* may be dependent on, or improve with, the ability of the base station 105-*a* to reliably determine/estimate the delay spread, Doppler frequency, and input SNR of the uplink channel.

To determine the delay spread, the base station 105-*a* may measure an SRS 265 used for a link adaption procedure for the uplink channel. The base station 105-*a* may also measure an SRS 265 to determine the reception SNR for the uplink channel. To determine the Doppler frequency for the uplink channel, the base station 105-*a* may, in some cases, measure an SRS 265 or a DMRS (e.g., UL DMRS 260) with convenient configuration (e.g., repetition of two transmissions from the same antenna port, the same beam or quasi-collocated beams on two symbols with appropriate spacing in time). However, as described herein, the SRS 265 and DMRS may be unsuitably configured for Doppler frequency estimation. For example, the spacing between repetitions of the SRS 265 may be limited and may only be appropriate for Doppler frequency estimation in some scenarios (e.g., certain pairing of carrier frequency, subcarrier spacing, and a limited Doppler range). And the spacing between repetitions of the DMRS may be inconsistent (e.g., due to PUSCH scheduling variability) and fail to support reliable Doppler frequency estimation.

So, in some examples, the base station 105-*a* may improve Doppler frequency estimation by configuring the UE 115-*a* to use an SRS configuration that has an appropriate repetition spacing tailored to the deployment scenario (e.g., carrier frequency, sub carrier spacing). Once the SRS repetition spacing is consistent and tailored to the communications parameters, base station 105-*a* may use the SRS 265 to reliably estimate the Doppler frequency for the uplink channel. Once determined, the uplink Doppler frequency may be used by the base station 105-*a*, along with other factors, to select an appropriate UL DMRS configuration for the UE 115-*a* that allows an increase in the spectral efficiency of the link.

Figure 3:
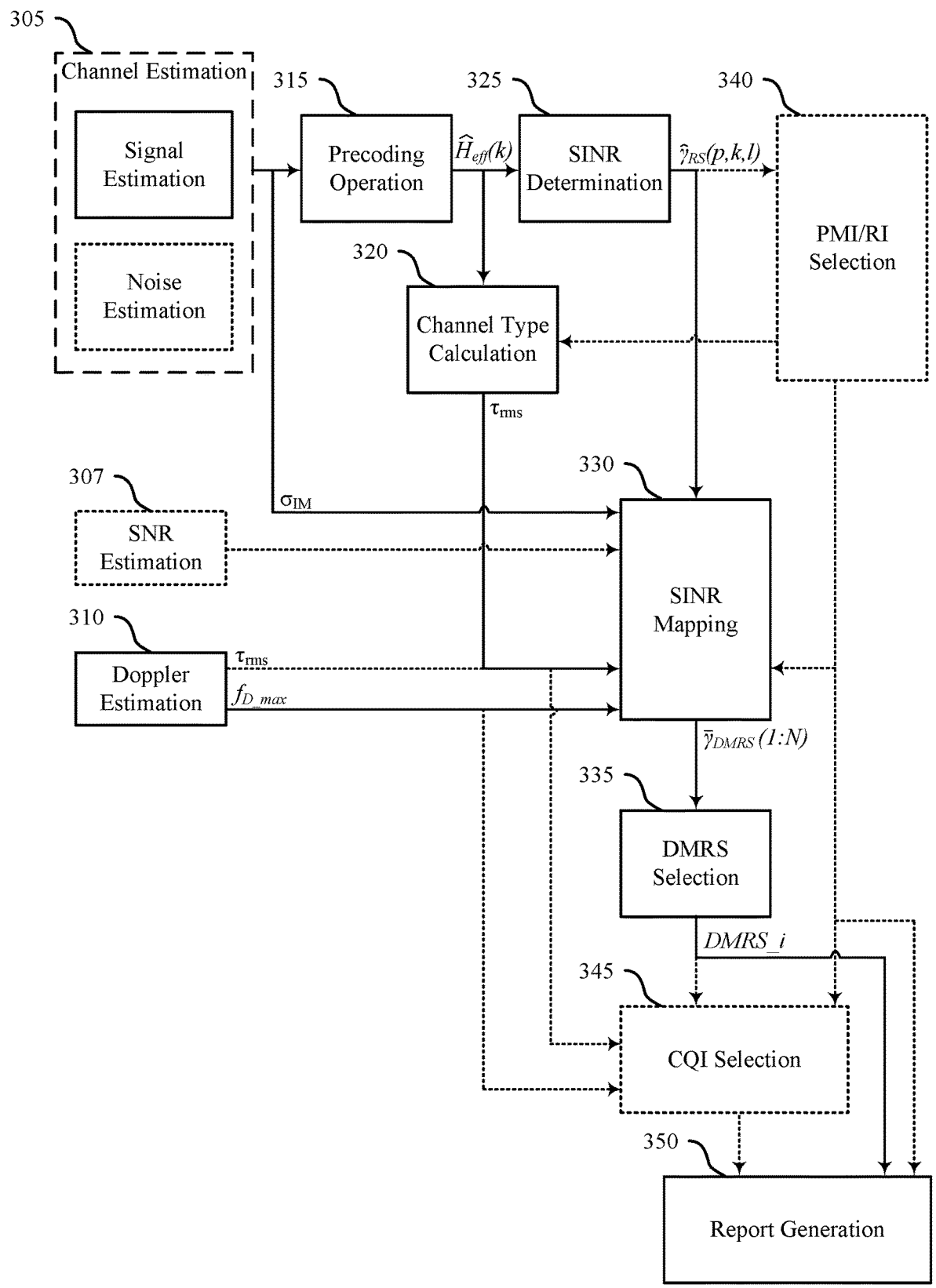
FIG. 3 illustrates a collection of operations that supports demodulation reference signal configuration selection and reporting per sub-band in accordance with aspects of the present disclosure.

FIG. 3 illustrates a collection of operations 300 that supports demodulation reference signal configuration selection and reporting per sub-band in accordance with aspects of the present disclosure. In some examples, collection of operations 300 may implement aspects of wireless communications system 100. For example, collection of operations 300 depicts internal signaling that may be exchanged and internal processing that may be performed to support selecting a DMRS configuration for each sub-band of a channel. Collection of operations 300 may be related to a process for using reference signals to determine channel characteristics that may be in turn be used to determine preferred transmission parameters, such as a preferred DMRS configuration, precoding matrix, rank, and MCS.

One or more of the operations described in collection of operations 300 may be performed earlier or later in the process, omitted, replaced, supplemented, or any combination thereof. Also, additional operations described herein that are not included in collection of operations 300 may be included.

At 305, a wireless device (e.g., a base station or a UE) may obtain an estimate of a channel between a transmitting device and the wireless device. Estimating the channel may include an estimation of the channel based on a reference signal (e.g., based on CSI-RS, UL DMRS, and/or SRS). Estimating the channel may also include an estimation of a noise component of channel based on an interference management resource (e.g., based on a CSI-IM resource). For example, if the wireless device is a UE, the UE may use a CSI-IM resource to measure the noise or the interference that may influence transmissions over the channel. When the noise estimation is obtained free of channel estimation error, the wireless device may use Equation 2 to estimate post-processing SINR. When noise estimation cannot be obtained free of channel estimation error, the wireless device may use Equation 1 to estimate post-processing SINR. The channel estimate may be represented using a channel matrix.

At 307, the wireless device may estimate an input SNR for the channel (e.g., if the wireless device is a base station). The wireless device may estimate the input SNR to assist in post-processing SINR mapping as an alternative to using thermal noise and interference variance estimated in 305 (e.g., if the wireless device is a base station).

At 310, the wireless device may obtain an estimate of a Doppler frequency of the channel. The wireless device may estimate the Doppler frequency based on a received reference signal. For example, if the wireless device is a UE, the wireless device may estimate the Doppler frequency for the downlink channel based on a DMRS or a TRS. If the wireless device is a base station, the wireless device may estimate the Doppler frequency for the uplink channel based on a specially configured SRS. Or the base station may determine the Doppler frequency for the uplink channel based on the Doppler frequency for the downlink channel. In some cases, the wireless device may also determine a delay spread based on the received reference signal (e.g., the DMRS, TRS, or SRS).

At 315, the wireless device may generate one or more channel matrices based on different combinations of the tested precoding matrices and rank hypothesis. The wireless device may generate one or more effective channel matrices based on applying the different combinations of precoding matrices and rank hypothesis to the channel estimate determined during the channel estimation operation.

At 320, the wireless device may classify the channel based on one or more of the effective channel estimates obtained after applying the tested precoding operation (e.g., the channel may be classified as an urban or rural channel). The wireless device may also determine a delay spread for the channel based on the effective channel estimates. In some examples, the delay spread is determined for an effective channel estimate that corresponds to a precoding matrix and rank that have been selected for the channel to optimize link efficiency.

At 325, the wireless device may determine one or more post-processing signal quality ratios (e.g., post-processing SNR or post-processing SINR) based on the effective channel matrices obtained after applying a precoding operation. In some cases, the precoding operation may be omitted (e.g., if a received reference signal is already precoded). In some cases, the wireless device may determine, for each stream l, each resource element k, and each precoding matrix p, a signal quality ratio $\hat{\gamma}_{RS}(p,k,l)$. The one or more signal quality ratios may be determined based on Equation 1 (e.g., if the wireless device does not obtain a noise estimate that is free of a channel estimation error component). Additionally, or alternatively, the one or more signal quality ratios may be determined based on Equation 2 (e.g., if the wireless device is a UE and based on CSI-RS and CSI-IM resources).

At 330, the wireless device may execute a mapping from an SINR computed for a received reference signal (e.g., a CSI-RS, UL DMRS, or SRS) to multiple SINRs estimated for a set of DMRS configurations. In some examples, the wireless device may execute the mapping from an SINR computed for the received reference signal to multiple SINRs estimated for a set of DMRS configurations for each sub-band of the channel. The estimated SINRs may be represented as $\bar{\gamma}_{DMRS}(1:N)$. As described herein, including with reference to FIG. 2, the wireless device may identify a mapping based on an indication of a first set of characteristics for the channel (e.g., a combination of a delay spread $\tau_{rms}$, Doppler frequency $f_{D\_max}$, and/or noise variance $\bar{\sigma}_{IM}^2$ if the wireless device is a UE, or a combination of a delay spread $\tau_{rms}$, Doppler frequency $f_{D\_max}$, and/or reception SNR if the wireless device is a base station) and a configuration of the received reference signal having a combination of a temporal spacing, frequency spacing, and power boosting. The Doppler frequency may be determined based on the Doppler estimation. And the noise variance may be determined based on the noise estimation.

Before executing the mapping, the SINRs computed for the received reference signal ($\gamma_{RS}(p, k, l)$) may be averaged some way across the set of resource elements k for each stream l and precoding matrix p. In some examples, the SINRs computer for the received reference signal may be averaged across all resource elements k of a wideband or across a subset of resource elements k of each subband (e.g., the wireless device may average the computed SINRs per subband). To compute the SINR for the received reference signal, the wireless device may average a set of SINRs computed for different resource elements, on a per stream basis and in accordance with a selected precoding matrix and rank. In some cases, an indication of the precoding matrix and rank is provided to the SINR mapping operation based on a prior or concurrent determination of the precoding matrix and rank. The SINR mapping operation may use the indicated precoding matrix and rank to determine which version of SINR estimates determined at 325 to use for the SINR mapping.

At 335, the wireless device may select a DMRS configuration for each sub-band associated with the channel. The wireless device may select a DMRS configuration (e.g., one for each sub-band) from the set of DMRS configurations that maximizes a communication metric for the channel, such as effective spectral efficiency (e.g., based on Equation 3 or 4). For example, for a sub-band the wireless device may select the DMRS configuration, such as DMRS_i, that yields a larger value for the communication metric than the other DMRS configuration for that sub-band.

At 340, the wireless device may determine a precoding matrix and rank that increases a spectral efficiency of the link channel (e.g., based on the determined signal quality ratios). As described herein, the selected precoding matrix and rank may be used to determine a corresponding average estimated SINR for a received reference signal that corresponds to a selected precoding matrix and rank. The wireless device may also determine a spectral efficiency for the channel based on the selected precoding matrix and rank selection. In some cases, the precoding matrix and rank selection operation is not performed.

At 345, the wireless device may determine a value of a sub-band CQI for each sub-band. The CQI determination for a sub-band may be based on the delay spread $\tau_{rms}$, Doppler frequency $f_{D\_max}$, and the respective DMRS configuration DMRS_i for the sub-band (which may be a configured to a UE or the selected DL DMRS configuration). The CQI determination may also be based on an indication of spectral efficiency for the channel determined during the precoding matrix and rank selection operation. In some cases, the wireless device determines a value for the CQI for each sub-band that is associated with an MCS that is optimized for the selected DMRS configuration for each sub-band and channel conditions.

At 350, the wireless device may generate a report (e.g., a CSF report if the wireless device is a UE) that includes an indication of the selected DMRS configuration for each sub-band (e.g., a DL DMRS configuration). In some aspects, the reporting of the selected DMRS configuration for each sub-band may be addressed as a separate capability. In some examples, generating the report includes generating a CSF report that includes a PMI, RI, CQI, and DMI. In some cases, the CSF report may include a DMI field that is used to convey the DMI. A size of the DMI field may be based on a quantity of DMRS configurations that are tested/available for communications. In some examples, a single DMI may indicate multiple DMRS configurations (e.g., one DMRS configuration for each sub-band). In some other examples, the CSF report may include multiple DMIs, each DMI indicating a single DMRS configuration for each sub-band.

In some other cases, the CSF report may jointly pre-code or encode the CQI and DMI based on a relationship between CQI values and DMRS configurations. In some examples, the CQI and the DMI may be jointly pre-coded for each sub-band. The jointly pre-coded CQI and DMI may be conveyed by one or more CQI fields or one or more combined CQI/DMI fields. By including the jointly pre-coded CQI and DMI in a CQI field or a new field, a CSF reporting format may be unchanged while being used to convey additional data and overhead signaling may be reduced using joint CQI and DMI pre-coding.

In some examples, the wireless device may generate the report including one index associated with each DMRS configuration. For example, in some implementations, the wireless device may, for each selected DMRS configuration in the CSF report, include a single index corresponding to the sub-band associated with the respective DMRS configuration. Similarly, the wireless device may select a second DMRS configuration for a second sub-band and include, in the CSF report, an index corresponding to the sub-band.

The wireless device may transmit the report to a transmitting device. When the report includes or is a CSF report, a transmitting device may adapt transmission parameters based on the received CSF report (e.g., based on the contents or indications included in the CSF report, such as one or more indicated DMRS configurations). The transmitting device may select a DMRS configuration for each sub-band based on the DMRS configurations selected by the wireless device. In some examples, the transmitting device may determine to use the same DMRS configurations that are selected by the wireless device. In some other examples, the transmitting device may select different DMRS configurations than the DMRS configurations that are selected by the wireless device. For example, the transmitting device may select different DMRS configurations than the DMRS configurations selected by the wireless device based on the DMRS configurations selected by the wireless device and network scheduling criteria. As such, the transmitting device may account for the DMRS configurations selected by the wireless device (e.g., DMRS configurations that may increase the spectral efficiency and achievable throughput of communications between the transmitting device and the wireless device for each sub-band) as well as scheduling criteria at the transmitting device.

In some examples, the transmitting device may transmit a list of relevant DMRS configurations (e.g., a list of tested, compatible, or otherwise available DMRS configurations) to the wireless device. In some aspects, the transmitting device may activate a list of DMRS configurations to the wireless device via a medium access control (MAC) control element (CE). In such examples, the transmitting device may indicate the specific DMRS configuration from the activated list for each sub-band to the wireless device via a field in a downlink control message, such as DCI. For example, the transmitting device may include a field in DCI including one or more indications of the DMRS configuration for each sub-band.

In some other examples, the transmitting device may include a bit in a downlink control message, such as DCI, that may indicate to the wireless device whether the DMRS configuration for each sub-band determined by the transmitting device is the same as the DMRS configuration for each sub-band as selected by the wireless device and indicated in the last CSF report (e.g., which may, in such contexts, be equivalently referred to as a CSI report or a DMRS report). For instance, the wireless device may select a first DMRS configuration for a first sub-band and a second DMRS configuration for a second sub-band and the wireless device may determine, based on the value of the bit in the downlink control message, that the transmitting device may use the first DMRS configuration for the first sub-band and the second DMRS configuration for the second sub-band. For example, if the bit is set the wireless device will determine or assume that the DMRS configurations that the transmitting device will use are the same as the DMRS configurations selected by the wireless device in the last reported CSF. Otherwise, the UE may determine that the DMRS configurations that the transmitting device will use are different than the DMRS configurations selected by the wireless device in the last reported CSF and the wireless device may expect to receive the DMRS configurations selected by the transmitting device explicitly. As such, the transmitting device may implicitly signal the DMRS configurations in the case that the transmitting device uses the same DMRS configurations as those selected by the wireless device.

Figure 4:
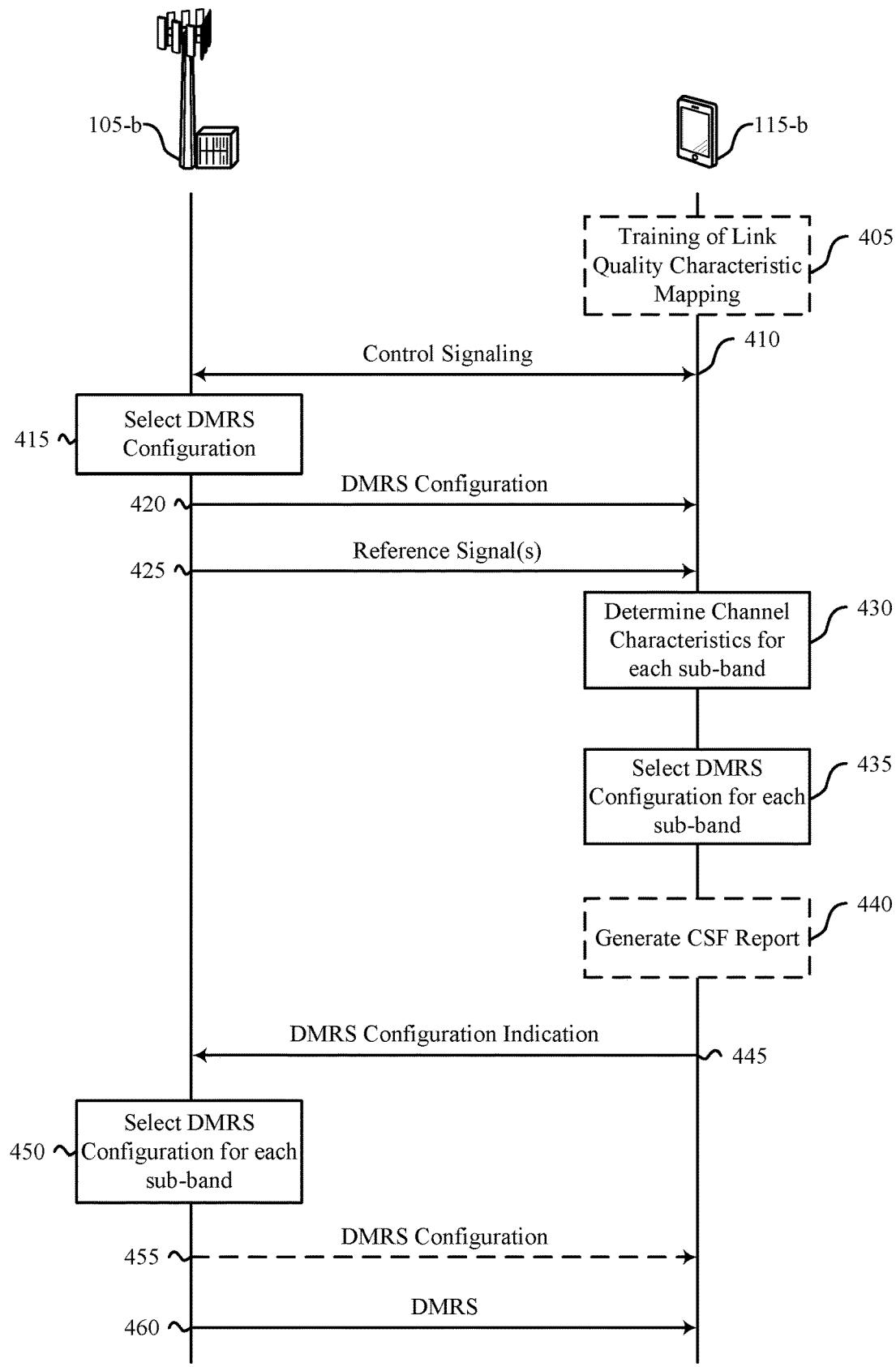
FIG. 4 illustrates an example of a process flow that supports demodulation reference signal configuration selection and reporting per sub-band in accordance with aspects of the present disclosure.

FIG. 4 illustrates an example of a process flow 400 that supports demodulation reference signal configuration selection and reporting per sub-band in accordance with aspects of the present disclosure. In some examples, process flow 400 may implement aspects of wireless communications system 100, wireless communications system 200, and collection of operations 300. The process flow 400 may illustrate communications between a base station 105-*b* and a UE 115-*b*, which may be examples of corresponding devices as described herein. In some aspects, for example, the UE 115-*b* may correspond to a wireless device as described with reference to FIGS. 2 through 5 and the base station 105-*b* may correspond to a transmitting device as also described with reference to FIGS. 2 through 5.

The process flow 400 illustrates an exemplary collection of operations performed to support the selection of a DL DMRS configuration. For example, the process flow 400 depicts signaling that may be exchanged and processing that may be performed to support selecting a DL DMRS configuration. The process flow 400 may be related to signaling preferred transmission parameters, such as a preferred DL DMRS configurations from the UE 115-*b* (e.g., a wireless device) to the base station 105-*b* (e.g., a transmitting device).

At 405, an offline numerical training procedure may be performed for UE 115-*b*. Based on the training procedure, one or more mappings that indicate previously determined differences in values computed for a link quality characteristic determined using reference signal transmissions of a first type (e.g., CSI-RS) and reference signal transmissions of a second type (e.g., DMRS) may be generated, as described herein and with reference to FIG. 2. For example, UE 115-*b* may perform link quality characteristic training to determine a mapping between a first link quality characteristic (e.g., a CSI-RS SINR) and a second link quality characteristic (e.g., a DMRS SINR).

At 410, the base station 105-*b* and the UE 115-*b* may exchange control signaling (e.g., RRC signaling). The UE 115-*b* may signal a capability for selecting DL DMRS configurations. For example, the UE 115-*b* may signal a capability of selecting a DL DMRS configuration for each sub-band associated with a data transmission from the base station 105-*b*. Additionally or alternatively, the base station 105-*b* may transmit a message that directs the UE 115-*b* to use a CSF reporting format that supports indicating a DMRS configuration for each sub-band (e.g., by using a CSF reporting format with an additional field including an indication of multiple DMRS configurations).

At 415, the base station 105-*b* may select an initial DL DMRS configuration for the UE 115-*b*. In some examples, the initial DL DMRS configuration may include different DMRS configurations for each sub-band associated with a data transmission from the base station 105-*b*. In some other examples, the initial configuration may include a single DMRS configuration for the data transmission.

At 420, the base station 105-*b* may signal the initial DL DMRS configuration to the UE 115-*b*. The UE 115-*b* may determine that DL DMRS will be transmitted in accordance with the initial DL DMRS configuration.

At 425, the base station 105-*b* may transmit one or more reference signals to the UE 115-*b*. The base station 105-*b* may transmit any combination of DL DMRS, CSI-RS, TRS, or PTRS to the UE 115-*b*. The DL DMRS may be included as part of a data transmission that is also transmitted over a PDSCH at 425. The base station 105-*b* may transmit a DL DMRS in accordance with the initial DL DMRS configuration. In some aspects, the base station 105-*b* may transmit a CSI-RS in accordance with a configured CSI-RS configuration. In some cases, the base station 105-*b* may be prohibited from transmitting over interference management resources (e.g., ZP CSI-IM resources).

At 430, the UE 115-*b* may use the reference signals to determine channel characteristics and/or reception characteristics for a downlink channel between the base station 105-*b* and the UE 115-*b*, as described herein and with reference to FIG. 3. For example, the UE 115-*b* may determine a channel matrix, a noise variance, and an SINR based on a received CSI-RS and a monitored CSI-IM resource. The UE 115-*b* may determine a Doppler frequency and a delay spread (e.g., a channel delay spread characteristic) based on a received TRS. The UE 115-*b* may also determine reception characteristics for the downlink channel (reception SNR). The determined channel characteristics may include the first link quality characteristic (e.g., CSI-RS SINR). In some examples, the UE 115-*b* may use the determined channel characteristics and the mapping determined at 405 to determine a set of channel characteristics associated with each sub-band associated with the PDSCH. The set of channel characteristics associated with each sub-band may include the second link quality characteristic (e.g., the DMRS SINR).

At 435, the UE 115-*b* may select a DL DMRS configuration for each sub-band that maximizes a communication metric (e.g., a spectral efficiency) for the PDSCH relative to other DL DMRS configurations, as described herein and with reference to FIG. 3. In some aspects, the UE 115-*b* may use the determined channel characteristics, reception characteristics, and identified DL DMRS configuration to determine additional transmission characteristics (e.g., channel quality/CQI) for the PDSCH (e.g., the downlink data channel).

At 440, the UE 115-b may generate a CSF report that includes a PMI, RI, CQI, and DMI. A value (or values) for the DMI may be determined based on the identified DL DMRS configuration for each sub-band. For example, the UE 115-b may set DMI to a value that corresponds to the selected DL DMRS configuration for each sub-band. Alternatively, the UE 115-b may generate the CSF report including multiple DMIs, where each DMI is set to a value that corresponds to a single DL DMRS configuration for a sub-band. A value for the CQI may be determined based on the identified DL DMRS configuration, PMI, RI, or any combination thereof. In some examples, the UE 115-b may determine a different CQI for each sub-band associated with a different DL DMRS configuration. In some cases, the DMI (or DMIs) may be included in a DMI field of the CSF report.

At 445, the UE 115-b may transmit an indication of the selected DL DMRS configuration for each sub-band to the base station 105-b. In some cases, the indication may be included in a CSF report that is transmitted by the UE 115-b to base station 105-b. The base station 105-b may decode the CSF report to determine a value of the signaled PMI, RI, CQI, DMI, or some combination thereof for each sub-band associated with the PDSCH. In some other cases, the UE 115-b may transmit the indication of the selected DL DMRS configuration for each sub-band to the base station 105-b in a report coupled to the CSF report.

At 450, the base station 105-b may select a DL DMRS configuration for each sub-band based on the DMI included in the CSF report. In some cases, the base station 105-b may select a DL DMRS configuration for each sub-band that corresponds to the DL DMRS configurations indicated by the DMI. In some other cases, the base station 105-b may select a DL DMRS configuration for each sub-band based on the DL DMRS configurations indicated by the DMI and scheduling criteria.

At 455, the base station 105-b may signal the selected DL DMRS configuration to the UE 115-b. In some aspects, the base station 105-b may signal the selected DL DMRS configuration in a DCI message or via a MAC-CE or in a combination of both of them where some list of equivalent DMRS configurations is first activated using MAC-CE and then multiple of them (e.g., one for each sub-band) is selected by each scheduling DCI.

At 460, the base station 105-b may transmit multiple DL DMRSs to the UE 115-b in accordance with the selected DL DMRS configurations. For example, the base station 105-b may use a first DL DMRS configured in accordance with a first DL DMRS configuration for a first sub-band and may use a second DL DMRS configured in accordance with a second DL DMRS configuration for a second sub-band. As such, the base station 105-b and the UE 115-b may increase the achievable throughput and spectral efficiency for communications between the base station 105-b and the UE 115-b.

Although described with reference to selection of a DL DMRS configuration, various aspects of the process flow 400 may be implemented to select an UL DMRS configuration. For example, the transmission of reference signals at 425 and the transmission of DMRS at 460 may be performed by the UE 115-b, and the operations at 430, 435, 440, and 445 may be performed by the base station 105-b. In order to perform the operations at 430, 435, and 440 the base station 105-b may perform at least a portion of the operations described herein and with reference to FIG. 3 (e.g., the operations described at 305 through 340). The base station 105-b may also determine various characteristics of the uplink channel, including Doppler frequency.

Figure 5:
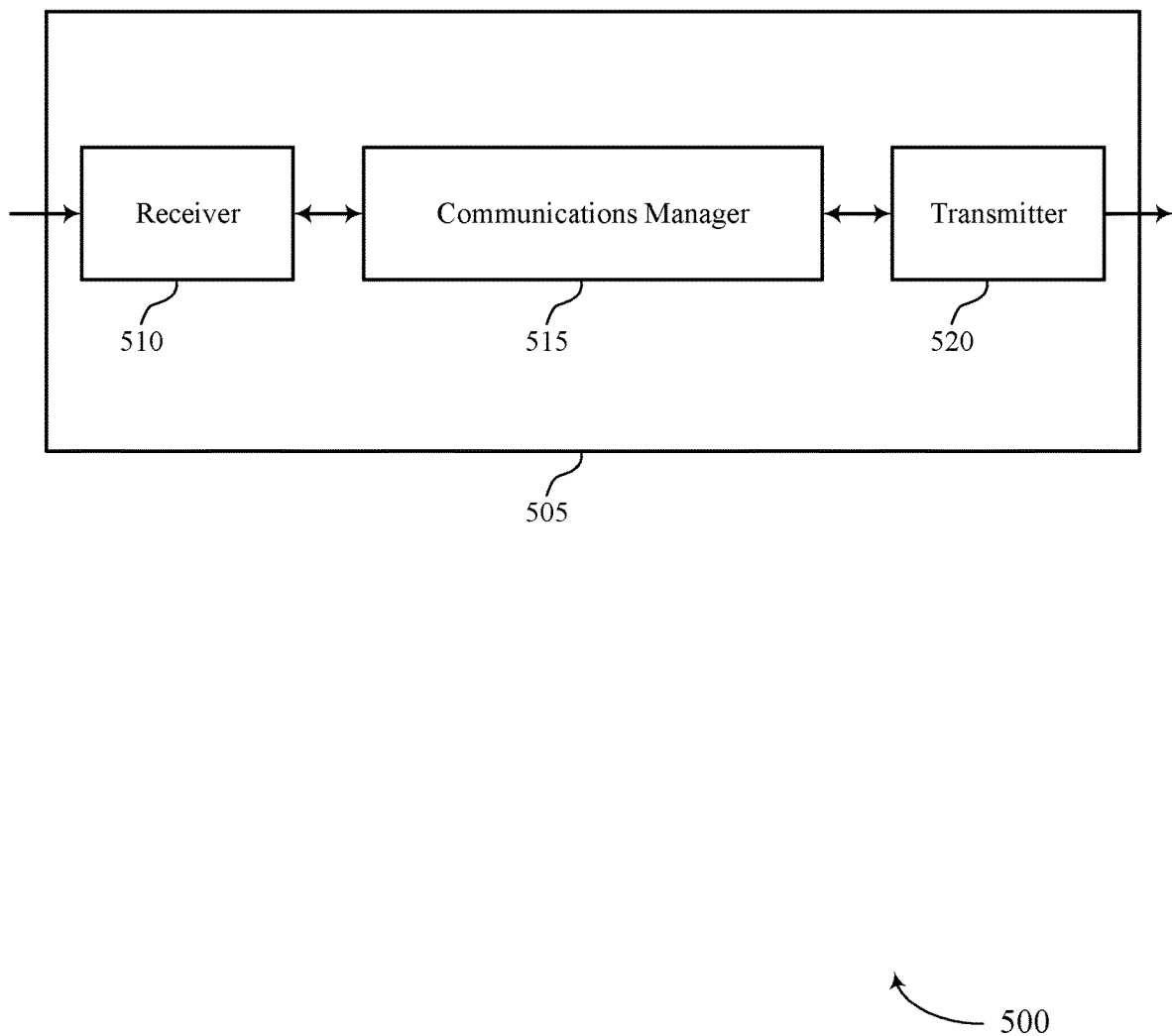
FIGS. 5 and 6 show block diagrams of devices that support demodulation reference signal configuration selection and reporting per sub-band in accordance with aspects of the present disclosure.

FIG. 5 shows a block diagram 500 of a device 505 that supports demodulation reference signal configuration selection and reporting per sub-band in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to demodulation reference signal configuration selection and reporting per sub-band, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a set of channel characteristics and a first link quality characteristic for each sub-band of one or more sub-bands associated with a channel based on one or more downlink reference signals or a channel state information interference management (CSI-IM) resource, or both; identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations; select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands; and transmit, to a base station, an indication of the demodulation reference signal configuration for each of the one or more sub-bands. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for the device 505 to improve Doppler frequency estimation by configuring the device 505 to use an SRS configuration that has an appropriate repetition spacing tailored to the deployment scenario. Additionally, the device 505 may support techniques for the device 505 to select an uplink DMRS configuration that enables an increase in the spectral efficiency of a link.

Figure 6:
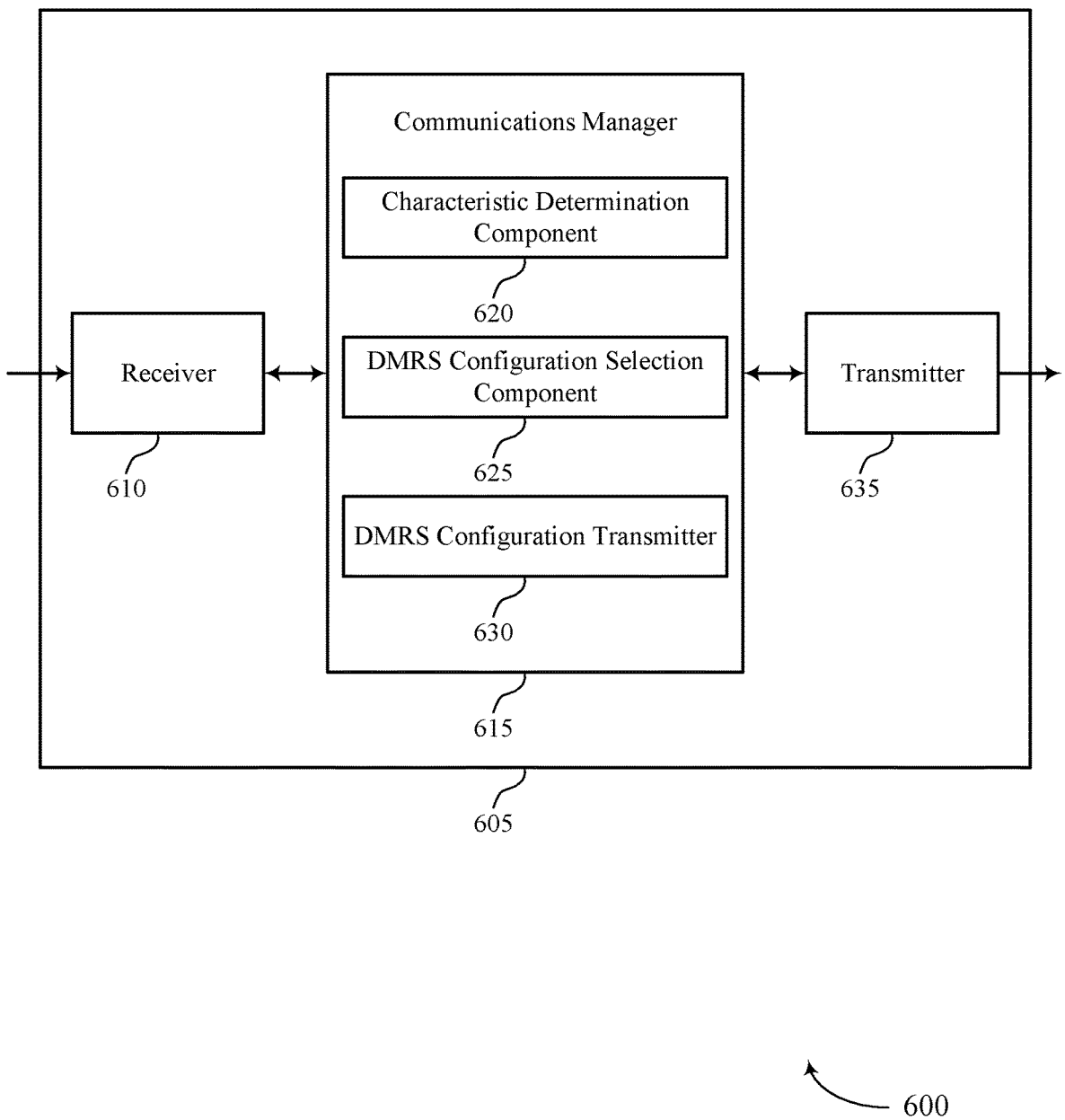

FIG. 6 shows a block diagram 600 of a device 605 that supports demodulation reference signal configuration selection and reporting per sub-band in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to demodulation reference signal configuration selection and reporting per sub-band, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a characteristic determination component 620, a DMRS configuration selection component 625, and a DMRS configuration transmitter 630. The communications manager 615 may be an example of aspects of the communications manager 810 described herein.

The characteristic determination component 620 may determine a set of channel characteristics and a first link quality characteristic for each sub-band of one or more sub-bands associated with a channel based on one or more downlink reference signals or a channel state information interference management (CSI-IM) resource, or both. Additionally, the characteristic determination component 620 may identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations.

The DMRS configuration selection component 625 may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands.

The DMRS configuration transmitter 630 may transmit, to a base station, an indication of the demodulation reference signal configuration for each of the one or more sub-bands.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
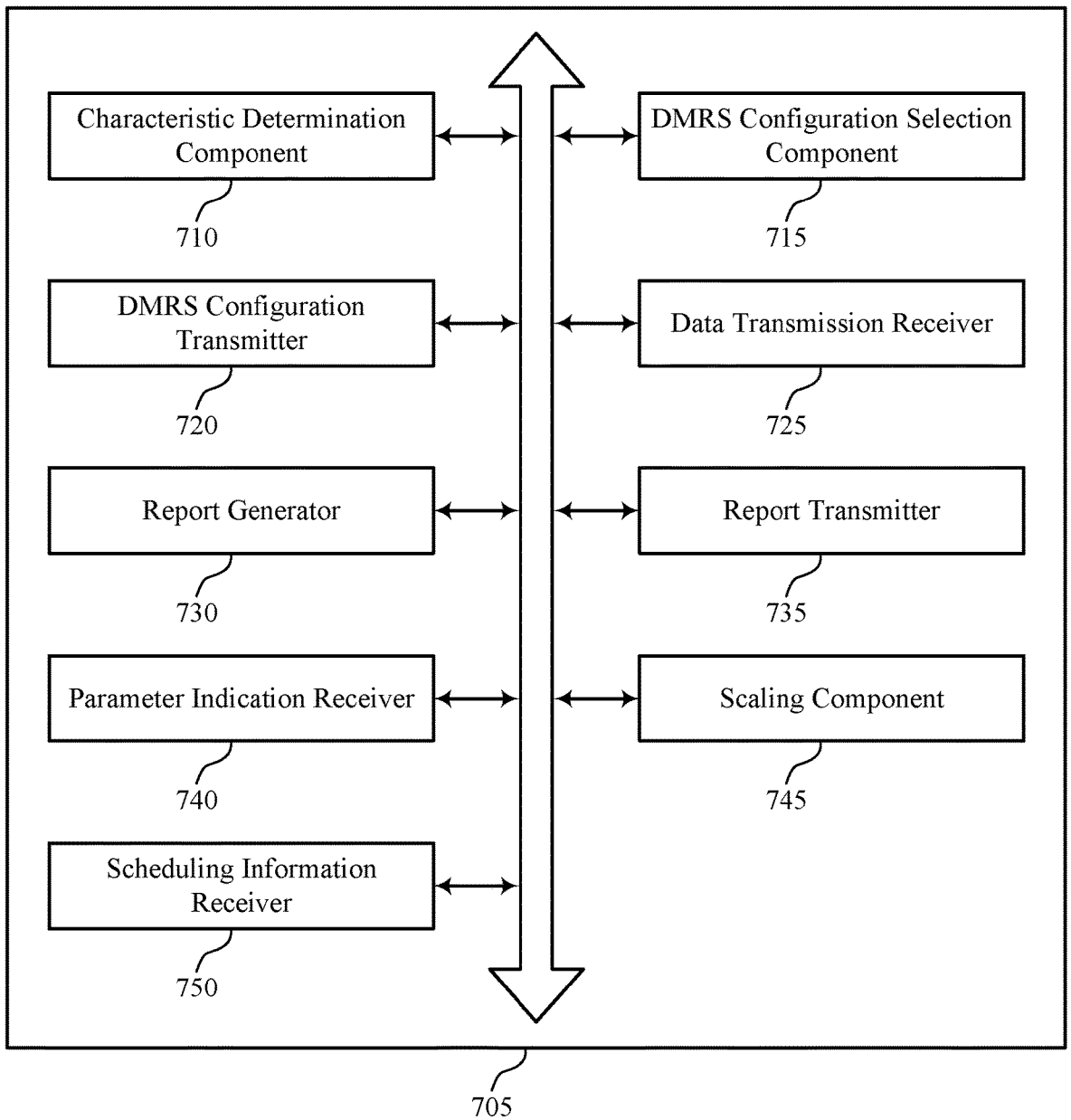
FIG. 7 shows a block diagram of a communications manager that supports demodulation reference signal configuration selection and reporting per sub-band in accordance with aspects of the present disclosure.

FIG. 7 shows a block diagram 700 of a communications manager 705 that supports demodulation reference signal configuration selection and reporting per sub-band in accordance with aspects of the present disclosure. The communications manager 705 may be an example of aspects of a communications manager 515, a communications manager 615, or a communications manager 810 described herein. The communications manager 705 may include a characteristic determination component 710, a DMRS configuration selection component 715, a DMRS configuration transmitter 720, a data transmission receiver 725, a report generator 730, a report transmitter 735, a parameter indication receiver 740, a scaling component 745, and a scheduling information receiver 750. Each of these modules may communicate, directly or indirectly, with one another (e.g., via one or more buses).

The characteristic determination component 710 may determine a set of channel characteristics and a first link quality characteristic for each sub-band of one or more sub-bands associated with a channel based on one or more downlink reference signals or a channel state information interference management (CSI-IM) resource, or both. In some examples, the characteristic determination component 710 may identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations.

In some examples, the characteristic determination component 710 may determine a first value for the communication efficiency metric for a first sub-band based on a temporal density, a frequency density, a first power level for a first demodulation reference signal configuration relative to a second power level for a data transmission, and a second link quality characteristic for the first sub-band for the first demodulation reference signal configuration. In some examples, the characteristic determination component 710 may determine, for each remaining demodulation reference signal configuration of the set of demodulation reference signal configurations for the first sub-band, a first set of values for the communication efficiency metric based on respective temporal densities, respective frequency densities, respective power levels relative to the second power level for the data transmission, and respective second link quality characteristics of each of the remaining demodulation reference signal configurations. In some examples, the characteristic determination component 710 may determine the first value for the communication efficiency metric associated with the first demodulation reference signal configuration is greater than the first set of values for the communication efficiency metric associated with each of the remaining demodulation reference signal configurations. In some examples, the characteristic determination component 710 may determine that a second value for the communication efficiency metric associated with a second demodulation reference signal configuration for a second sub-band is greater than a second set of values for the communication efficiency metric associated with each of the remaining demodulation reference signal configurations for the second sub-band.

In some cases, the one or more downlink reference signals include a CSI reference signal (CSI-RS), a tracking reference signal (TRS), or both.

The DMRS configuration selection component 715 may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands. In some examples, the DMRS configuration selection component 715 may select the first demodulation reference signal configuration for the first sub-band. In some examples, the DMRS configuration selection component 715 may select the second demodulation reference signal configuration for the second sub-band.

The DMRS configuration transmitter 720 may transmit, to a base station, an indication of the demodulation reference signal configuration for each of the one or more sub-bands. In some cases, the indication of the demodulation reference signal configuration for each of the one or more sub-bands is transmitted via an uplink shared channel or an uplink control channel with a long uplink control channel format.

The data transmission receiver 725 may receive, from the base station, a data transmission associated with the one or more sub-bands over a data channel based on the indication of the demodulation reference signal configuration for each of the one or more sub-bands, where the data transmission includes a demodulation reference signal for each of the one or more sub-bands associated with the data transmission.

The report generator 730 may generate a report that includes the indication of the demodulation reference signal configuration for each of the one or more sub-bands. In some cases, the report includes an indication of a wideband demodulation reference signal configuration. In some examples, the report generator 730 may generate a wideband channel quality indicator associated with the wideband demodulation reference signal configuration and one or more of sub-band channel quality indicators associated with the demodulation reference signal configuration for each of the one or more sub-bands, where the report includes the wideband channel quality indicator and the one or more of sub-band channel quality indicators. In some cases, the indication of the wideband demodulation reference signal configuration includes an absolute index, where each indication of the demodulation reference signal configuration for each of the one or more sub-bands includes a differential index whose value is with reference to a value of the absolute index.

In some examples, the report generator 730 may determine that a set of channel state information reports are to be multiplexed with each other on an uplink resource, where a channel state information report of the set includes a first part and a second part, where the first part or the second part includes the indication of the demodulation reference signal configuration for at least one of the one or more sub-bands and where the first part includes an indication of a wideband demodulation reference signal configuration for an entire reporting band. In some examples, the report generator 730 may identify a set of priority rules for prioritizing the first part over the second part, where transmitting the indication of the demodulation reference signal configuration for each of the one or more sub-bands is based on the set of priority rules. In some cases, the channel state information report of the set includes at least one channel quality indicator associated with the at least one of the one or more sub-bands, where the at least one channel quality indicator has a priority higher than or equal to the indication of the demodulation reference signal configuration for the at least one of the one or more sub-band according to the set of priority rules.

In some examples, the report generator 730 may determine a channel quality indicator for each of the one or more sub-bands based on the selected demodulation reference signal configuration for each of the one or more sub-bands. In some cases, the report is coupled with a channel state feedback report or includes the channel state feedback report. In some cases, the channel state feedback report includes a sub-band channel quality indicator, a wide-band channel quality indicator, a rank indicator, a wide-band precoding matrix indicator, a sub-band precoding matrix indicator, or a combination thereof.

The report transmitter 735 may transmit the report to the base station, where transmitting the indication includes transmitting the report to the base station. In some examples, the report transmitter 735 may transmit the report based on a received indication of one or more parameters. In some examples, the report transmitter 735 may transmit a first report including an indication of a wideband demodulation reference signal configuration and one or more channel quality indicators associated with the one or more sub-bands based on first scheduling information.

In some examples, the report transmitter 735 may transmit, to the base station, an indication of the channel quality indicator defined based on the selected demodulation reference signal configuration for each of the one or more sub-bands.

The parameter indication receiver 740 may receive an indication of one or more parameters associated with a channel state information report configuration. In some examples, the parameter indication receiver 740 may receive, from the base station, an indication of an integer factor. In some examples, the parameter indication receiver 740 may receive a configuration of the second report based on one or more channel quality indicators associated with the one or more sub-bands. In some examples, the parameter indication receiver 740 may receive, from the base station, downlink control information including a bit indicating whether the demodulation reference signal configuration for each of the one or more sub-bands of a scheduled allocation of one or more physical resource groups are the same as the demodulation reference signal configuration for each of the one or more sub-bands selected in a last delivered indication regarding the selected demodulation reference signal configurations.

In some examples, the parameter indication receiver 740 may receive a channel state information report configuration including an indication of one or more resources for transmitting the indication of the demodulation reference signal configuration for each of the one or more sub-bands coupled to or included in a channel state information report, where the one or more resources include one or more aperiodic resources, one or more periodic resources, or one or more semi-persistently scheduled resources, or any combination thereof. In some cases, the one or more parameters include a sub-band size, a reporting band configuration, a demodulation reference signal field configuration indicating whether the report is to include a field for reporting one or more demodulation reference signal configurations, a demodulation reference signal report configuration indicating whether the one or more demodulation reference signal configurations include one or both of the demodulation reference signal configuration for each of the one or more sub-bands or a wideband demodulation reference signal configuration, or any combination thereof.

In some examples, the one or more parameters may include the sub-band size. In some such cases, the scaling component 745 may scale the sub-band size by an integer factor, where a total quantity of the one or more sub-bands, an effective sub-band size of the one or more sub-bands, or both is based on scaling the sub-band size by the integer factor.

In some examples, the report may include a second report includes a second report that includes the demodulation reference signal configuration for each of the one or more sub-bands. In such cases, the scheduling information receiver 750 may receive first scheduling information for transmitting a first report including an indication of a wideband demodulation reference signal configuration and one or more channel quality indicators associated with the one or more sub-bands. In some examples, the scheduling information receiver 750 may receive second scheduling information for transmitting the second report, where transmitting the second report is based on receiving the second scheduling information and transmitting the first report. In some examples, receiving the second scheduling information is based on the one or more channel quality indicators. In some cases, the one or more channel quality indicators include a set of channel quality indicators, where the set of channel quality indicators are associated with a set of sub-bands including the one or more sub-bands, and where the configuration of the second report indicates one or more sub-bands from the set of sub-bands based on the set of channel quality indicators of the first report, where transmitting the second report is based on receiving the configuration of the second report, the second scheduling information, or both.

Figure 8:
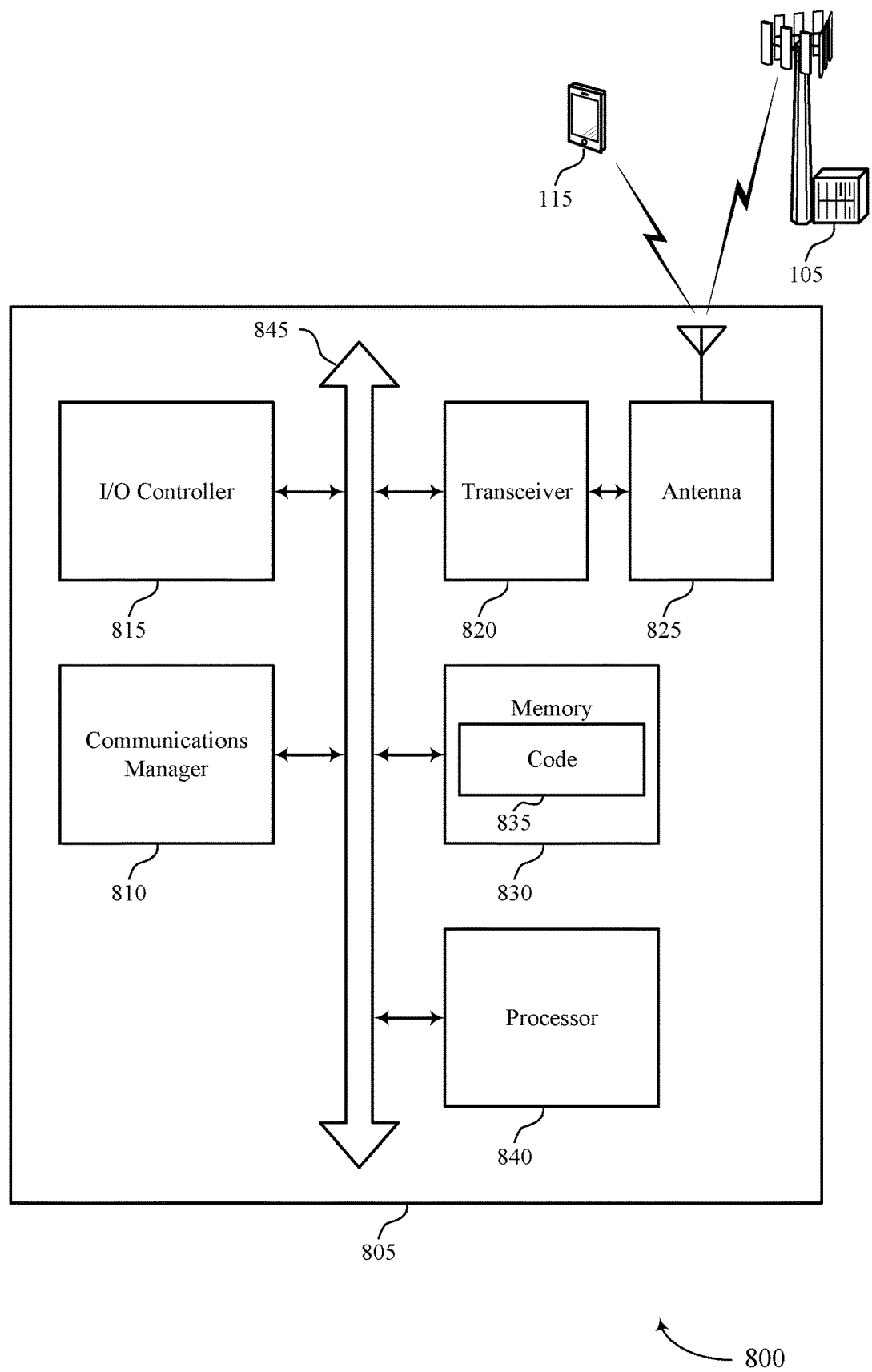
FIG. 8 shows a diagram of a system including a device that supports demodulation reference signal configuration selection and reporting per sub-band in accordance with aspects of the present disclosure.

FIG. 8 shows a diagram of a system 800 including a device 805 that supports demodulation reference signal configuration selection and reporting per sub-band in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine a set of channel characteristics and a first link quality characteristic for each sub-band of one or more sub-bands associated with a channel based on one or more downlink reference signals or a channel state information interference management (CSI-IM) resource, or both; identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations; select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands; and transmit, to a base station, an indication of the demodulation reference signal configuration for each of the one or more sub-bands.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting demodulation reference signal configuration selection and reporting per sub-band).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

By including or configuring the communications manager 810 in accordance with examples as disclosed herein, the device 805 may support techniques for the device 805 to improve Doppler frequency estimation by configuring the device 805 to use an SRS configuration that has an appropriate repetition spacing tailored to the deployment scenario. Additionally, the device 805 may support techniques for the device 805 to select an uplink DMRS configuration that enables an increase in the spectral efficiency of a link.

Figure 9:
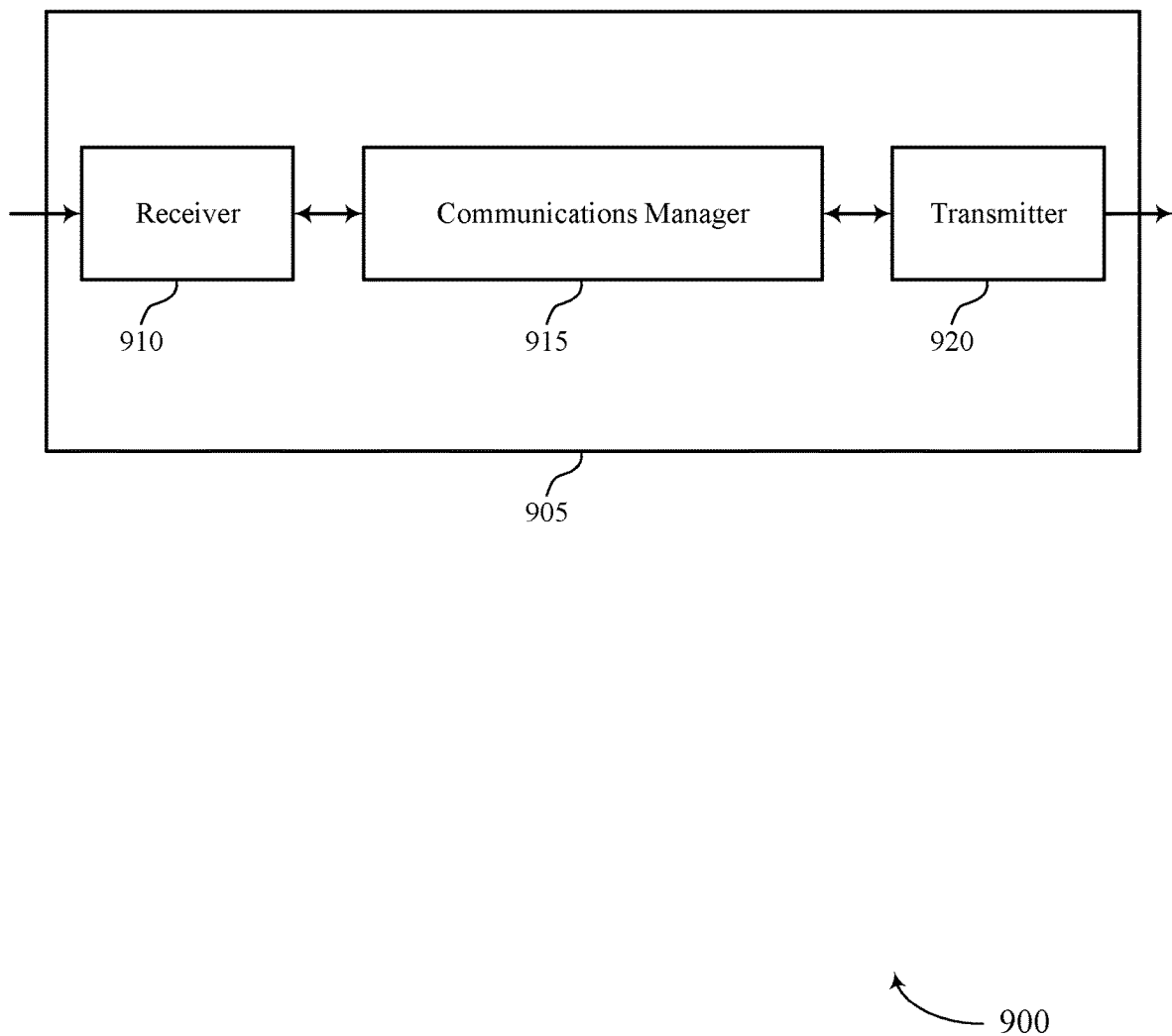
FIGS. 9 and 10 show block diagrams of devices that support demodulation reference signal configuration selection and reporting per sub-band in accordance with aspects of the present disclosure.

FIG. 9 shows a block diagram 900 of a device 905 that supports demodulation reference signal configuration selection and reporting per sub-band in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to demodulation reference signal configuration selection and reporting per sub-band, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations; receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands; select a different demodulation reference signal configuration of the set of demodulation reference signal configurations for each of the one or more sub-bands that are different than the first one or more demodulation reference signal configurations based on the indication of the second one or more demodulation reference signal configurations; and transmit, to the user equipment, a second transmission that includes a second demodulation reference signal for each of the one or more sub-bands that are configured in accordance with the different demodulation reference signal configuration for each of the one or more sub-bands. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 915 in accordance with examples as described herein, the device 905 (e.g., a processor controlling or otherwise coupled to the receiver 910, the transmitter 920, the communications manager 915, or a combination thereof) may support techniques for the device 905 to improve Doppler frequency estimation by configuring a UE 115 to use an SRS configuration that has an appropriate repetition spacing tailored to the deployment scenario. Additionally, the device 905 may support techniques for the device 905 to enable a UE 115 to select an uplink DMRS configuration that enables an increase in the spectral efficiency of a link.

Figure 10:
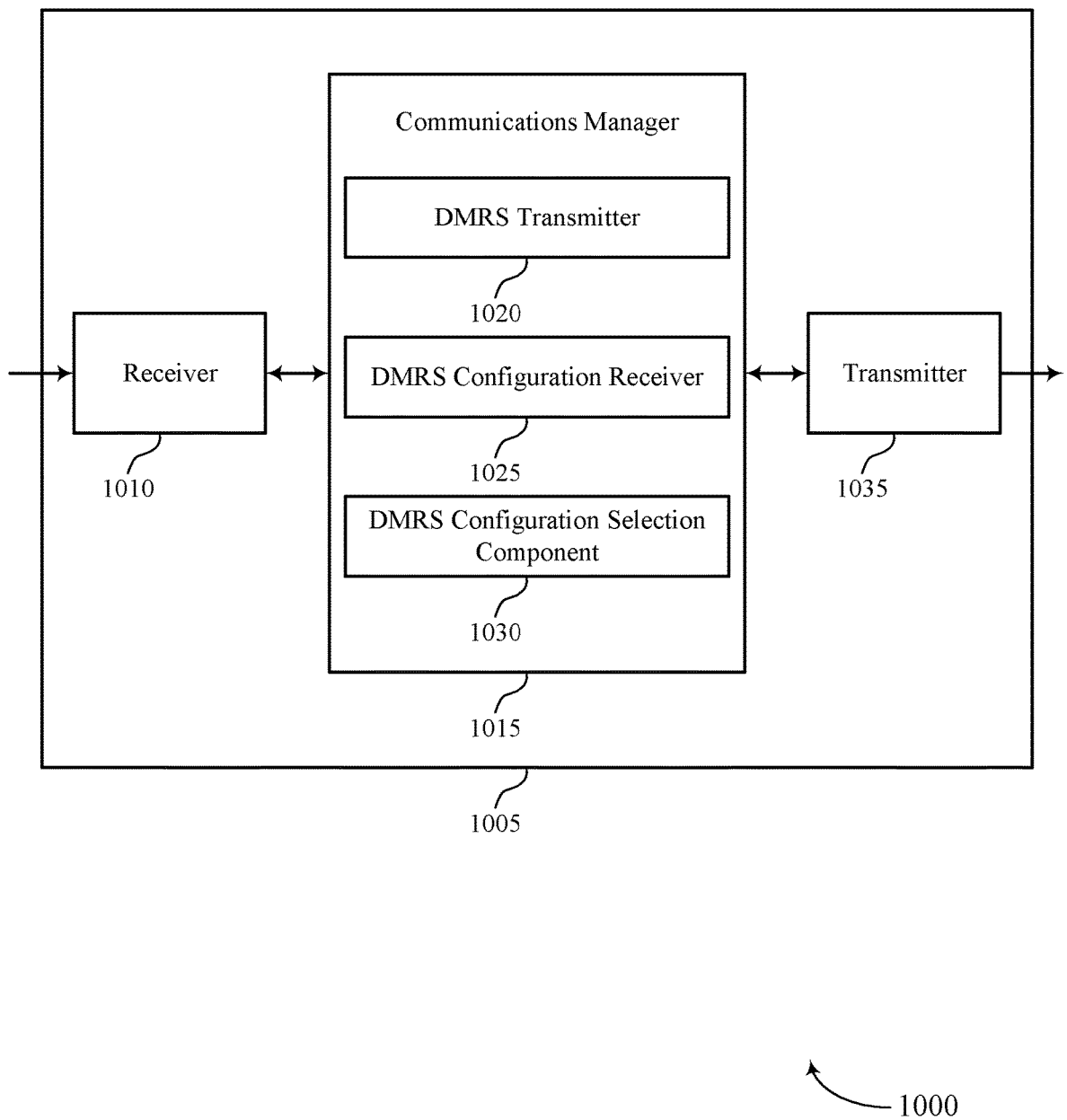

FIG. 10 shows a block diagram 1000 of a device 1005 that supports demodulation reference signal configuration selection and reporting per sub-band in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to demodulation reference signal configuration selection and reporting per sub-band, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DMRS transmitter 1020, a DMRS configuration receiver 1025, and a DMRS configuration selection component 1030. The communications manager 1015 may be an example of aspects of the communications manager 1210 described herein.

The DMRS transmitter 1020 may transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations. Additionally, the DMRS transmitter 1020 may transmit, to the user equipment, a second transmission that includes a second demodulation reference signal for each of the one or more sub-bands that are configured in accordance with different demodulation reference signal configuration for each of the one or more sub-bands.

The DMRS configuration receiver 1025 may receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands.

The DMRS configuration selection component 1030 may select a different demodulation reference signal configuration of the set of demodulation reference signal configurations for each of the one or more sub-bands that are different than the first one or more demodulation reference signal configurations based on the indication of the second one or more demodulation reference signal configurations.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
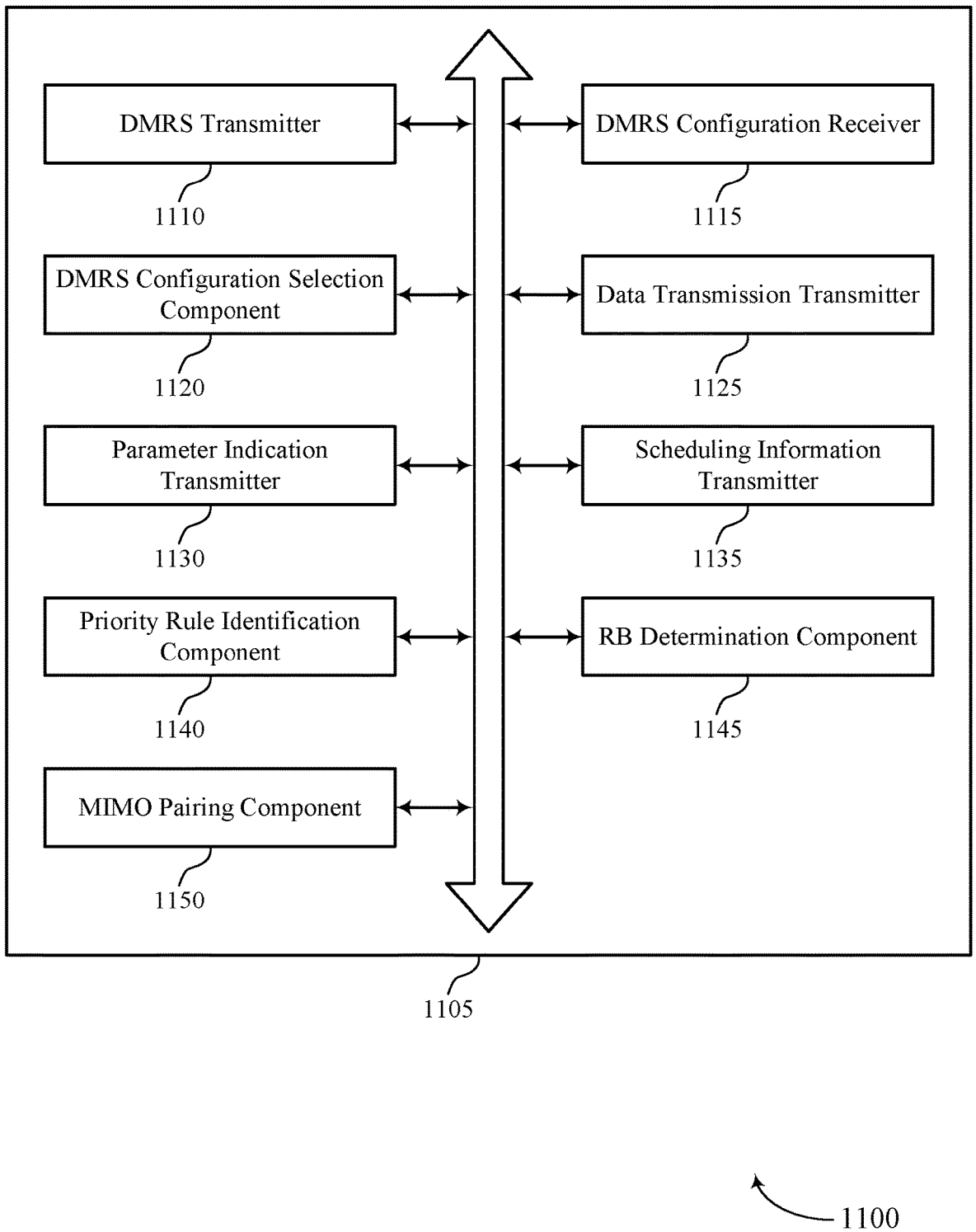
FIG. 11 shows a block diagram of a communications manager that supports demodulation reference signal configuration selection and reporting per sub-band in accordance with aspects of the present disclosure.

FIG. 11 shows a block diagram 1100 of a communications manager 1105 that supports demodulation reference signal configuration selection and reporting per sub-band in accordance with aspects of the present disclosure. The communications manager 1105 may be an example of aspects of a communications manager 915, a communications manager 1015, or a communications manager 1210 described herein. The communications manager 1105 may include a DMRS transmitter 1110, a DMRS configuration receiver 1115, a DMRS configuration selection component 1120, a data transmission transmitter 1125, a parameter indication transmitter 1130, a scheduling information transmitter 1135, a priority rule identification component 1140, a RB determination component 1145, and a MIMO pairing component 1150. Each of these modules may communicate, directly or indirectly, with one another (e.g., via one or more buses).

The DMRS transmitter 1110 may transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations. In some examples, the DMRS transmitter 1110 may transmit, to the user equipment, a second transmission that includes a second demodulation reference signal for each of the one or more sub-bands that are configured in accordance with different demodulation reference signal configuration for each of the one or more sub-bands.

The DMRS configuration receiver 1115 may receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands. In some examples, receiving the indication of the second one or more demodulation reference signal configurations includes receiving a report that includes the indication of the second one or more demodulation reference signal configurations. In some cases, the report includes an indication of a wideband demodulation reference signal configuration. In some cases, the report includes a wideband channel quality indicator associated with the wideband demodulation reference signal configuration and one or more sub-band channel quality indicators associated with the demodulation reference signal configuration for each of the one or more sub-bands.

In some cases, the indication of the wideband demodulation reference signal configuration includes an absolute index, and where each indication of the demodulation reference signal configuration for each of the one or more sub-bands includes a differential index whose value is with reference to a value of the absolute index. In some examples, the DMRS configuration receiver 1115 may receive the report based on a transmitted indication of the one or more parameters. In some examples, the DMRS configuration receiver 1115 may receive the first report including an indication of a wideband demodulation reference signal configuration and one or more channel quality indicators associated with the one or more sub-bands based on first scheduling information.

In some examples, the DMRS configuration receiver 1115 may receive a set of channel state information reports multiplexed with each other on an uplink resource, where the set of channel state information reports includes the channel state information report, where the first part or the second part of the channel state information report of the set includes the indication of the demodulation reference signal configuration for at least one of the one or more sub-bands based on a set of priority rules, and where the first part includes an indication of a wideband demodulation reference signal configuration for an entire reporting band. In some cases, the channel state information report of the set includes at least one channel quality indicator associated with the at least one of the one or more sub-bands, where the at least one channel quality indicator has a priority higher than or equal to the indication of the demodulation reference signal configuration for the at least one of the one or more sub-band according to the set of priority rules.

In some examples, the DMRS configuration receiver 1115 may receive an indication of one or more channel quality indicators associated with the one or more sub-bands. In some cases, the report is coupled with a channel state feedback report or includes the channel state feedback report. In some cases, the channel state feedback report includes a sub-band channel quality indicator, a wide-band channel quality indicator, a rank indicator, a wide-band precoding matrix indicator, a sub-band precoding matrix indicator, or a combination thereof. In some cases, the indication of the demodulation reference signal configuration for each of the one or more sub-bands is received via an uplink shared channel or an uplink control channel with a long uplink control channel format.

The DMRS configuration selection component 1120 may select a different demodulation reference signal configuration of the set of demodulation reference signal configurations for each of the one or more sub-bands that are different than the first one or more demodulation reference signal configurations based on the indication of the second one or more demodulation reference signal configurations.

In some examples, the second transmission may be a data transmission. In some such cases, the data transmission transmitter 1125 may transmit the data transmission over the one or more sub-bands, where each sub-band of the one or more sub-bands is associated with a different demodulation reference signal based on the different demodulation reference signal configurations for each of the one or more sub-bands.

The parameter indication transmitter 1130 may transmit one or more parameters associated with a channel state information report configuration. In some examples, the one or more parameters may include the sub-band size. In some such examples, the parameter indication transmitter 1130 may transmit, to the user equipment, an indication of an integer factor, where a total quantity of the one or more sub-bands, an effective sub-band size of the one or more sub-bands, or both is based on the sub-band size and the integer factor. In some examples, the parameter indication transmitter 1130 may transmit a configuration of the second report based on the one or more channel quality indicators. In some examples, the parameter indication transmitter 1130 may receive, from the user equipment, a channel quality indicator for each of the one or more sub-bands.

In some examples, the parameter indication transmitter 1130 may transmit, to the user equipment, downlink control information including a bit indicating whether the demodulation reference signal configuration for each of the one or more sub-bands of a scheduled allocation of one or more physical resource groups are the same as the demodulation reference signal configuration for each of the one or more sub-bands delivered by the user equipment in a last indication regarding the selected demodulation reference signal configurations. In some examples, the parameter indication transmitter 1130 may transmit a channel state information report configuration including an indication of one or more resources for transmitting the indication of the demodulation reference signal configuration for each of the one or more sub-bands, where the one or more resources include one or more aperiodic resources, one or more periodic resources, or one or more semi-persistently scheduled resources, or any combination thereof. In some cases, the one or more parameters include a sub-band size, a reporting band configuration, a demodulation reference signal field configuration indicating whether the report is to include a field for reporting one or more demodulation reference signal configurations, a demodulation reference signal report configuration indicating whether the one or more demodulation reference signal configurations include one or both of the demodulation reference signal configuration for each of the one or more sub-bands or a wideband demodulation reference signal configuration, or any combination thereof.

In some examples, the report may include a second report including the demodulation reference signal configuration for each of the one or more sub-bands. In some such examples, the scheduling information transmitter 1135 may transmit first scheduling information for transmitting a first report including an indication of a wideband demodulation reference signal configuration and one or more channel quality indicators associated with the one or more sub-bands. In some examples, the scheduling information transmitter 1135 may transmit second scheduling information for transmitting the second report, where receiving the second report is based on transmitting the second scheduling information and receiving the first report. In some examples, transmitting the second scheduling information is based on the one or more channel quality indicators. In some cases, the one or more channel quality indicators include a set of channel quality indicators, and where the set of channel quality indicators are associated with a set of sub-bands including the one or more sub-bands, and where the configuration of the second report indicates the one or more sub-bands from the set of sub-bands based on the set of channel quality indicators, where receiving the second report is based on transmitting the configuration of the second report, the second scheduling information, or both.

The priority rule identification component 1140 may identify a set of priority rules for prioritizing a first part of a channel state information report over a second part of the channel state information report.

The RB determination component 1145 may determine that an allocation size is below a threshold. In some examples, the RB determination component 1145 may determine a set of resource blocks based on the allocation size being below the threshold and the one or more channel quality indicators associated with the one or more sub-bands, where transmitting, to the user equipment, the second transmission including the second demodulation reference signal for each of the one or more sub-bands is according to the set of resource blocks and based on receiving the demodulation reference signal configuration for each of the one or more sub-bands.

The MIMO pairing component 1150 may pair the user equipment with a second user equipment in a same multiple-user multiple-input-multiple-output co-scheduling group based on receiving the indication of the demodulation reference signal configuration for each of the one or more sub-bands. In some examples, the MIMO pairing component 1150 may determine a demodulation reference signal density associated with the user equipment based on receiving the indication of the second one or more demodulation reference signal configurations, where pairing the user equipment with the second user equipment is based on the determined demodulation reference signal density.

Figure 12:
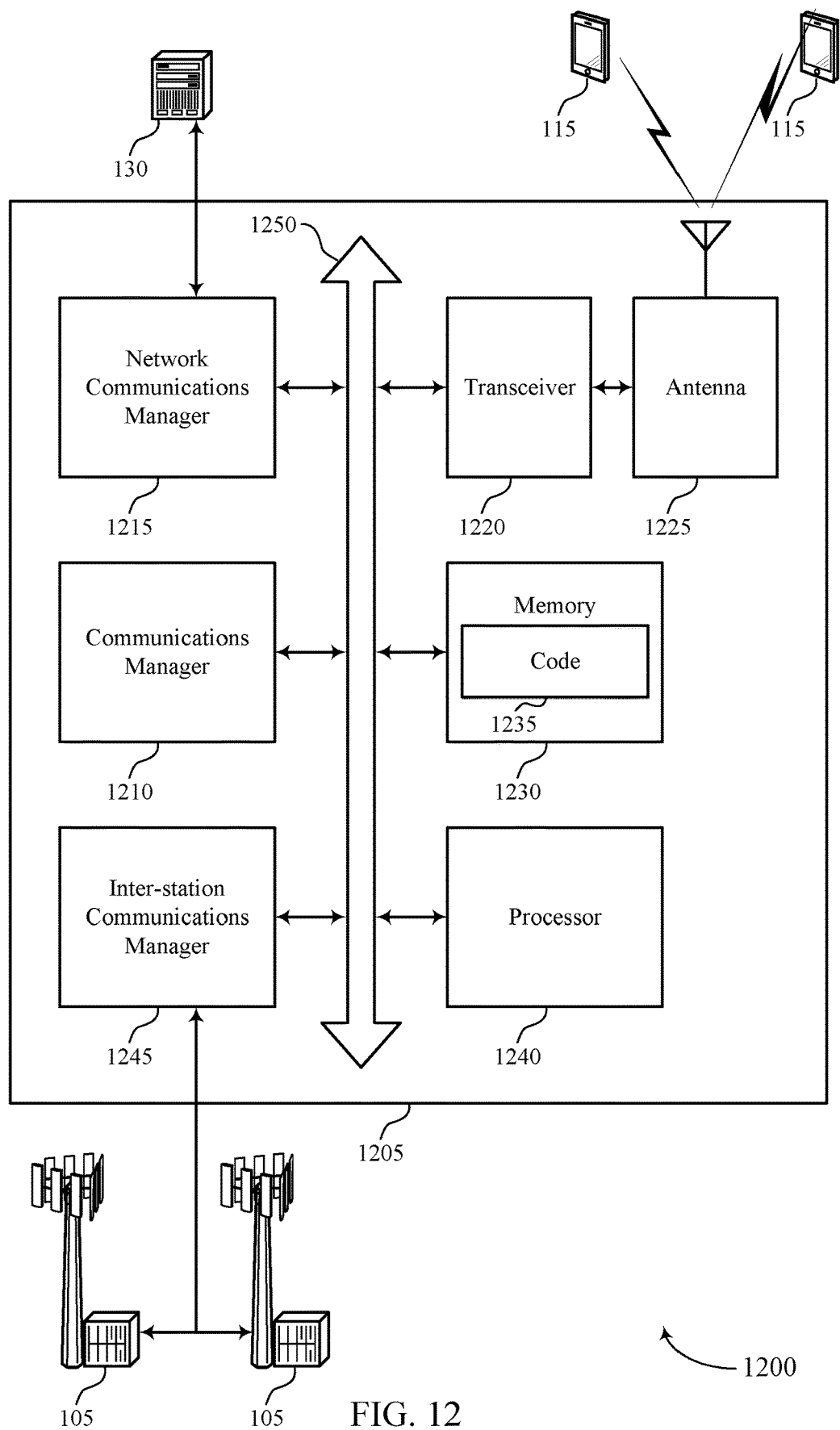
FIG. 12 shows a diagram of a system including a device that supports demodulation reference signal configuration selection and reporting per sub-band in accordance with aspects of the present disclosure.

FIG. 12 shows a diagram of a system 1200 including a device 1205 that supports demodulation reference signal configuration selection and reporting per sub-band in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations; receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands; select a different demodulation reference signal configuration of the set of demodulation reference signal configurations for each of the one or more sub-bands that are different than the first one or more demodulation reference signal configurations based on the indication of the second one or more demodulation reference signal configurations; and transmit, to the user equipment, a second transmission that includes a second demodulation reference signal for each of the one or more sub-bands that are configured in accordance with the different demodulation reference signal configuration for each of the one or more sub-bands.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting demodulation reference signal configuration selection and reporting per sub-band).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

By including or configuring the communications manager 1210 in accordance with examples as disclosed herein, the device 1205 may support techniques for the device 1205 to improve Doppler frequency estimation by configuring a UE 115 to use an SRS configuration that has an appropriate repetition spacing tailored to the deployment scenario. Additionally, the device 1205 may support techniques for the device 1205 to enable a UE 115 to select an uplink DMRS configuration that enables an increase in the spectral efficiency of a link.

Figure 13:
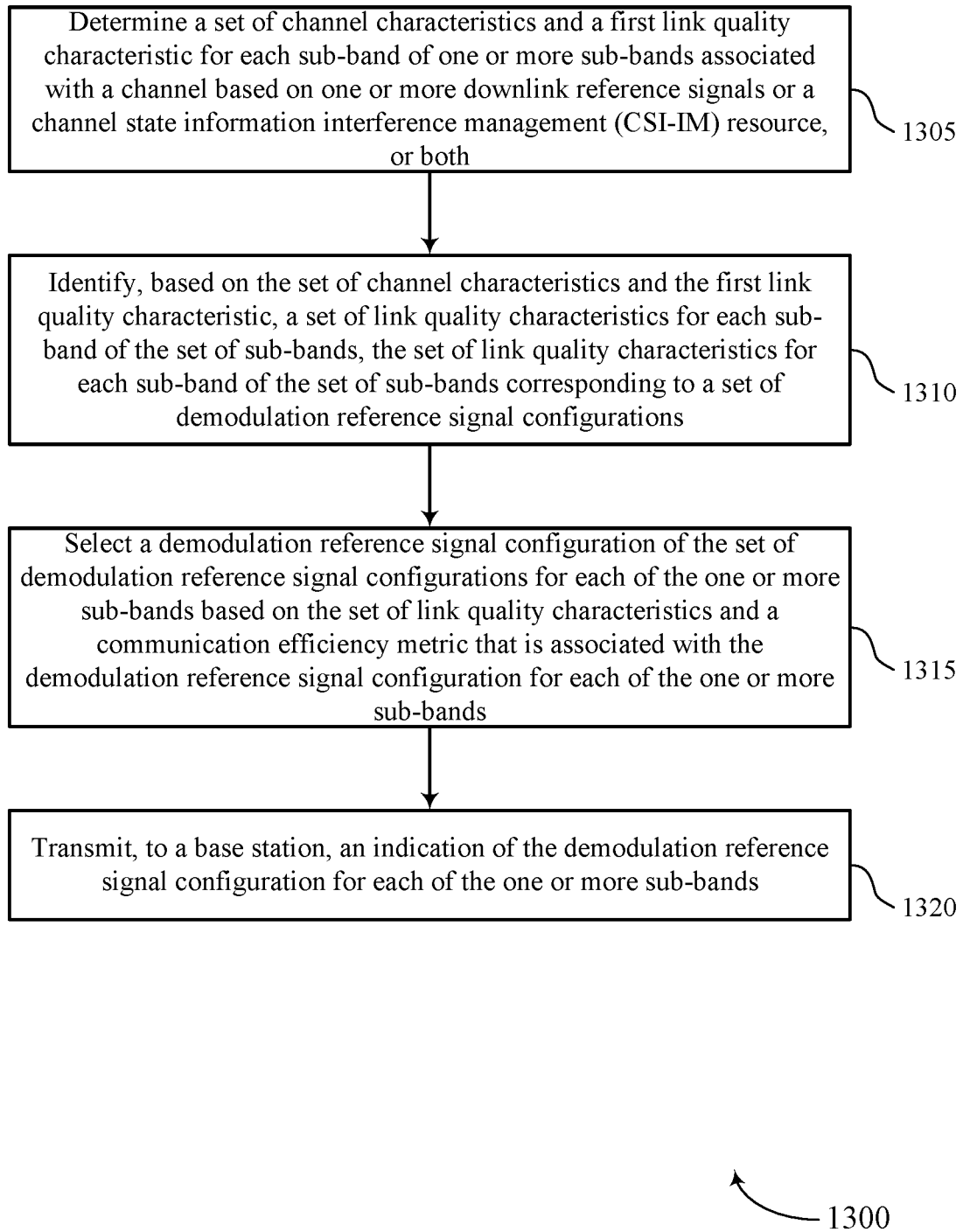
FIGS. 13 through 16 show flowcharts illustrating methods that support demodulation reference signal configuration selection and reporting per sub-band in accordance with aspects of the present disclosure.

FIG. 13 shows a flowchart illustrating a method 1300 that supports demodulation reference signal configuration selection and reporting per sub-band in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine a set of channel characteristics and a first link quality characteristic for each sub-band of one or more sub-bands associated with a channel based on one or more downlink reference signals or a channel state information interference management (CSI-IM) resource, or both. The operations of 1305 may be performed according to the methods described herein. In some examples, aspects of the operations of 1305 may be performed by a characteristic determination component as described with reference to FIGS. 5 through 8.

At 1310, the UE may identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations. The operations of 1310 may be performed according to the methods described herein. In some examples, aspects of the operations of 1310 may be performed by a characteristic determination component as described with reference to FIGS. 5 through 8.

At 1315, the UE may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands. The operations of 1315 may be performed according to the methods described herein. In some examples, aspects of the operations of 1315 may be performed by a DMRS configuration selection component as described with reference to FIGS. 5 through 8.

At 1320, the UE may transmit, to a base station, an indication of the demodulation reference signal configuration for each of the one or more sub-bands. The operations of 1320 may be performed according to the methods described herein. In some examples, aspects of the operations of 1320 may be performed by a DMRS configuration transmitter as described with reference to FIGS. 5 through 8.

Figure 14:
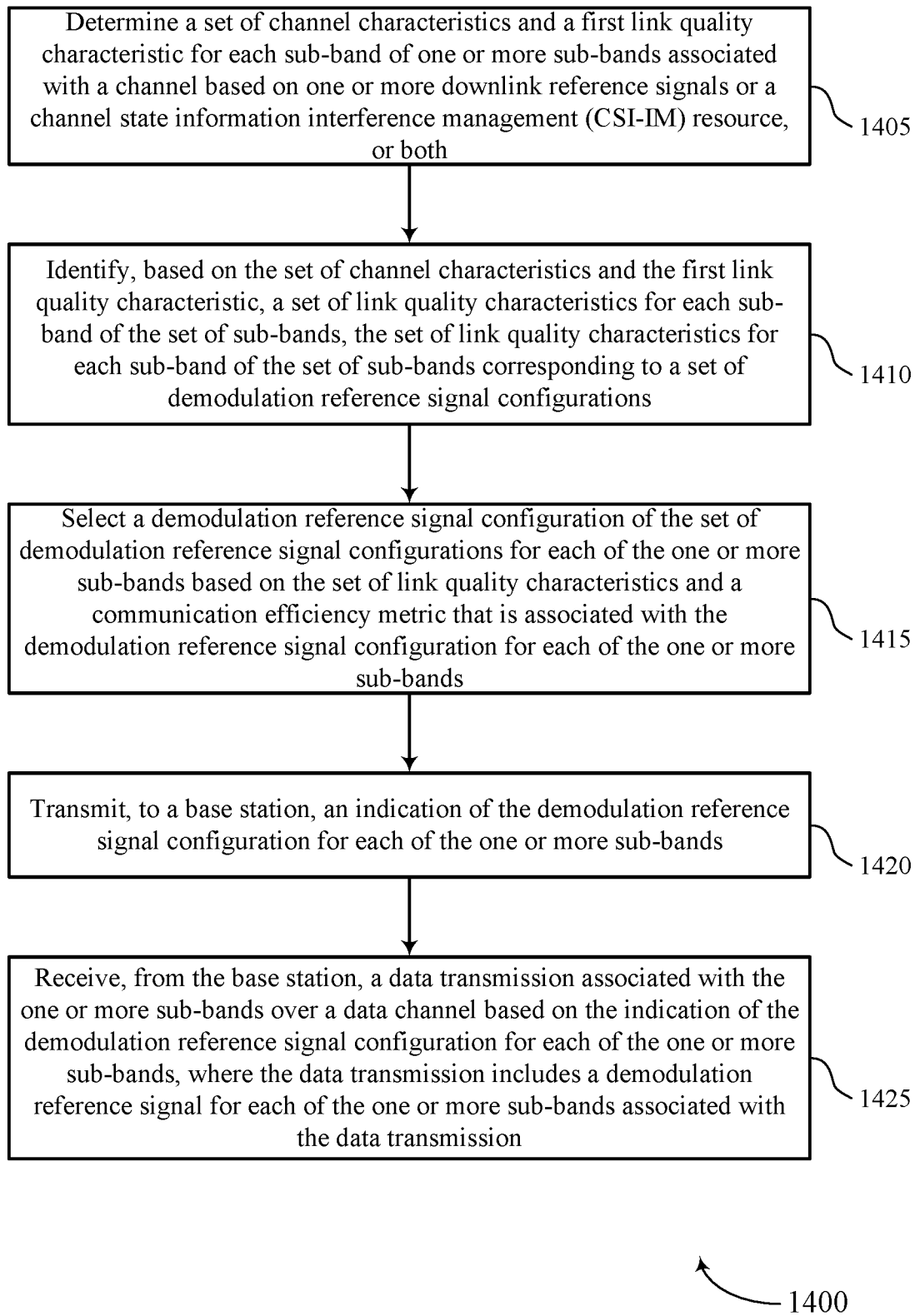

FIG. 14 shows a flowchart illustrating a method 1400 that supports demodulation reference signal configuration selection and reporting per sub-band in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine a set of channel characteristics and a first link quality characteristic for each sub-band of one or more sub-bands associated with a channel based on one or more downlink reference signals or a channel state information interference management (CSI-IM) resource, or both. The operations of 1405 may be performed according to the methods described herein. In some examples, aspects of the operations of 1405 may be performed by a characteristic determination component as described with reference to FIGS. 5 through 8.

At 1410, the UE may identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations. The operations of 1410 may be performed according to the methods described herein. In some examples, aspects of the operations of 1410 may be performed by a characteristic determination component as described with reference to FIGS. 5 through 8.

At 1415, the UE may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands. The operations of 1415 may be performed according to the methods described herein. In some examples, aspects of the operations of 1415 may be performed by a DMRS configuration selection component as described with reference to FIGS. 5 through 8.

At 1420, the UE may transmit, to a base station, an indication of the demodulation reference signal configuration for each of the one or more sub-bands. The operations of 1420 may be performed according to the methods described herein. In some examples, aspects of the operations of 1420 may be performed by a DMRS configuration transmitter as described with reference to FIGS. 5 through 8.

At 1425, the UE may receive, from the base station, a data transmission associated with the one or more sub-bands over a data channel based on the indication of the demodulation reference signal configuration for each of the one or more sub-bands, where the data transmission includes a demodulation reference signal for each of the one or more sub-bands associated with the data transmission. The operations of 1425 may be performed according to the methods described herein. In some examples, aspects of the operations of 1425 may be performed by a data transmission receiver as described with reference to FIGS. 5 through 8.

Figure 15:
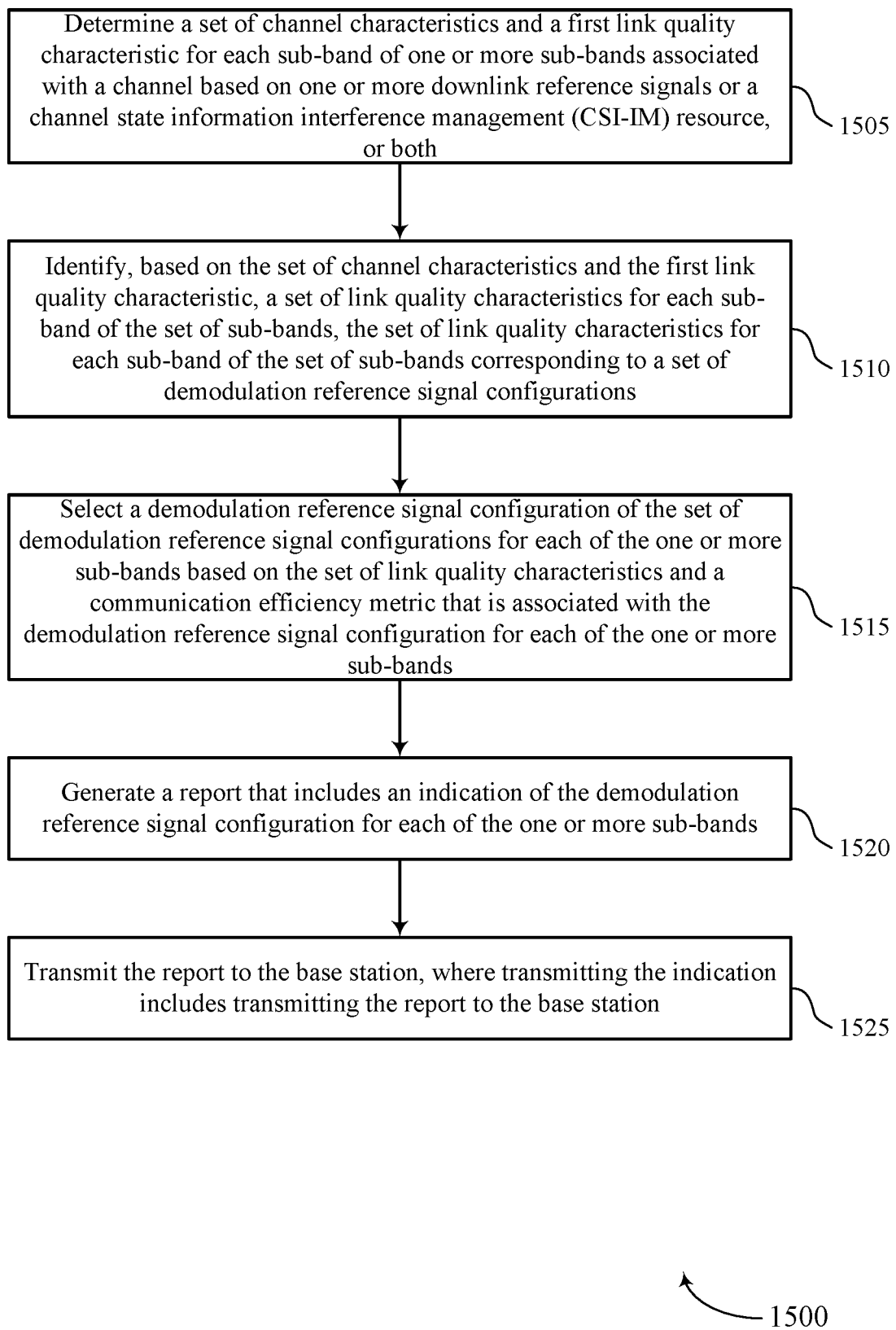

FIG. 15 shows a flowchart illustrating a method 1500 that supports demodulation reference signal configuration selection and reporting per sub-band in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may determine a set of channel characteristics and a first link quality characteristic for each sub-band of one or more sub-bands associated with a channel based on one or more downlink reference signals or a channel state information interference management (CSI-IM) resource, or both. The operations of 1505 may be performed according to the methods described herein. In some examples, aspects of the operations of 1505 may be performed by a characteristic determination component as described with reference to FIGS. 5 through 8.

At 1510, the UE may identify, based on the set of channel characteristics and the first link quality characteristic, a set of link quality characteristics for each sub-band of the set of sub-bands, the set of link quality characteristics for each sub-band of the set of sub-bands corresponding to a set of demodulation reference signal configurations. The operations of 1510 may be performed according to the methods described herein. In some examples, aspects of the operations of 1510 may be performed by a characteristic determination component as described with reference to FIGS. 5 through 8.

At 1515, the UE may select a demodulation reference signal configuration of the set of demodulation reference signal configurations for each of the one or more sub-bands based on the set of link quality characteristics and a communication efficiency metric that is associated with the demodulation reference signal configuration for each of the one or more sub-bands. The operations of 1515 may be performed according to the methods described herein. In some examples, aspects of the operations of 1515 may be performed by a DMRS configuration selection component as described with reference to FIGS. 5 through 8.

At 1520, the UE may generate a report that includes an indication of the demodulation reference signal configuration for each of the one or more sub-bands. The operations of 1520 may be performed according to the methods described herein. In some examples, aspects of the operations of 1520 may be performed by a report generator as described with reference to FIGS. 5 through 8.

At 1525, the UE may transmit the report to the base station. The operations of 1525 may be performed according to the methods described herein. In some examples, aspects of the operations of 1525 may be performed by a report transmitter as described with reference to FIGS. 5 through 8.

Figure 16:
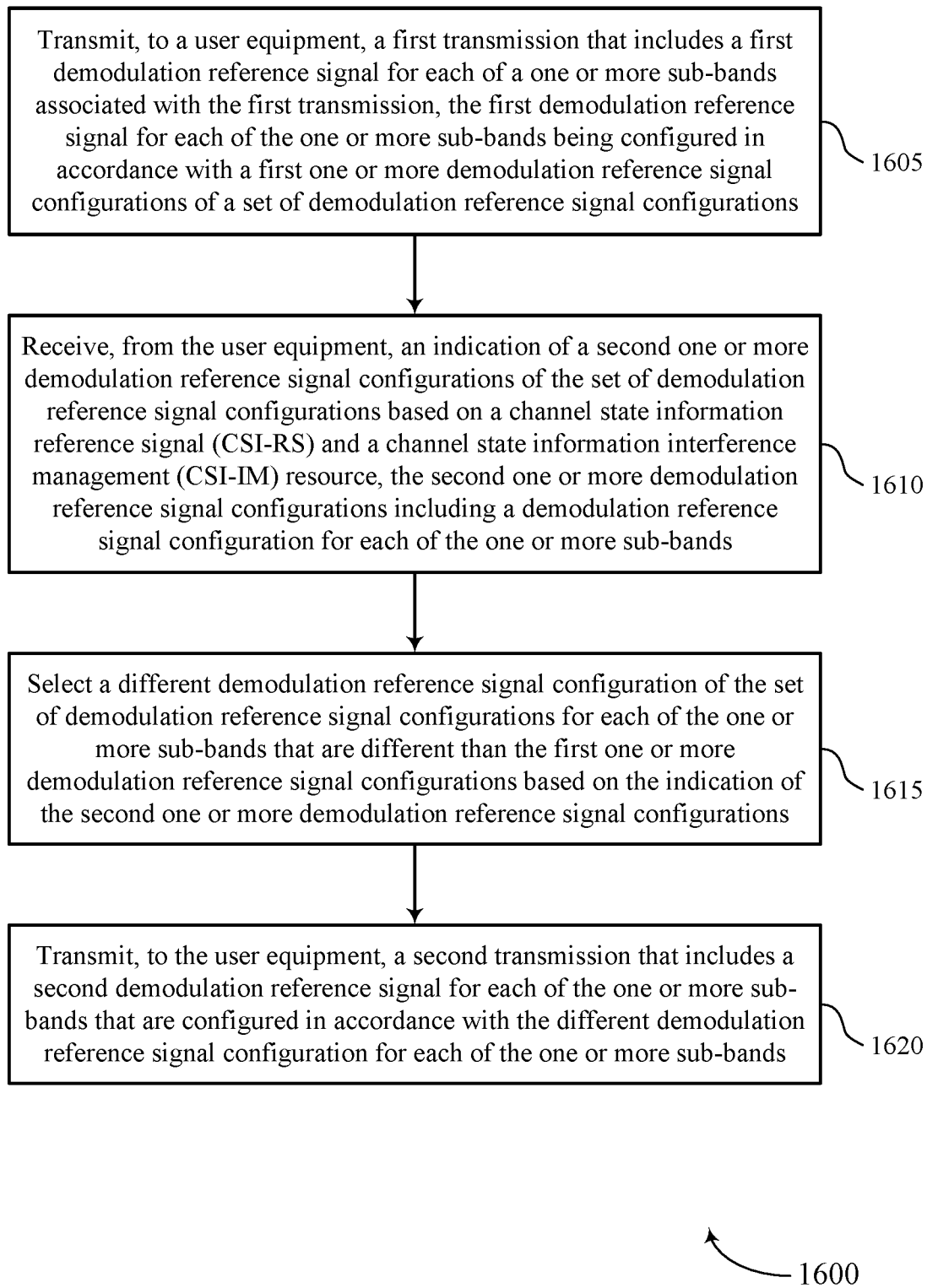

FIG. 16 shows a flowchart illustrating a method 1600 that supports demodulation reference signal configuration selection and reporting per sub-band in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a user equipment, a first transmission that includes a first demodulation reference signal for each of one or more sub-bands associated with the first transmission, the first demodulation reference signal for each of the one or more sub-bands being configured in accordance with a first one or more demodulation reference signal configurations of a set of demodulation reference signal configurations. The operations of 1605 may be performed according to the methods described herein. In some examples, aspects of the operations of 1605 may be performed by a DMRS transmitter as described with reference to FIGS. 9 through 12.

At 1610, the base station may receive, from the user equipment, an indication of a second one or more demodulation reference signal configurations of the set of demodulation reference signal configurations based on a channel state information reference signal (CSI-RS) and a channel state information interference management (CSI-IM) resource, the second one or more demodulation reference signal configurations including a demodulation reference signal configuration for each of the one or more sub-bands. The operations of 1610 may be performed according to the methods described herein. In some examples, aspects of the operations of 1610 may be performed by a DMRS configuration receiver as described with reference to FIGS. 9 through 12.

At 1615, the base station may select a different demodulation reference signal configuration of the set of demodulation reference signal configurations for each of the one or more sub-bands that are different than the first one or more demodulation reference signal configurations based on the indication of the second one or more demodulation reference signal configurations. The operations of 1615 may be performed according to the methods described herein. In some examples, aspects of the operations of 1615 may be performed by a DMRS configuration selection component as described with reference to FIGS. 9 through 12.

At 1620, the base station may transmit, to the user equipment, a second transmission that includes a second demodulation reference signal for each of the one or more sub-bands that are configured in accordance with the different demodulation reference signal configuration for each of the one or more sub-bands. The operations of 1620 may be performed according to the methods described herein. In some examples, aspects of the operations of 1620 may be performed by a DMRS transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Aspect 1: A method for wireless communication, comprising: determining a set of channel characteristics and a first link quality characteristic for each sub-band of one or more sub-bands associated with a channel based at least in part on one or more downlink reference signals or a channel state information interference management (CSI-IM) resource, or both; identifying, based at least in part on the set of channel characteristics and the first link quality characteristic, a plurality of link quality characteristics for each sub-band of the one or more sub-bands, the plurality of link quality characteristics for each sub-band of the one or more sub-bands corresponding to a plurality of demodulation reference signal configurations; selecting a demodulation reference signal configuration of the plurality of demodulation reference signal configurations for each of the one or more sub-bands based at least in part on the plurality of link quality characteristics and a communication efficiency metric that is associated with the demodulation reference signal configuration for each of the one or more sub-bands; and transmitting, to a base station, an indication of the demodulation reference signal configuration for each of the one or more sub-bands.

Aspect 2: The method of aspect 1, further comprising: receiving, from the base station, a data transmission associated with the one or more sub-bands over a data channel based at least in part on the indication of the demodulation reference signal configuration for each of the one or more sub-bands, wherein the data transmission comprises a demodulation reference signal for each of the one or more sub-bands associated with the data transmission.

Aspect 3: The method of aspects 1 or 2, further comprising: generating a report that comprises the indication of the demodulation reference signal configuration for each of the one or more sub-bands; and transmitting the report to the base station, wherein transmitting the indication comprises transmitting the report to the base station.

Aspect 4: The method of any of aspects 1 to 3, wherein the report comprises an indication of a wideband demodulation reference signal configuration.

Aspect 5: The method of any of aspects 1 to 4, further comprising: generating a wideband channel quality indicator associated with the wideband demodulation reference signal configuration and one or more of sub-band channel quality indicators associated with the demodulation reference signal configuration for each of the one or more sub-bands, wherein the report comprises the wideband channel quality indicator and the one or more of sub-band channel quality indicators.

Aspect 6: The method of any of aspects 1 to 5, wherein the indication of the wideband demodulation reference signal configuration comprises an absolute index, and wherein each indication of the demodulation reference signal configuration for each of the one or more sub-bands comprises a differential index whose value is with reference to a value of the absolute index.

Aspect 7: The method of any of aspects 1 to 6, wherein the report is coupled with a channel state feedback report or comprises the channel state feedback report.

Aspect 8: The method of any of aspects 1 to 7, wherein the channel state feedback report comprises a sub-band channel quality indicator, a wide-band channel quality indicator, a rank indicator, a wide-band precoding matrix indicator, a sub-band precoding matrix indicator, or a combination thereof.

Aspect 9: The method of any of aspects 1 to 8, further comprising: receiving an indication of one or more parameters associated with a channel state information report configuration; and transmitting the report based at least in part on the received indication of the one or more parameters.

Aspect 10: The method of any of aspects 1 to 9, wherein the one or more parameters comprise a sub-band size, a reporting band configuration, a demodulation reference signal field configuration indicating whether the report is to comprise a field for reporting one or more demodulation reference signal configurations, a demodulation reference signal report configuration indicating whether the one or more demodulation reference signal configurations comprise one or both of the demodulation reference signal configuration for each of the one or more sub-bands or a wideband demodulation reference signal configuration, or any combination thereof.

Aspect 11: The method of any of aspects 1 to 10, wherein the one or more parameters comprise the sub-band size, the method further comprising: scaling the sub-band size by an integer factor, wherein a total quantity of the one or more sub-bands, an effective sub-band size of the one or more sub-bands, or both is based at least in part on scaling the sub-band size by the integer factor.

Aspect 12: The method of any of aspects 1 to 11, further comprising: receiving, from the base station, an indication of the integer factor.

Aspect 13: The method of any of aspects 1 to 12, wherein the report comprises a second report comprising the demodulation reference signal configuration for each of the one or more sub-bands, the method further comprising: receiving first scheduling information for transmitting a first report comprising an indication of a wideband demodulation reference signal configuration and one or more channel quality indicators associated with the one or more sub-bands; transmitting the first report based at least in part on the first scheduling information; and receiving second scheduling information for transmitting the second report, wherein transmitting the second report is based at least in part on receiving the second scheduling information and transmitting the first report.

Aspect 14: The method of any of aspects 1 to 13, wherein receiving the second scheduling information is based at least in part on the one or more channel quality indicators, the method further comprising: receiving a configuration of the second report based at least in part on the one or more channel quality indicators.

Aspect 15: The method of any of aspects 1 to 14, wherein the one or more channel quality indicators comprise a plurality of channel quality indicators, and wherein the plurality of channel quality indicators are associated with a plurality of sub-bands comprising the one or more sub-bands, and wherein the configuration of the second report indicates one or more sub-bands from the plurality of sub-bands based at least in part on the plurality of channel quality indicators of the first report, wherein transmitting the second report is based at least in part on receiving the configuration of the second report, the second scheduling information, or both.

Aspect 16: The method of any of aspects 1 to 15, further comprising: determining that a plurality of channel state information reports are to be multiplexed with each other on an uplink resource, wherein a channel state information report of the plurality comprises a first part and a second part, wherein the first part or the second part comprises the indication of the demodulation reference signal configuration for at least one of the one or more sub-bands and wherein the first part comprises an indication of a wideband demodulation reference signal configuration for an entire reporting band; and identifying a set of priority rules for prioritizing the first part over the second part, wherein transmitting the indication of the demodulation reference signal configuration for each of the one or more sub-bands is based at least in part on the set of priority rules.

Aspect 17: The method of any of aspects 1 to 16, wherein the channel state information report of the plurality comprises at least one channel quality indicator associated with the at least one of the one or more sub-bands, and wherein the at least one channel quality indicator has a priority higher than or equal to the indication of the demodulation reference signal configuration for the at least one of the one or more sub-band according to the set of priority rules.

Aspect 18: The method of any of aspects 1 to 17, further comprising: determining a channel quality indicator for each of the one or more sub-bands based at least in part on the selected demodulation reference signal configuration for each of the one or more sub-bands; and transmitting, to the base station, an indication of the channel quality indicator defined based at least in part on the selected demodulation reference signal configuration for each of the one or more sub-bands.

Aspect 19: The method of any of aspects 1 to 18, further comprising: receiving, from the base station, downlink control information comprising a bit indicating whether the demodulation reference signal configuration for each of the one or more sub-bands of a scheduled allocation of one or more physical resource groups are the same as the demodulation reference signal configuration for each of the one or more sub-bands selected in a last delivered indication regarding the selected demodulation reference signal configurations.

Aspect 20: The method of any of aspects 1 to 19, wherein selecting the demodulation reference signal configuration for each of the one or more sub-bands comprises: determining a first value for the communication efficiency metric for a first sub-band based at least in part on a temporal density, a frequency density, a first power level for a first demodulation reference signal configuration relative to a second power level for a data transmission, and a second link quality characteristic for the first sub-band for the first demodulation reference signal configuration; determining, for each remaining demodulation reference signal configuration of the plurality of demodulation reference signal configurations for the first sub-band, a first plurality of values for the communication efficiency metric based at least in part on respective temporal densities, respective frequency densities, respective power levels relative to the second power level for the data transmission, and respective second link quality characteristics of each of the remaining demodulation reference signal configurations; determining the first value for the communication efficiency metric associated with the first demodulation reference signal configuration is greater than the first plurality of values for the communication efficiency metric associated with each of the remaining demodulation reference signal configurations; and selecting the first demodulation reference signal configuration for the first sub-band.

Aspect 21: The method of any of aspects 1 to 20, further comprising: determining that a second value for the communication efficiency metric associated with a second demodulation reference signal configuration for a second sub-band is greater than a second plurality of values for the communication efficiency metric associated with each of the remaining demodulation reference signal configurations for the second sub-band; and selecting the second demodulation reference signal configuration for the second sub-band.

Aspect 22: The method of any of aspects 1 to 21, further comprising: receiving a channel state information report configuration comprising an indication of one or more resources for transmitting the indication of the demodulation reference signal configuration for each of the one or more sub-bands coupled to or included in a channel state information report, wherein the one or more resources comprise one or more aperiodic resources, one or more periodic resources, or one or more semi-persistently scheduled resources, or any combination thereof.

Aspect 23: The method of any of aspects 1 to 22, wherein the indication of the demodulation reference signal configuration for each of the one or more sub-bands is transmitted via an uplink shared channel or an uplink control channel with a long uplink control channel format.

Aspect 24: The method of any of aspects 1 to 23, wherein the one or more downlink reference signals comprise a CSI reference signal (CSI-RS), a tracking reference signal (TRS), or both.

Aspect 25: An apparatus comprising at least one means for performing a method of any of aspects 1 to 24.

Aspect 26: An apparatus for wireless communications comprising a processor; memory coupled with the processor; and instructions stored in the memory and executable by the processor to cause the apparatus to perform a method of any of aspects 1 to 24.

Aspect 27: A non-transitory computer-readable medium storing code for wireless communications, the code comprising instructions executable by a processor to perform a method of any of aspects 1 to 24.

Aspect 28: A method for wireless communication, comprising: transmitting, to a user equipment, a first transmission that comprises a first demodulation reference signal for each of one or more sub-bands associated with the first transmission, the first demodulation reference signal for each of the one or more sub-bands being configured in accordance with a first one or more demodulation reference signal configurations of a plurality of demodulation reference signal configurations; receiving, from the user equipment, an indication of a second one or more demodulation reference signal configurations of the plurality of demodulation reference signal configurations based at least in part on a channel state information reference signal (CSI-RS) and a channel state information reference interference management (CSI-IM) resource, the second one or more demodulation reference signal configurations comprising a demodulation reference signal configuration for each of the one or more sub-bands; selecting a different demodulation reference signal configuration of the plurality of demodulation reference signal configurations for each of the one or more sub-bands that are different than the first one or more demodulation reference signal configurations based at least in part on the indication of the second one or more demodulation reference signal configurations; and transmitting, to the user equipment, a second transmission that comprises a second demodulation reference signal for each of the one or more sub-bands that are configured in accordance with the different demodulation reference signal configuration for each of the one or more sub-bands.

Aspect 29: The method of aspect 28, wherein the second transmission is a data transmission, the method further comprising: transmitting the data transmission over the one or more sub-bands, wherein each sub-band of the one or more sub-bands is associated with a different demodulation reference signal based at least in part on the different demodulation reference signal configurations for each of the one or more sub-bands.

Aspect 30: The method of aspects 28 or 29, wherein receiving the indication of the second one or more demodulation reference signal configurations comprises receiving a report that comprises the indication of the second one or more demodulation reference signal configurations.

Aspect 31: The method of any of aspects 28 to 30, wherein the report comprises an indication of a wideband demodulation reference signal configuration.

Aspect 32: The method of any of aspects 28 to 31, wherein the report comprises a wideband channel quality indicator associated with the wideband demodulation reference signal configuration and one or more sub-band channel quality indicators associated with the demodulation reference signal configuration for each of the one or more sub-bands.

Aspect 33: The method of any of aspects 28 to 32, wherein the indication of the wideband demodulation reference signal configuration comprises an absolute index, and wherein each indication of the demodulation reference signal configuration for each of the one or more sub-bands comprises a differential index whose value is with reference to a value of the absolute index.

Aspect 34: The method of any of aspects 28 to 33, wherein the report is coupled with a channel state feedback report or comprises the channel state feedback report.

Aspect 35: The method of any of aspects 28 to 34, wherein the channel state feedback report comprises a sub-band channel quality indicator, a wide-band channel quality indicator, a rank indicator, a wide-band precoding matrix indicator, a sub-band precoding matrix indicator, or a combination thereof.

Aspect 36: The method of any of aspects 28 to 35, further comprising: transmitting one or more parameters associated with a channel state information report configuration; and receiving the report based at least in part on the transmitted indication of the one or more parameters.

Aspect 37: The method of any of aspects 28 to 36, wherein the one or more parameters comprise a sub-band size, a reporting band configuration, a demodulation reference signal field configuration indicating whether the report is to comprise a field for reporting one or more demodulation reference signal configurations, a demodulation reference signal report configuration indicating whether the one or more demodulation reference signal configurations comprise one or both of the demodulation reference signal configuration for each of the one or more sub-bands or a wideband demodulation reference signal configuration, or any combination thereof.

Aspect 38: The method of any of aspects 28 to 37, wherein the one or more parameters comprise the sub-band size, the method further comprising: transmitting, to the user equipment, an indication of an integer factor, wherein a total quantity of the one or more sub-bands, an effective sub-band size of the one or more sub-bands, or both is based at least in part on the sub-band size and the integer factor.

Aspect 39: The method of any of aspects 28 to 38, wherein the report comprises a second report comprising the demodulation reference signal configuration for each of the one or more sub-bands, the method further comprising: transmitting first scheduling information for transmitting a first report comprising an indication of a wideband demodulation reference signal configuration and one or more channel quality indicators associated with the one or more sub-bands; receiving the first report based at least in part on the first scheduling information; and transmitting second scheduling information for transmitting the second report, wherein receiving the second report is based at least in part on transmitting the second scheduling information and receiving the first report.

Aspect 40: The method of any of aspects 28 to 39, wherein transmitting the second scheduling information is based at least in part on the one or more channel quality indicators, the method further comprising: transmitting a configuration of the second report based at least in part on the one or more channel quality indicators.

Aspect 41: The method of any of aspects 28 to 40, wherein the one or more channel quality indicators comprise a plurality of channel quality indicators, and wherein the plurality of channel quality indicators are associated with a plurality of sub-bands comprising the one or more sub-bands, and wherein the configuration of the second report indicates the one or more sub-bands from the plurality of sub-bands based at least in part on the plurality of channel quality indicators, wherein receiving the second report is based at least in part on transmitting the configuration of the second report, the second scheduling information, or both.

Aspect 42: The method of any of aspects 28 to 41, further comprising: identifying a set of priority rules for prioritizing a first part of a channel state information report over a second part of the channel state information report; and receiving a plurality of channel state information reports multiplexed with each other on an uplink resource, wherein the plurality of channel state information reports comprises the channel state information report, and wherein the first part or the second part of the channel state information report of the plurality comprises the indication of the demodulation reference signal configuration for at least one of the one or more sub-bands based at least in part on the set of priority rules, and wherein the first part comprises an indication of a wideband demodulation reference signal configuration for an entire reporting band.

Aspect 43: The method of any of aspects 28 to 42, wherein the channel state information report of the plurality comprises at least one channel quality indicator associated with the at least one of the one or more sub-bands, and wherein the at least one channel quality indicator has a priority higher than or equal to the indication of the demodulation reference signal configuration for the at least one of the one or more sub-band according to the set of priority rules.

Aspect 44: The method of any of aspects 28 to 43, further comprising: receiving, from the user equipment, a channel quality indicator for each of the one or more sub-bands.

Aspect 45: The method of any of aspects 28 to 44, further comprising: transmitting, to the user equipment, downlink control information comprising a bit indicating whether the demodulation reference signal configuration for each of the one or more sub-bands of a scheduled allocation of one or more physical resource groups are the same as the demodulation reference signal configuration for each of the one or more sub-bands delivered by the user equipment in a last indication regarding the selected demodulation reference signal configurations.

Aspect 46: The method of any of aspects 28 to 45, further comprising: transmitting a channel state information report configuration comprising an indication of one or more resources for transmitting the indication of the demodulation reference signal configuration for each of the one or more sub-bands, wherein the one or more resources comprise one or more aperiodic resources, one or more periodic resources, or one or more semi-persistently scheduled resources, or any combination thereof.

Aspect 47: The method of any of aspects 28 to 46, wherein the indication of the demodulation reference signal configuration for each of the one or more sub-bands is received via an uplink shared channel or an uplink control channel with a long uplink control channel format.

Aspect 48: The method of any of aspects 28 to 47, further comprising: receiving an indication of one or more channel quality indicators associated with the one or more sub-bands; determining that an allocation size is below a threshold; and determining a set of resource blocks based at least in part on the allocation size being below the threshold and the one or more channel quality indicators associated with the one or more sub-bands, wherein transmitting, to the user equipment, the second transmission comprising the second demodulation reference signal for each of the one or more sub-bands is according to the set of resource blocks and based at least in part on receiving the demodulation reference signal configuration for each of the one or more sub-bands.

Aspect 49: The method of any of aspects 28 to 48, further comprising: pairing the user equipment with a second user equipment in a same multiple-user multiple-input-multiple-output co-scheduling group based at least in part on receiving the indication of the demodulation reference signal configuration for each of the one or more sub-bands.

Aspect 50: The method of any of aspects 28 to 49, further comprising: determining a demodulation reference signal density associated with the user equipment based at least in part on receiving the indication of the second one or more demodulation reference signal configurations, wherein pairing the user equipment with the second user equipment is based at least in part on the determined demodulation reference signal density.

Aspect 51: An apparatus comprising at least one means for performing a method of any of aspects 28 to 50.

Aspect 52: An apparatus for wireless communications comprising a processor; memory coupled with the processor; and instructions stored in the memory and executable by the processor to cause the apparatus to perform a method of any of aspects 28 to 50.

Aspect 53: A non-transitory computer-readable medium storing code for wireless communications, the code comprising instructions executable by a processor to perform a method of any of aspects 28 to 50.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining a set of channel characteristics and a first link quality characteristic for each sub-band of one or more sub-bands associated with a channel based at least in part on one or more downlink reference signals or a channel state information interference management (CSI-IM) resource, or both;
   identifying, based at least in part on the set of channel characteristics and the first link quality characteristic, a plurality of link quality characteristics for each sub-band of the one or more sub-bands, the plurality of link quality characteristics for each sub-band of the one or more sub-bands corresponding to a plurality of demodulation reference signal configurations;
   selecting a demodulation reference signal configuration of the plurality of demodulation reference signal configurations for each of the one or more sub-bands based at least in part on the plurality of link quality characteristics and a communication efficiency metric that is associated with the demodulation reference signal configuration for each of the one or more sub-bands; and
   transmitting, to a base station, an indication of the demodulation reference signal configuration for each of the one or more sub-bands.

2. The method of claim 1, further comprising:
   receiving, from the base station, a data transmission associated with the one or more sub-bands over a data channel based at least in part on the indication of the demodulation reference signal configuration for each of the one or more sub-bands, wherein the data transmission comprises a demodulation reference signal for each of the one or more sub-bands associated with the data transmission.

3. The method of claim 1, further comprising:
generating a report that comprises the indication of the demodulation reference signal configuration for each of the one or more sub-bands; and
transmitting the report to the base station, wherein transmitting the indication comprises transmitting the report to the base station.

4. The method of claim 3, wherein the report comprises an indication of a wideband demodulation reference signal configuration.

5. The method of claim 4, further comprising:
generating a wideband channel quality indicator associated with the wideband demodulation reference signal configuration and one or more of sub-band channel quality indicators associated with the demodulation reference signal configuration for each of the one or more sub-bands, wherein the report comprises the wideband channel quality indicator and the one or more of sub-band channel quality indicators.

6. The method of claim 3, wherein the report is coupled with a channel state feedback report or comprises the channel state feedback report.

7. The method of claim 3, further comprising:
receiving an indication of one or more parameters associated with a channel state information report configuration; and
transmitting the report based at least in part on the received indication of the one or more parameters.

8. The method of claim 7, wherein the one or more parameters comprise a sub-band size, a reporting band configuration, a demodulation reference signal field configuration indicating whether the report is to comprise a field for reporting one or more demodulation reference signal configurations, a demodulation reference signal report configuration indicating whether the one or more demodulation reference signal configurations comprise one or both of the demodulation reference signal configuration for each of the one or more sub-bands or a wideband demodulation reference signal configuration, or any combination thereof, the method further comprising:
scaling the sub-band size by an integer factor, wherein a total quantity of the one or more sub-bands, an effective sub-band size of the one or more sub-bands, or both is based at least in part on scaling the sub-band size by the integer factor.

9. The method of claim 3, wherein the report comprises a second report comprising the demodulation reference signal configuration for each of the one or more sub-bands, the method further comprising:
receiving first scheduling information for transmitting a first report comprising an indication of a wideband demodulation reference signal configuration and one or more channel quality indicators associated with the one or more sub-bands;
transmitting the first report based at least in part on the first scheduling information; and
receiving second scheduling information for transmitting the second report, wherein transmitting the second report is based at least in part on receiving the second scheduling information and transmitting the first report.

10. The method of claim 1, further comprising:
determining that a plurality of channel state information reports are to be multiplexed with each other on an uplink resource, wherein a channel state information report of the plurality comprises a first part and a second part, wherein the first part or the second part comprises the indication of the demodulation reference signal configuration for at least one of the one or more sub-bands and wherein the first part comprises an indication of a wideband demodulation reference signal configuration for an entire reporting band; and
identifying a set of priority rules for prioritizing the first part over the second part, wherein transmitting the indication of the demodulation reference signal configuration for each of the one or more sub-bands is based at least in part on the set of priority rules.

11. The method of claim 1, further comprising:
determining a channel quality indicator for each of the one or more sub-bands based at least in part on the selected demodulation reference signal configuration for each of the one or more sub-bands; and
transmitting, to the base station, an indication of the channel quality indicator defined based at least in part on the selected demodulation reference signal configuration for each of the one or more sub-bands.

12. The method of claim 1, further comprising:
receiving, from the base station, downlink control information comprising a bit indicating whether the demodulation reference signal configuration for each of the one or more sub-bands of a scheduled allocation of one or more physical resource groups are the same as the demodulation reference signal configuration for each of the one or more sub-bands selected in a last delivered indication regarding the selected demodulation reference signal configurations.

13. The method of claim 1, wherein selecting the demodulation reference signal configuration for each of the one or more sub-bands comprises:
determining a first value for the communication efficiency metric for a first sub-band based at least in part on a temporal density, a frequency density, a first power level for a first demodulation reference signal configuration relative to a second power level for a data transmission, and a second link quality characteristic for the first sub-band for the first demodulation reference signal configuration;
determining, for each remaining demodulation reference signal configuration of the plurality of demodulation reference signal configurations for the first sub-band, a first plurality of values for the communication efficiency metric based at least in part on respective temporal densities, respective frequency densities, respective power levels relative to the second power level for the data transmission, and respective second link quality characteristics of each of the remaining demodulation reference signal configurations;
determining the first value for the communication efficiency metric associated with the first demodulation reference signal configuration is greater than the first plurality of values for the communication efficiency metric associated with each of the remaining demodulation reference signal configurations; and
selecting the first demodulation reference signal configuration for the first sub-band.

14. The method of claim 1, further comprising:
receiving a channel state information report configuration comprising an indication of one or more resources for transmitting the indication of the demodulation reference signal configuration for each of the one or more sub-bands coupled to or included in a channel state information report, wherein the one or more resources comprise one or more aperiodic resources, one or more periodic resources, or one or more semi-persistently scheduled resources, or any combination thereof.

15. A method for wireless communication, comprising:
   transmitting, to a user equipment, a first transmission that comprises a first demodulation reference signal for each of one or more sub-bands associated with the first transmission, the first demodulation reference signal for each of the one or more sub-bands being configured in accordance with a first one or more demodulation reference signal configurations of a plurality of demodulation reference signal configurations;
   receiving, from the user equipment, an indication of a second one or more demodulation reference signal configurations of the plurality of demodulation reference signal configurations based at least in part on a channel state information reference signal (CSI-RS) and a channel state information interference management (CSI-IM) resource, the second one or more demodulation reference signal configurations comprising a demodulation reference signal configuration for each of the one or more sub-bands;
   selecting a different demodulation reference signal configuration of the plurality of demodulation reference signal configurations for each of the one or more sub-bands that are different than the first one or more demodulation reference signal configurations based at least in part on the indication of the second one or more demodulation reference signal configurations; and
   transmitting, to the user equipment, a second transmission that comprises a second demodulation reference signal for each of the one or more sub-bands that are configured in accordance with the different demodulation reference signal configuration for each of the one or more sub-bands.

16. The method of claim 15, further comprising:
   pairing the user equipment with a second user equipment in a same multiple-user multiple-input-multiple-output co-scheduling group based at least in part on receiving the indication of the demodulation reference signal configuration for each of the one or more sub-bands.

17. The method of claim 16, further comprising:
   determining a demodulation reference signal density associated with the user equipment based at least in part on receiving the indication of the second one or more demodulation reference signal configurations, wherein pairing the user equipment with the second user equipment is based at least in part on the determined demodulation reference signal density.

18. An apparatus for wireless communication, comprising:
   a processor,
   memory coupled with the processor; and
   instructions stored in the memory and executable by the processor to cause the apparatus to:
      determine a set of channel characteristics and a first link quality characteristic for each sub-band of one or more sub-bands associated with a channel based at least in part on one or more downlink reference signals or a channel state information interference management (CSI-IM) resource, or both;
      identify, based at least in part on the set of channel characteristics and the first link quality characteristic, a plurality of link quality characteristics for each sub-band of the one or more sub-bands, the plurality of link quality characteristics for each sub-band of the one or more sub-bands corresponding to a plurality of demodulation reference signal configurations;
      select a demodulation reference signal configuration of the plurality of demodulation reference signal configurations for each of the one or more sub-bands based at least in part on the plurality of link quality characteristics and a communication efficiency metric that is associated with the demodulation reference signal configuration for each of the one or more sub-bands; and
      transmit, to a base station, an indication of the demodulation reference signal configuration for each of the one or more sub-bands.

19. The apparatus of claim 18, wherein the instructions are further executable by the processor to cause the apparatus to:
   receive, from the base station, a data transmission associated with the one or more sub-bands over a data channel based at least in part on the indication of the demodulation reference signal configuration for each of the one or more sub-bands, wherein the data transmission comprises a demodulation reference signal for each of the one or more sub-bands associated with the data transmission.

20. The apparatus of claim 18, wherein the instructions are further executable by the processor to cause the apparatus to:
   generate a report that comprises the indication of the demodulation reference signal configuration for each of the one or more sub-bands; and
   the instructions to transmit the report to the base station, wherein transmitting the indication are executable by the processor to cause the apparatus to transmit the report to the base station.

21. The apparatus of claim 20, wherein the report comprises an indication of a wideband demodulation reference signal configuration.

22. The apparatus of claim 21, wherein the instructions are further executable by the processor to cause the apparatus to:
   generate a wideband channel quality indicator associated with the wideband demodulation reference signal configuration and one or more of sub-band channel quality indicators associated with the demodulation reference signal configuration for each of the one or more sub-bands, wherein the report comprises the wideband channel quality indicator and the one or more of sub-band channel quality indicators.

23. The apparatus of claim 20, wherein the report is coupled with a channel state feedback report or comprises the channel state feedback report.

24. The apparatus of claim 20, wherein the instructions are further executable by the processor to cause the apparatus to:
   receive an indication of one or more parameters associated with a channel state information report configuration; and
   transmit the report based at least in part on the received indication of the one or more parameters.

25. The apparatus of claim 24, wherein the one or more parameters comprise a sub-band size, a reporting band configuration, a demodulation reference signal field configuration indicating whether the report is to comprise a field for reporting one or more demodulation reference signal configurations, a demodulation reference signal report configuration indicating whether the one or more demodulation reference signal configurations comprise one or both of the demodulation reference signal configuration for each of the one or more sub-bands or a wideband demodulation reference signal configuration, or any combination thereof, and wherein the instructions are further executable by the processor to cause the apparatus to:

scale the sub-band size by an integer factor, wherein a total quantity of the one or more sub-bands, an effective sub-band size of the one or more sub-bands, or both is based at least in part on scaling the sub-band size by the integer factor.

26. The apparatus of claim 20, wherein the report comprises a second report comprising the demodulation reference signal configuration for each of the one or more sub-bands, and wherein the instructions are further executable by the processor to cause the apparatus to:

receive first scheduling information for transmitting a first report comprising an indication of a wideband demodulation reference signal configuration and one or more channel quality indicators associated with the one or more sub-bands;

transmit the first report based at least in part on the first scheduling information; and receive second scheduling information for transmitting the second report, wherein transmitting the second report is based at least in part on receiving the second scheduling information and transmitting the first report.

27. The apparatus of claim 18, wherein the instructions are further executable by the processor to cause the apparatus to:

determine that a plurality of channel state information reports are to be multiplexed with each other on an uplink resource, wherein a channel state information report of the plurality comprises a first part and a second part, wherein the first part or the second part comprises the indication of the demodulation reference signal configuration for at least one of the one or more sub-bands and wherein the first part comprises an indication of a wideband demodulation reference signal configuration for an entire reporting band; and identify a set of priority rules for prioritizing the first part over the second part, wherein transmitting the indication of the demodulation reference signal configuration for each of the one or more sub-bands is based at least in part on the set of priority rules.

28. The apparatus of claim 18, wherein the instructions are further executable by the processor to cause the apparatus to:

determine a channel quality indicator for each of the one or more sub-bands based at least in part on the selected demodulation reference signal configuration for each of the one or more sub-bands; and transmit, to the base station, an indication of the channel quality indicator defined based at least in part on the selected demodulation reference signal configuration for each of the one or more sub-bands.

29. The apparatus of claim 18, wherein the instructions are further executable by the processor to cause the apparatus to:

receive, from the base station, downlink control information comprising a bit indicating whether the demodulation reference signal configuration for each of the one or more sub-bands of a scheduled allocation of one or more physical resource groups are the same as the demodulation reference signal configuration for each of the one or more sub-bands selected in a last delivered indication regarding the selected demodulation reference signal configurations.

30. An apparatus for wireless communication, comprising:

a processor, memory coupled with the processor; and instructions stored in the memory and executable by the processor to cause the apparatus to:

transmit, to a user equipment, a first transmission that comprises a first demodulation reference signal for each of one or more sub-bands associated with the first transmission, the first demodulation reference signal for each of the one or more sub-bands being configured in accordance with a first one or more demodulation reference signal configurations of a plurality of demodulation reference signal configurations;

receive, from the user equipment, an indication of a second one or more demodulation reference signal configurations of the plurality of demodulation reference signal configurations based at least in part on a channel state information reference signal (CSI-RS) and a channel state information interference management (CSI-IM) resource, the second one or more demodulation reference signal configurations comprising a demodulation reference signal configuration for each of the one or more sub-bands;

select a different demodulation reference signal configuration of the plurality of demodulation reference signal configurations for each of the one or more sub-bands that are different than the first one or more demodulation reference signal configurations based at least in part on the indication of the second one or more demodulation reference signal configurations; and transmit, to the user equipment, a second transmission that comprises a second demodulation reference signal for each of the one or more sub-bands that are configured in accordance with the different demodulation reference signal configuration for each of the one or more sub-bands.

\* \* \* \* \*